United States Patent
Mayrand

(10) Patent No.: US 12,063,380 B2
(45) Date of Patent: Aug. 13, 2024

(54) METHOD AND SYSTEM FOR PANORAMIC MULTIMEDIA STREAMING ENABLING VIEW-REGION SELECTION

(71) Applicant: VANTRIX CORPORATION, Montreal (CA)

(72) Inventor: Jean Mayrand, Chambly (CA)

(*) Notice: Subject to any disclaimer, the term of this patent is extended or adjusted under 35 U.S.C. 154(b) by 458 days.

(21) Appl. No.: 17/367,400

(22) Filed: Jul. 4, 2021

(65) Prior Publication Data

US 2021/0337223 A1    Oct. 28, 2021

Related U.S. Application Data

(63) Continuation-in-part of application No. 16/571,615, filed on Sep. 16, 2019, now Pat. No. 11,057,632,
(Continued)

(51) Int. Cl.
*H04N 19/40* (2014.01)
*H04L 65/613* (2022.01)
(Continued)

(52) U.S. Cl.
CPC .......... *H04N 19/40* (2014.11); *H04L 65/613* (2022.05); *H04L 65/70* (2022.05); *H04L 65/765* (2022.05);
(Continued)

(58) Field of Classification Search
CPC ..... H04L 65/601; H04L 67/42; H04L 65/607; H04L 67/10; H04N 19/597; H04N 19/40;
(Continued)

(56) References Cited

U.S. PATENT DOCUMENTS 6,219,089 B1    4/2001    Driscoll, Jr. et al.
6,466,254 B1    10/2002   Furlan
(Continued)

FOREIGN PATENT DOCUMENTS

CN    101778104    7/2010
WO    2004004320    1/2004
(Continued)

OTHER PUBLICATIONS

Anonymous, "How to Cast or Mirror an Oculus Go Headset to a Mobile Phone", InstaVR, Nov. 1, 2018, online: <https://www.instavr.co/articles/general/how-to-cast-or-mirror-an-oculus-go-headset-to-a-mobile-phone>.
(Continued)

*Primary Examiner* — Michael A Keller
(74) *Attorney, Agent, or Firm* — IP-MEX Inc.; Victoria Donnelly

(57) ABSTRACT

A panoramic multimedia streaming server communicatively coupled to numerous client devices of different types enables individual client devices to dynamically select view-regions of interest. A source video signal capturing a panoramic field of view is processed to generate a pure video signal faithfully representing the panoramic field of view. The pure video signal is content filtered to produce multiple view-region-specific video signals corresponding to predefined view regions within the panoramic field of view. Frame samples of the pure video signal are transmitted to a client device to enable selection of a view region of interest. Upon receiving, from the client device, an indication of a view region of interest, a controller selects a specific predefined view region according to proximity of each predefined view region to the indicated view region of interest. A view-region-specific video signal corresponding to the
(Continued)

specific predefined view region is streamed to the client device.

20 Claims, 46 Drawing Sheets

Related U.S. Application Data which is a continuation of application No. 15/259,962, filed on Sep. 8, 2016, now Pat. No. 10,419,770.

(60) Provisional application No. 62/216,326, filed on Sep. 9, 2015.

(51) Int. Cl.

| | | |
|---|---|---|
| *H04L 65/70* | (2022.01) | |
| *H04L 65/75* | (2022.01) | |
| *H04N 19/597* | (2014.01) | |
| *H04N 21/218* | (2011.01) | |
| *H04N 19/117* | (2014.01) | |
| *H04N 19/162* | (2014.01) | |
| *H04N 19/167* | (2014.01) | |
| *H04N 19/174* | (2014.01) | |
| *H04N 23/698* | (2023.01) | |

(52) U.S. Cl.
CPC ..... *H04N 19/597* (2014.11); *H04N 21/21805* (2013.01); *H04N 19/117* (2014.11); *H04N 19/162* (2014.11); *H04N 19/167* (2014.11); *H04N 19/174* (2014.11); *H04N 23/698* (2023.01)

(58) Field of Classification Search
CPC .............. H04N 5/23238; H04N 19/174; H04N 19/117; H04N 19/162; H04N 19/167
See application file for complete search history.

(56) References Cited

U.S. PATENT DOCUMENTS

| | | | |
|---|---|---|---|
| 6,844,990 | B2 | 1/2005 | Artonne et al. |
| 7,463,280 | B2 | 12/2008 | Steuart, III |
| 7,872,665 | B2 | 1/2011 | Grover |
| 7,975,063 | B2 | 7/2011 | Lefebvre |
| 7,975,283 | B2 | 7/2011 | Bedingfield, Sr. |
| 8,264,524 | B1 | 9/2012 | Davey |
| 8,493,436 | B2 | 7/2013 | Lyon et al. |
| 8,645,932 | B2 | 2/2014 | Wright et al. |
| 8,767,014 | B2 | 7/2014 | Vaught |
| 9,002,313 | B2 | 4/2015 | Sink et al. |
| 9,298,986 | B2 | 3/2016 | Ferlatte et al. |
| 9,392,212 | B1 | 7/2016 | Ross |
| 9,838,668 | B2 | 12/2017 | Prechtl |
| 9,900,626 | B2 | 2/2018 | Jayaram |
| 9,918,136 | B2 | 3/2018 | Cole |
| 10,176,683 | B2 | 1/2019 | Meganathan |
| 10,277,813 | B1* | 4/2019 | Thomas ................ H04N 23/90 |
| 10,390,064 | B2 | 8/2019 | Dury |
| 10,402,938 | B1 | 9/2019 | Newman |
| 10,536,671 | B1 | 1/2020 | Crookham et al. |
| 10,601,889 | B1 | 3/2020 | Doron |
| 10,630,971 | B2 | 4/2020 | Gupta et al. |
| 10,645,290 | B2 | 5/2020 | Besley et al. |
| 10,652,452 | B2 | 5/2020 | Gong et al. |
| 10,880,519 | B2* | 12/2020 | Natarajan ............ H04N 23/698 |
| 2005/0104878 | A1 | 5/2005 | Kaye |
| 2005/0104879 | A1 | 5/2005 | Kaye |
| 2005/0146521 | A1 | 7/2005 | Kaye |
| 2005/0231505 | A1 | 10/2005 | Kaye |
| 2006/0187305 | A1 | 8/2006 | Trivedi |
| 2008/0024594 | A1 | 1/2008 | Ritchey |
| 2010/0149073 | A1 | 6/2010 | Chaum |
| 2010/0157018 | A1 | 6/2010 | Lampotang |
| 2010/0217673 | A1 | 8/2010 | Vandewalle |
| 2011/0238856 | A1 | 9/2011 | Lefebvre |
| 2012/0117584 | A1 | 5/2012 | Gordon |
| 2012/0120194 | A1 | 5/2012 | Newton |
| 2013/0013803 | A1 | 1/2013 | Bichot et al. |
| 2013/0044181 | A1 | 2/2013 | Baker |
| 2013/0141523 | A1 | 6/2013 | Banta et al. |
| 2013/0212521 | A1 | 8/2013 | Fedoseyeva |
| 2013/0227160 | A1 | 8/2013 | Labonte et al. |
| 2013/0272374 | A1 | 10/2013 | Eswaran |
| 2013/0278715 | A1 | 10/2013 | Nutsch et al. |
| 2013/0279751 | A1 | 10/2013 | Bruna et al. |
| 2014/0320592 | A1 | 10/2014 | Amadio et al. |
| 2014/0376609 | A1 | 12/2014 | Barkley et al. |
| 2015/0049112 | A1 | 2/2015 | Liu |
| 2015/0055937 | A1* | 2/2015 | Van Hoff ............. H04N 23/661 386/285 |
| 2015/0085061 | A1 | 3/2015 | Sun et al. |
| 2015/0116359 | A1 | 4/2015 | Kajita et al. |
| 2015/0116451 | A1 | 4/2015 | Xu et al. |
| 2015/0156096 | A1 | 6/2015 | Roh |
| 2015/0212576 | A1 | 7/2015 | Ambrus |
| 2015/0243078 | A1 | 7/2015 | Watson et al. |
| 2015/0229492 | A1 | 8/2015 | Karaoguz |
| 2015/0244944 | A1 | 8/2015 | Tokutake |
| 2015/0249813 | A1 | 9/2015 | Cole |
| 2015/0334383 | A1 | 11/2015 | Newton |
| 2015/0346812 | A1 | 12/2015 | Cole |
| 2015/0350628 | A1 | 12/2015 | Sanders |
| 2016/0027215 | A1 | 1/2016 | Burns et al. |
| 2016/0105649 | A1 | 4/2016 | Pettegrew |
| 2016/0150212 | A1 | 5/2016 | Moura |
| 2016/0151026 | A1 | 6/2016 | Shibasaki |
| 2016/0189334 | A1 | 6/2016 | Mason |
| 2016/0191798 | A1 | 6/2016 | Yoo |
| 2016/0219262 | A1 | 7/2016 | Cole |
| 2016/0277772 | A1 | 9/2016 | Campbell |
| 2016/0286138 | A1 | 9/2016 | Kim |
| 2016/0353089 | A1 | 12/2016 | Gallup et al. |
| 2016/0353146 | A1 | 12/2016 | Weaver |
| 2016/0360180 | A1 | 12/2016 | Cole |
| 2016/0373734 | A1 | 12/2016 | Cole |
| 2016/0373791 | A1 | 12/2016 | White |
| 2016/0379606 | A1 | 12/2016 | Kollin |
| 2016/0381110 | A1 | 12/2016 | Barnett et al. |
| 2017/0001111 | A1 | 1/2017 | Willette |
| 2017/0001112 | A1 | 1/2017 | Gilmore |
| 2017/0001122 | A1 | 1/2017 | Leung |
| 2017/0003740 | A1 | 1/2017 | Verfaillie |
| 2017/0003784 | A1 | 1/2017 | Garg |
| 2017/0006074 | A1 | 1/2017 | Oates, III |
| 2017/0006322 | A1 | 1/2017 | Dury |
| 2017/0038942 | A1 | 2/2017 | Rosenfeld |
| 2017/0041544 | A1 | 2/2017 | Kobayashi |
| 2017/0041570 | A1 | 2/2017 | Takahashi et al. |
| 2017/0045941 | A1 | 2/2017 | Tokubo |
| 2017/0092008 | A1 | 3/2017 | Djorgovski |
| 2017/0105053 | A1 | 4/2017 | Todd |
| 2017/0139578 | A1 | 5/2017 | Dickerson |
| 2017/0213469 | A1 | 7/2017 | Elchik |
| 2017/0238055 | A1 | 8/2017 | Chang |
| 2017/0263046 | A1 | 9/2017 | Patney |
| 2017/0308116 | A1 | 10/2017 | Rondinelli |
| 2017/0316608 | A1 | 11/2017 | Khalid |
| 2017/0318325 | A1 | 11/2017 | Ortiz |
| 2017/0339416 | A1 | 11/2017 | Hendry |
| 2017/0344843 | A1 | 11/2017 | Wang |
| 2017/0358141 | A1 | 12/2017 | Stafford |
| 2017/0365102 | A1 | 12/2017 | Huston |
| 2017/0366812 | A1 | 12/2017 | Abbas |
| 2017/0374411 | A1 | 12/2017 | Lederer |
| 2018/0007352 | A1 | 1/2018 | Chang |
| 2018/0014140 | A1 | 1/2018 | Milevski |
| 2018/0227487 | A1 | 8/2018 | Heo |
| 2018/0357245 | A1 | 12/2018 | Garg |
| 2018/0367835 | A1 | 12/2018 | Hamidi-Rad |
| 2019/0050664 | A1 | 2/2019 | Yang |

(56) References Cited

U.S. PATENT DOCUMENTS

2019/0297363 A1   9/2019   Chirokov
2020/0177849 A1   6/2020   Shimada et al.
2020/0336524 A1   10/2020  Tinsman

FOREIGN PATENT DOCUMENTS

WO    2014191990    12/2014
WO    2019013016    1/2019

OTHER PUBLICATIONS

Azure Kinect, Wikipedia, https://en.wikipedia.org/wiki/Azure_Kinect Feb. 24, 2019.
Microsoft unveils next-generation HoloLens headset and $399 'Azure Kinect' camera for developers, By Nat Levy (https://www.geekwire.com/author/natlevy/) Feb. 24, 2019.
Sankaranarayanan K., Davis J.W. (2011) PTZ Camera Modeling and Panoramic View Generation via Focal Plane Mapping. In: Kimmel R., Klette R., Sugimoto A. (eds) Computer Vision—ACCV 2010. ACCV 2010. Lecture Notes in Computer Science, vol. 6493. Springer, Berlin, Heidelberg.
Lisanti, G., Masi, I., Pernici, F. et al. Continuous localization and mapping of a pan-tilt-zoom camera for wide area tracking. Machine Vision and Applications 27, 1071-1085 (2016).

* cited by examiner

Multimedia-source-specific streaming-control table

| Device type/Stream category | Viewing preference pattern | | | | | |
|---|---|---|---|---|---|---|
| | V0 | V1 | V2 | V3 | V4 | V5 |
| D0 | | | | | | Stream-2 |
| D1 | | Stream-3 | Stream-5 | Stream-0 | | |
| D2 | | | | | | |
| D3 | | | | | | |
| D4 | | | | | | |
| D5 | | | Stream-1 | | | |
| D6 | | | | | | |
| D7 | Stream-4 | | | | | |

Video-source-specific viewing-preference statistics

| Device type/ Stream category | Viewing preference pattern | | | | | |
|---|---|---|---|---|---|---|
| | V0 | V1 | V2 | V3 | V4 | V5 |
| D0 | 0 | 0 | 0 | 92 | 9 | 18 |
| D1 | 5 | 51 | 12 | 64 | 26 | 0 |
| D2 | 0 | 11 | 0 | 0 | 0 | 92 |
| D3 | 9 | 14 | 0 | 86 | 112 | 0 |
| D4 | 18 | 0 | 17 | 0 | 50 | 0 |
| D5 | 16 | 5 | 89 | 0 | 0 | 0 |
| D6 | 0 | 70 | 22 | 0 | 0 | 0 |
| D7 | 29 | 8 | 0 | 16 | 19 | 0 |

| Device-type | V0 | V1 | V2 | V3 | V4 | V5 | V6 | V7 |
|---|---|---|---|---|---|---|---|---|
| | | | | Pre-defined view regions | | | | |
| D0 | | | | | | | | |
| D1 | | | | | | | | |
| D2 | | | | | | | | |

4600 Multicast Table

4650 Network addresses, of client-devices of type D1 receiving stream {V5, D1}

FIG. 46

METHOD AND SYSTEM FOR PANORAMIC MULTIMEDIA STREAMING ENABLING VIEW-REGION SELECTION

CROSS-REFERENCE TO RELATED APPLICATIONS

The present application is a continuation in part of U.S. patent application Ser. No. 16/571,615 filed Sep. 16, 2019, to be issued as a U.S. Pat. No. 11,057,621 on Jul. 6, 2021, which is a continuation application of U.S. patent application Ser. No. 15/259,962 filed Sep. 8, 2016 and issued as a U.S. Pat. No. 10,419,770 on Sep. 17, 2019, which in turn claims the benefit from the U.S. provisional application 62/216,326 filed Sep. 9, 2015, the entire contents of the above noted applications and patents being incorporated herein by reference.

FIELD OF THE INVENTION

The present invention relates to streaming of multimedia signals containing panoramic video signals. In particular, the invention is directed to methods and apparatus for viewer control of video-signal content.

BACKGROUND OF THE INVENTION

In a data-streaming system, a server may transmit multimedia data to multiple client devices. The server may perform transcoding functions to adapt data according to characteristics of client devices as well as to conditions of network paths from the server to the client devices. The multimedia data may represent video signals, audio signals, static images, and text.

Streaming multimedia data containing panoramic video signals requires relatively higher capacity transport resources and more intensive processing. A panoramic video signal from a video source employing a panoramic camera occupies a relatively high bandwidth of a transmission medium. Sending the panoramic video signal directly from the video source to a client device requires a broadband path from the video source to the client's device and high-speed processing capability at the client device. Additionally, the video signal may require adaptation to suit differing characteristics of individual client devices.

Conventionally, streaming servers have been used to perform multimedia signal adaptation and distribution to individual client devices. With panoramic multimedia-signals, a high-capacity path need be established between the multimedia source and the streaming server, paths of adaptive capacities need be established between the streaming server and multiple client devices, and the streaming server need be equipped with powerful processing facilities.

In a panoramic-multimedia streaming system, it is desirable to provide clients with the capability to adaptively select view regions of panoramic scenes during a streaming session. It is, therefore, an object of the present invention to provide a flexible streaming server with the capability of client-specific signal-content filtering as well as signal processing to adapt signals to different types of client devices and to varying capacities of network paths to and from client devices.

SUMMARY

In accordance with an aspect, the invention provides a method of streaming implemented at a controller of a panoramic multimedia server employing at least one processor. Upon receiving, from a panoramic multimedia source, a source video signal capturing a panoramic field of view; the source video signal is processed to generate a pure video signal faithfully representing the panoramic field of view. The pure video signal is content filtered to produce a plurality of view-region-specific video signals corresponding to a plurality of predefined view regions within the panoramic field of view.

Upon receiving, at the controller, a service request from a client device, frame samples of the pure video signal are transmitted to the client device to be displayed at the client device to enable selection of a view region of interest.

Upon receiving, from the client device, an indication of a view region of interest, the controller determines proximity of each predefined region, of the plurality of predefined view regions, to the indicated view region of interest. A specific predefined view region is selected according to the proximity of each predefined view region to the view region of interest. A particular view-region-specific video signal, of the plurality of view-region-specific video signals, corresponding to the specific predefined view region is streamed to the client device.

To produce a pure video from the source video signal, the received source video signal is decompressed, subject to a determination that the source video signal has been compressed at source, and de-warped, subject to a determination that the source video signal has not been de-warped at source.

The method comprises a step of determining a client-device type of the client device requesting the service and transcoding the frame samples to be compatible with the client-device type prior to transmitting the pure video signal to the client device.

According to an implementation, the indication of a view region of interest is a location of a selected point within a display of the frame samples and the proximity of each predefined region to the view region of interest is determined as a Euclidean distance between a centroid of a predefined region and the selected point. The predefined view regions are preferably of rectangular shapes.

According to another implementation, the indication of a view region of interest is a regular polygon within the display of the frame samples and the proximity of each predefined region to the view region of interest is determined based on intersection of a predefined region and the regular polygon.

The pure video signal is supplied to a plurality of content-filters, where each content filter is configured to extract a respective view-region-specific video signal of the plurality of view-region-specific video signals. The particular view-region-specific video signal is transcoded to be compatible with the client-device type prior to streaming.

In accordance with another aspect, the invention provides a control system of a streaming server. The control system comprises a plurality of processors organized into a number of processing modules as well as network interface configured to communicate with multimedia signal sources and a plurality of client devices.

A first module is configured to generate a pure video signal accurately representing a panoramic field of view. A second module is configured to generate from the pure video signal a set of view-region-specific video signals corresponding to a plurality of predefined view regions within the panoramic field of view. A third module is configured to generate a frame-sampled video signal from the pure video signal.

A fourth module is configured to transmit a frame-sampled signal to a client device and receive an identifier of a view region of interest through the network interface. A fifth module is configured to:
   select a specific predefined view region according to proximity to the view region of interest; and
   transmit a corresponding view-region-specific video signal through the network interface.

A central processor is coupled to the network interface, and the first, second, third, fourth module, and fifth modules.

The second module is further configured to transcode the set of view-region-specific video signals to produce multiple transcoded view-region-specific video signals compatible with a set of predefined client-device types. The third module is further configured to transcode the frame-sampled video signal to produce multiple frame-sampled video signals compatible with the set of predefined client-device types.

The identifier of a view region of interest may be a client-selected central point and the fifth module is further configured to: determine centroids of the predefined view regions; and determine the proximity of each predefined view region to the view region of interest based on Euclidean distances between the client-selected central point and the centroids. Alternatively, the identifier of a view region of interest may be a client-selected rectangular shape. Thus, the fifth module is further configured to determine the proximity of each predefined view region to the view region of interest based on intersection of the client-selected rectangle and the predefined view regions.

A memory device stores service requests from the plurality of client devices and holds a multicast-control data structure associating each request for service with one of predefined aggregated streams. Each aggregated stream is specific to a predefined view region of the plurality of predefined view regions and a client-device type of the set of predefined client-device types.

In accordance with a further aspect, the invention provides a method of streaming, implemented at a streaming server. The method comprises steps of:
   (a) content filtering a pure video signal faithfully representing a panoramic field of view to produce a plurality of view-region-specific video signals corresponding to a plurality of predefined view regions within the panoramic field of view;
   (b) forming multiple aggregated streams, where each aggregated stream comprises a view-region-specific video signal adapted to a client-device type of a plurality of predefined client-device types;
   (c) extracting a derivative video signal from the pure video signal;
   (d) broadcasting the derivative video signal to a plurality of client devices communicatively coupled to the streaming server;
   (e) receiving, from responding client devices, indications of respective client-device types and respective view regions of interest based on displays, at the responding client devices, of the derivative video signal;
   (f) for each responding client device: determining a respective predefined view region based on proximity to an indicated view region of interest; associating the responding client device with an aggregated stream corresponding to the respective predefined view region and a respective client-device type; and
   (g) multicasting, through a network, each aggregated stream to respective associated client devices.

A multicast data structure is used for routing the aggregated streams. The data structure stores for each aggregated stream a respective list of network addresses of all associated client devices designated to receive the aggregated stream.

Extracting the derivative video signal from the pure video signal comprises selecting distant frames of the pure video signal where the separation of successively selected frames exceeds a predefined lower bound.

The derivative video signal is transcoded to produce several transcoded derivative video signals, each compatible with a respective client-device type of the plurality of predefined client-device type, prior to broadcasting to the plurality of client devices.

According to an implementation, the indicated view region of interest is based on a central point within a display of the derivative video signal and the proximity of a predefined view region to the indicated view region of interest is determined according to Euclidean distances between the central point and centroids of the predefined view regions.

According to another implementation, the indicated view region of interest is based on vertices of a predefined regular polygon within a display of the derivative video signal and the proximity of a predefined view region to the indicated view region of interest is determined according to intersections of the regular polygon with the predefined view regions.

BRIEF DESCRIPTION OF THE DRAWINGS

Embodiments of the present invention will be further described with reference to the accompanying exemplary drawings, in which:

FIG. 32 illustrates a streaming-control table maintained at the panoramic multimedia server for a specific video-source, in accordance with an embodiment of the present invention;

FIG. 34 illustrates a table recording a count of viewing-preference patterns for each type of client devices, in accordance with an embodiment of the present invention;

FIG. 46 illustrates a multicast table used for tracking the formation of streams.

TERMINOLOGY

Figure 1:
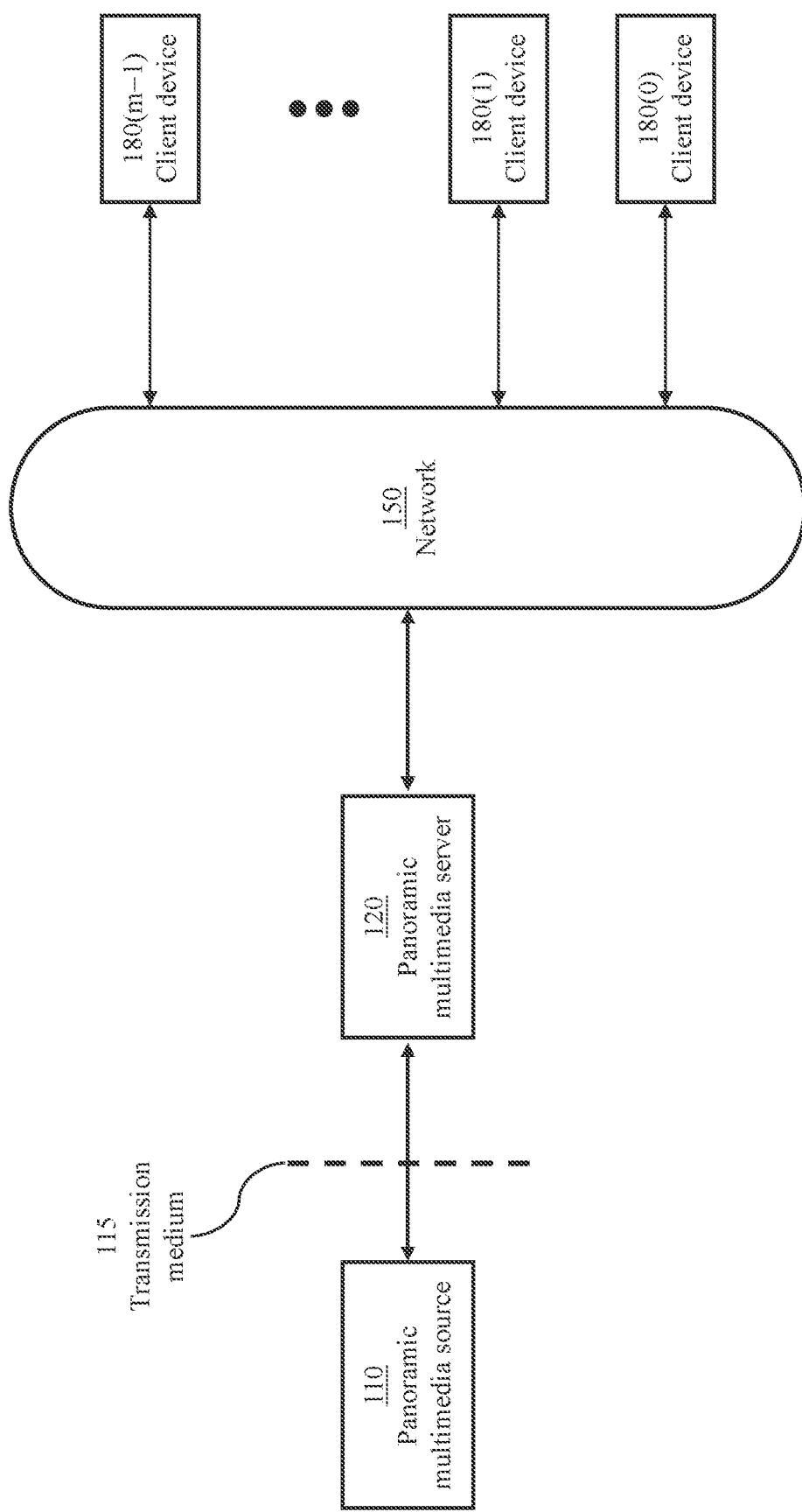
FIG. 1 illustrates a system for panoramic multimedia streaming comprising a panoramic multimedia source and a panoramic multimedia server, in accordance with an embodiment of the present invention.

Signal: A data stream occupying a time window is herein referenced as a "signal". The duration of the time window may vary from a few microseconds to several hours.

Coverage of a video signal: The coverage (or spatial coverage) of a video signal is defined herein as the solid angle subtended by a space visible to a camera that produces the video signal.

Full-coverage video signal: A video signal of coverage of $4\pi$ steradians is referenced as a full-coverage video signal.

Attainable-coverage video signal: A full-coverage video signal is produced by an ideal camera. The actual coverage of a video signal produced by a camera is referenced as the attainable coverage.

Partial-coverage video signal: A video signal of coverage less than the attainable coverage is referenced as a partial-coverage video signal.

Panoramic video signal: A video signal of an attainable coverage approximating full coverage is referenced as a panoramic video signal.

Panoramic multimedia signal: A composite signal comprising audio signals, image signals, text signals, and a panoramic video signal is herein called a panoramic multimedia signal.

Partial-coverage multimedia signal: A composite signal comprising audio signals, image signals, text signals, and a partial-coverage video signal is herein called a partial-coverage multimedia signal.

Full-coverage camera (or 4π camera): A camera producing a full-coverage video signal is herein referenced as a full-coverage camera or a 4π camera.

Source: A panoramic multimedia source comprises a full-coverage camera as well as de-warping and decompression modules; the term "source" is used herein to refer to a panoramic multimedia source.

Signal filtering: The term signal filtering refers to conventional operations performed at a signal receiver to eliminate or reduce signal degradation caused by noise and delay jitter; a signal-filtering process does not alter the content of the signal.

Content filtering: The term refers to a process of modifying the information of a signal (following a process of signal filtering) to retain only specific information; content-filtering of a full-coverage (attainable coverage) video signal yields a partial-coverage video signal corresponding to a reduced (focused) view region.

Raw video signal: The signal produced by a camera is referenced as a "raw video signal".

Corrected video signal: A de-warped raw video signal is referenced as a "corrected video signal".

Compressed video signal: A compressed raw video signal is referenced as a "compressed video signal".

Compact video signal: A compressed corrected signal is referenced as a "compact video signal".

Rectified video signal: Processes of de-warping a raw video signal followed by compression, then decompression or processes of compressing a raw video signal followed by decompression and de-warping yield a rectified video signal.

Pure video signal: A corrected video signal or a rectified video signal is referenced herein as a pure video signal. A pure video signal corresponds to the respective scene captured at source.

Signal sample: The term refers to a video signal of full coverage (attainable coverage) derived from a pure video signal, or from a transcoded video signal derived from the pure video signal. The flow rate (bit rate) of a signal sample would be substantially lower than the flow rate of the video signal from which the signal sample is derived. A signal sample is sent to a client device to enable a viewer at the client device to select and identify a preferred view region.

Source video signal: A video signal received at a panoramic multimedia server from a panoramic multimedia source is referenced as a "source video signal"; a source video signal may be a raw video signal, corrected video signal, compressed video signal, or a compact video signal.

Source multimedia signal: A multimedia signal received at a panoramic multimedia server from a panoramic multimedia source is referenced as a "source multimedia signal"; a source multimedia signal may contain a source video signal in addition to signals of other forms such as an audio signal or a text signal.

Derivative video signal: In order to enable a user of a client device to dynamically select a viewing region, considering that the flow rate of an appropriately compressed high-fidelity video signal covering the entire field of view may exceed the available transmission capacity of a network path from a streaming server 120 to a client device 180, a derivative video signal of the full-coverage pure video signal having a flow rate not exceeding available transmission capacity is generated and communicated to the user. The derivative video signal may be generated as a frame-sampled video signal of a constant flow rate not exceeding a predefined nominal flow rate. Upon displaying the derivative signal, the user would be able to clearly recognize the field of view, define a viewing region of interest, and communicate respective parameters to the streaming server.

Aggregated stream: An aggregated stream comprises a view-region-specific video signal (which may be compressed) directed to client devices of a same type Transmitter: The term refers to the conventional device which modulates a carrier wave (an optical carrier or a microwave carrier) with a baseband signal to produce a modulated carrier.

Receiver: The term refers to the conventional device which demodulates a modulated carrier to extract the transmitted baseband signal.

Processor: The term refers to a hardware device (a physical processing device)

Gb/s, Mb/s: Gigabits/second ($10^9$ bits/second), Megabits/second ($10^6$ bits/second)

The server of the present invention receives and disseminates panoramic multimedia signals. A panoramic multimedia signal contains a panoramic video signal in addition to signals of other forms, such as an audio signal and text. The description and the claimed subject mater focus on novel features relevant to the video-signal component. However, it is understood that the server delivers to client devices edited panoramic video signals together with signals of other types.

REFERENCE NUMERALS

100: System for streaming panoramic multimedia signals
110: Panoramic multimedia source
115: Transmission medium
120: Universal streaming server (referenced as a "server" for brevity)
150: Network
180: Client device
200: Streaming system comprising multiple sources and multiple servers
310: Panoramic 4π camera
312: Raw signal
320: De-warping module at server
322: Corrected signal
324: Rectified signal
330: De-warping module at source
340: Compression module
342: Compressed signal
343: Compact signal
350: Decompression module
352: Decompressed signal
420: Pure video signal
460: Signal-editing module
480: High-capacity path
490: Lower-capacity path
500: First communication path
520: Source transmitter
528: Modulated carrier signal to server

540: Server receiver
542: Baseband signal (warped)
560: Interfaces to client-devices
585: Modulated carrier signals to clients
600: Second communication path
628: Modulated carrier signal to server
642: Baseband signal (de-warped)
685: Modulated carrier signals to clients
700: Third communication path
720: Source transmitter
728: Modulated carrier signal to server
740: Server receiver
742: Baseband signal (warped, compressed)
785: Modulated carrier signals to clients
800: Fourth communication path
828: Modulated carrier signal to server
842: Baseband signal (de-warped, compressed)
885: Modulated carrier signals to clients
910: Upstream control signals from client devices
912: Downstream control signals to client devices
920: Pure video signal
921: Control data from panoramic multimedia source
922: Control data to panoramic multimedia source
940: Edited multimedia signals to client devices
1000: Components of a server
1005: All data from/to sources and client devices
1008: At least one dual link to network
1010: Server-network interface
1022: Source control-data module
1024: Source signal-processing module
1026: Client control-data module
1060: Client-specific adaptation module
1061: Client control bus
1090: Combiner of edited multimedia signals
1120: Content-filtering module; also called "content filter" for brevity
1122: Content-filtered video signal
1132: Content-filtered transcoded video signal
1140: Transcoding module
1142: Transcoded content-filtered video signal
1152: Transcoded video signal
1160: Server compression module
1220: Mean bit rate
1225: Effective bit rate
1230: Specified peak bit rate
1300: Selective-viewing options
1320: Frame-sampling module
1322: Full-coverage frame-sampled signal
1340: Spatial-temporal server compression module
1342: Full-coverage compressed signal
1360: Spatial-temporal server compression module
1362: Succession of pre-selected content-filtered signals
1364: Succession of partial-coverage signals
1402: Message from client to server requesting server
1404: Message from client to server defining a selected view region
1440: Compressed content-filtered video signal from server to client
1600: Basic components of signal-editing module
1610: Content-filtering stage
1612: Selected content
1630: Signal-processing unit
1650: Conditioned multimedia signals to a set of client devices
1720: Content identifier
1840: Transcoding module
1842: Signal adapted to a client device
1860: Flow-rate adaptation modules
1861: Buffer for holding a data block
1862: Memory device storing processor-executable instruction for flow-rate adaptation
1900: Exemplary implementation of a signal-editing module
1922: Buffer for holding a data block of a content-filtered signal
1923: memory device storing processor executable instructions which cause a processor to modify the frame rate and/or resolution
2000: Processes of video signal editing for a target client device
2012: Identifier of a preferred view region
2014: Traffic-performance measurements
2016: Nominal frame rate and frame resolution
2030: Server compression module
2040: Module for determining a permissible flow rate as well as a frame rate and frame resolution, compatible with a target client device
2050: Transmitter
2052: Video signal together with accompanying multimedia signals (such as audio signals and/or text) and control signals
2060: Network path
2110: Process of determining requisite flow rate at the display device of the target client device
2120: process of determining a permissible flow rate (reference 2122) between the server and the target client device
2122: Permissible flow rate
2130: Process of determining requisite compression ratio
2140: Process of determining whether a compression ratio is acceptable
2150: Module for determining a revised frame rate and or resolution
2152: Revised frame rate and/or a revised resolution
2210: Memory device storing client-device characterizing data
2220: Memory device storing software instructions for interacting with specific servers
2230: Client transmitter
2240: Client receiver
2242: Interface module
2250: Processor
2260: Memory device holding data blocks of incoming multimedia data
2270: Client decompression module
2280: Memory for holding blocks of display data
2290: Display device
2314: Dual control path between a source 110 and a server 120
2412: Network path
2610: At least one hardware processor
2620: A set of modules devised to process a received panoramic video signal 900
2621: Signal-filtering module
2640: Client-device related modules
2641: Client profile database
2642: Client-device characterization module
2643: Module for signal adaptation to client device
2651: Server-source interface
2652: Source characterization module
2660: Client-specific modules
2661: Server-client interface
2662: Module for signal adaptation to client environment

2663: Module for signal adaptation to client viewing preference
2725: Learning module
2820: Decompression modules and de-warping modules
2830: Module employing at least one respective hardware processor for signal adaptation to client-device type
2925: Memory device storing predefined partial-coverage definitions
2940: Module for signal adaptation to client's device
3010: Process of acquiring a panoramic multimedia signal from a selected panoramic multimedia source
3012: Process of filtering a source video signal to offset degradation caused by noise and delay jitter
3014: Process of decompression of a source video signal if the signal has been compressed at source
3018: Process of video signal de-warping if the signal has not been de-warped at source
3020: Process of receiving a service request from a client
3022: Process of adapting a pure video signal to characteristics of a client's device
3026: Process of compressing a video signal adapted to characteristics of a client device
3028: Process of signal transmission to a client device
3030: A control signal from the client specifying a preferred view region
3032: Process of ascertaining viewing preference
3034: Process of content filtering
3200: Streaming-control table
3300: Process of adaptation of a video-signal for a specific client device
3310: Process of receiving from a client device a request for service at client-interface module
3312: Process of identifying type of client device
3314: Process of determining prior identification of client device
3316: Process of identifying an existing stream category corresponding to a client device type
3320: Process of creating a new stream category for a new device type
3322: Process of adapting a pure video signal to device type
3324: Process of recording new stream category
3326: Process of selecting an existing stream or creating a new stream
3330: Process of signal transmission to a specific client device
3400: Table indicating a count of viewing options for each type of client devices
3540: Router-switch
3541: Input port
3542: Output port
3600: A plurality of predefined view-regions of a panoramic view
3610: A frame of a panoramic view
3620: A predefined view-region
3700: Centroids of the plurality of predefined view-regions
3720: An individual centroid
3800: Selection of a view-region based on a display of a derivative video signal
3812: A sample frame of a panoramic view
3830: A central point of a view-region of interest
3900: Selection of a predefined view-region based on proximity to a view-region of interest
4000: An overview of a method of view-region selection
4010: A process of extracting a derivative video signal from a pure video signal
4020: A process of selecting a view region of interest based on a display of the derivative video signal
4030: A process of determining proximity of a view-region of interest to the predefined view regions
4040: A process of selecting a predefined view region
4100: Detailed processes of view-region selection
4110: A process of generating a pure video signal
4120: A process of generating a set of partial-coverage video signals
4125: A process of transcoding the set of partial-coverage video signals to be compatible with each client-device type of a set of predefined client-device types
4130: A process of generating a frame-sampled video signal
4135: A process of transcoding the frame-sampled video signal to be compatible with each client-device type of a set of predefined client-device types
4140: A process of receiving a service request from a client device
4150: A process of transmitting a transcoded frame-sampled signal
4160: A process of receiving an identifier of a preferred view region
4170: A process of selecting a close predefined view region
4180: A process of transmitting a transcoded partial-coverage video signal corresponding to the close predefined view region
4200: A configuration of a control system of a server 120
4210: A network interface
4220: A module for generating a pure video signal.
4230: A module for generating view-region-specific video signals
4240: A module for generating frame-sampled video
4250: A data buffer
4260: A module for interacting with a client device to identify a view region of interest
4270: A module for selecting and streaming a view-region-specific video signal
4300: A first streaming-server configuration
4310: A source video signal
4320: A signal-processing unit
4330: A pure video signal
4340: A transcoding unit for adapting the pure video signal to a client-type pure video signal compatible with a specific client-device type
4341: Device-adapted pure video signal
4350: A content filter for extracting, from a client-type-adapted pure video signal, a partial-coverage video signal corresponding to a specific view region—the content filter may further compress the partial-coverage video signal
4360: An output channel carrying a partial-coverage video signal to an input port of a temporal multiplexer 4370
4370: A temporal multiplexer combining a number of partial-coverage video signals into a stream of partial-coverage video signals
4380: A channel connecting a temporal multiplexer 4370 to network 150
4400: A second streaming-server configuration
4440: A content filter for extracting, from a pure video signal, a partial-coverage video signal corresponding to a specific view region.
4441: Extracted partial-coverage (view-region-specific) video signals
4450: A transcoding unit for adapting a partial-coverage video signal to be compatible with a specific client-device type—the transcoding unit may further compress the adapted partial-coverage video signal

4460: An output channel carrying a transcoded partial-coverage video signal to an input port of a temporal multiplexer 4370

4500: A method of forming multicast streams

4510: A process of defining aggregate streams based on predefined view regions and client-device types

4520: A process of extracting a derivative video signal

4530: A process of broadcasting the derivative video

4540: A process of receiving an indication of a view region of interest

4550: A process of selecting a predefined view region

4560: A process of streaming partial-coverage video signals through a network

4600: Multicast table

4650: Identifiers, including network addresses, of client devices to receive a common stream

DETAILED DESCRIPTION

FIG. 1 illustrates a streaming system 100 comprising a panoramic multimedia source 110 coupled to a panoramic multimedia server 120 through a transmission medium 115. Transmission medium 115 may be a dedicated medium, such as a fiber-optic link or a wireless link, or may be a switched path through a shared telecommunication network. The panoramic multimedia server may communicate with a plurality of client devices 180 through a network 150.

Figure 2:
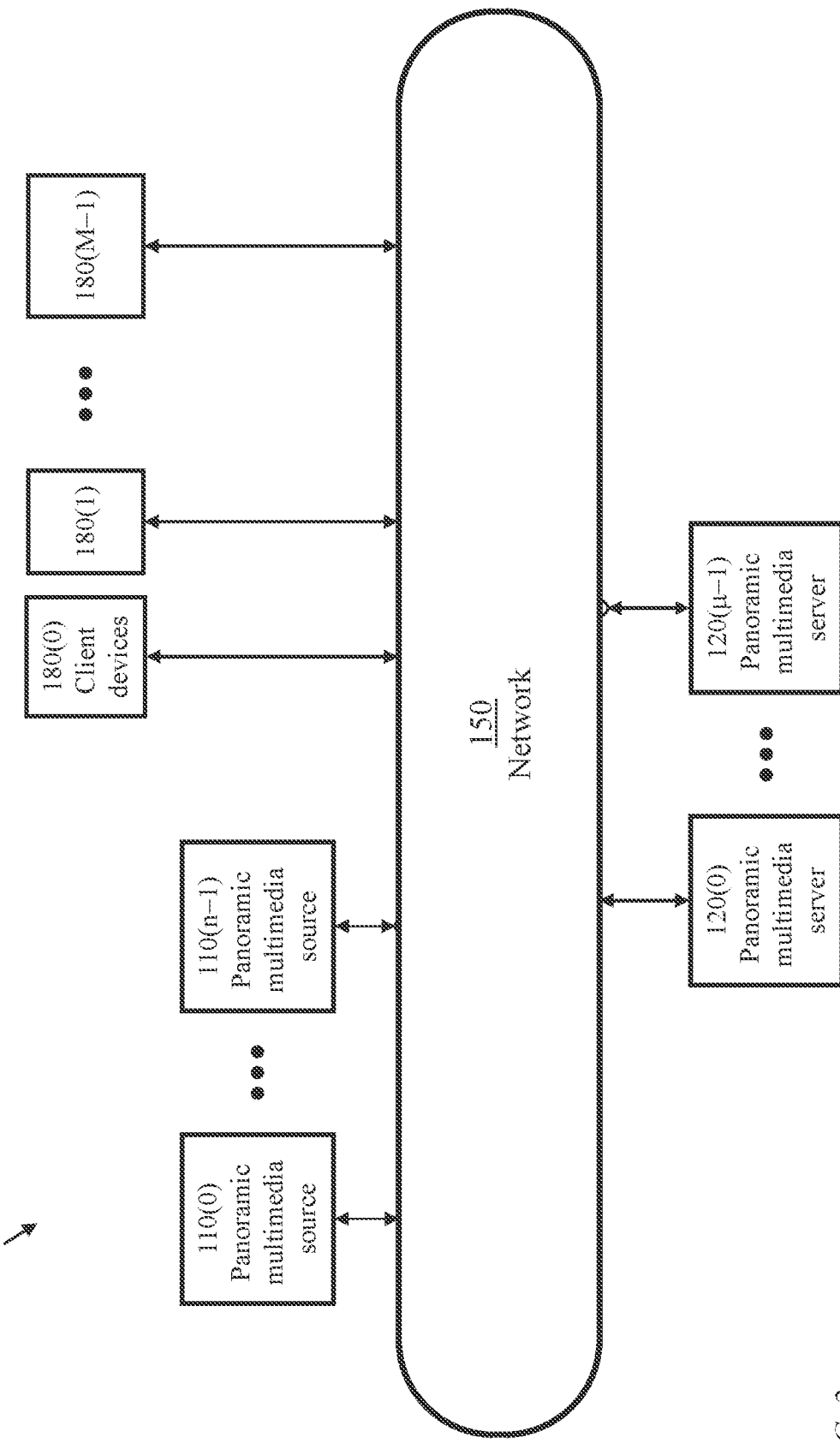
FIG. 2 illustrates a system for panoramic multimedia streaming comprising multiple panoramic multimedia sources and multiple panoramic multimedia servers, in accordance with an embodiment of the present invention.

FIG. 2 illustrates a streaming system 200 comprising a number n, n≥1, of panoramic multimedia sources 110, individually identified as 110(0) to 110(n−1), and a number μ of panoramic multimedia servers, μ≥1, individually identified as 120(0) to 120(μ−1) which may simultaneously serve a number M, M>1, of client devices of a plurality of client devices 180. The panoramic multimedia servers 120 may communicate with the panoramic multimedia sources 110 and the client devices through network 150. Alternatively, the panoramic multimedia servers 120 may communicate with the panoramic multimedia sources 110 through one shared network (not illustrated) but communicate with the client devices 180 through another network (not illustrated).

A multimedia panoramic source 110 preferably employs a full-coverage panoramic camera, herein referenced as a 4π camera, providing view coverage of up to 4π steradians. An output signal of a 4π camera is herein referenced as a 4π video signal. A display of a 4π video signal of a captured scene on a flat screen may differ significantly from the actual scene due to inherent warping. To eliminate or significantly reduce the display distortion, an artificial offset distortion may be applied to the camera-produced signal so that the display closely resembles a captured scene. Numerous processes, called "de-warping", for correcting the distorted video signal are known in the art.

The de-warping process may be implemented at source, i.e., directly applied to a camera's output signal, or implemented at the panoramic multimedia server 120.

The video signal at a source 110 may be sent directly to a panoramic multimedia server 120 over a high-capacity communication path or compressed at source to produce a compressed signal, occupying a (much) reduced spectral band, which is sent to a panoramic multimedia server 120 over a lower-capacity communication path to be decompressed at the panoramic multimedia server.

Figure 3:
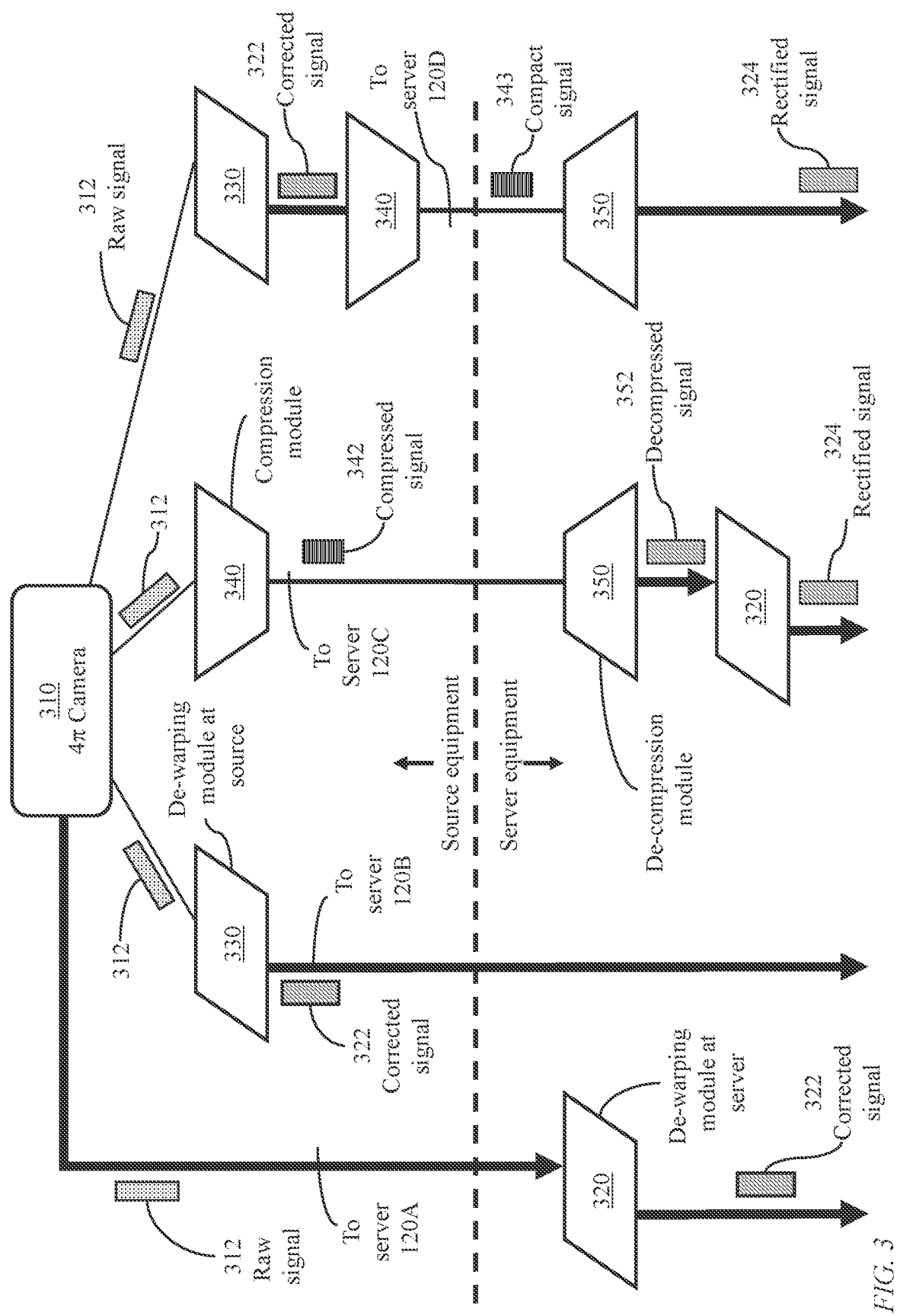
FIG. 3 illustrates communication options between a panoramic multimedia source and a panoramic multimedia server, in accordance with an embodiment of the present invention.

FIG. 3 illustrates four communication options between a 4π source 110 and a server 120. The source includes a 4π camera which produces a raw signal 312. The raw signal 312 need be de-warped before display or before further processing to condition the signal to specific recipients.

According to one embodiment, the raw signal 312 may be sent to a server 120A equipped with a de-warping module 320 which produces a corrected signal 322 which is further processed to produce recipient-specific signals.

According to another embodiment, the raw signal 312 may be processed at a de-warping module 330 coupled to the source 110 to produce a corrected signal 322 which is sent to a server 120B for further processing to produce recipient-specific signals.

According to a further embodiment, the raw signal 312 may be processed at a compression module 340 coupled to the source 110 to produce a compressed signal 342 which is sent to a server 120C. Server 120C is equipped with a decompression module 350 which de-compresses compressed signal 342 to produce a decompressed signal 352 to be processed at de-warping module 320 to produce a rectified signal 324. With a lossless compression process and an ideal decompression process, the decompressed signal 352 would be a replica of raw signal 312. With ideal de-warping, rectified signal 324 would be a faithful representation of the captured scenery.

According to a further embodiment, the raw signal 312 may be processed at a de-warping module 330 coupled to the source 110 to produce a corrected signal 322 which is processed at a compression module 340 to produce a compact signal 343 to be sent to a server 120D. Server 120D is equipped with a decompression module 350 which de-compresses compact signal 343 to produce a rectified signal 324. With an ideal de-warping module 330, a lossless compression process, and an ideal decompression process, the rectified signal would be a faithful representation of the captured scenery.

Figure 4:
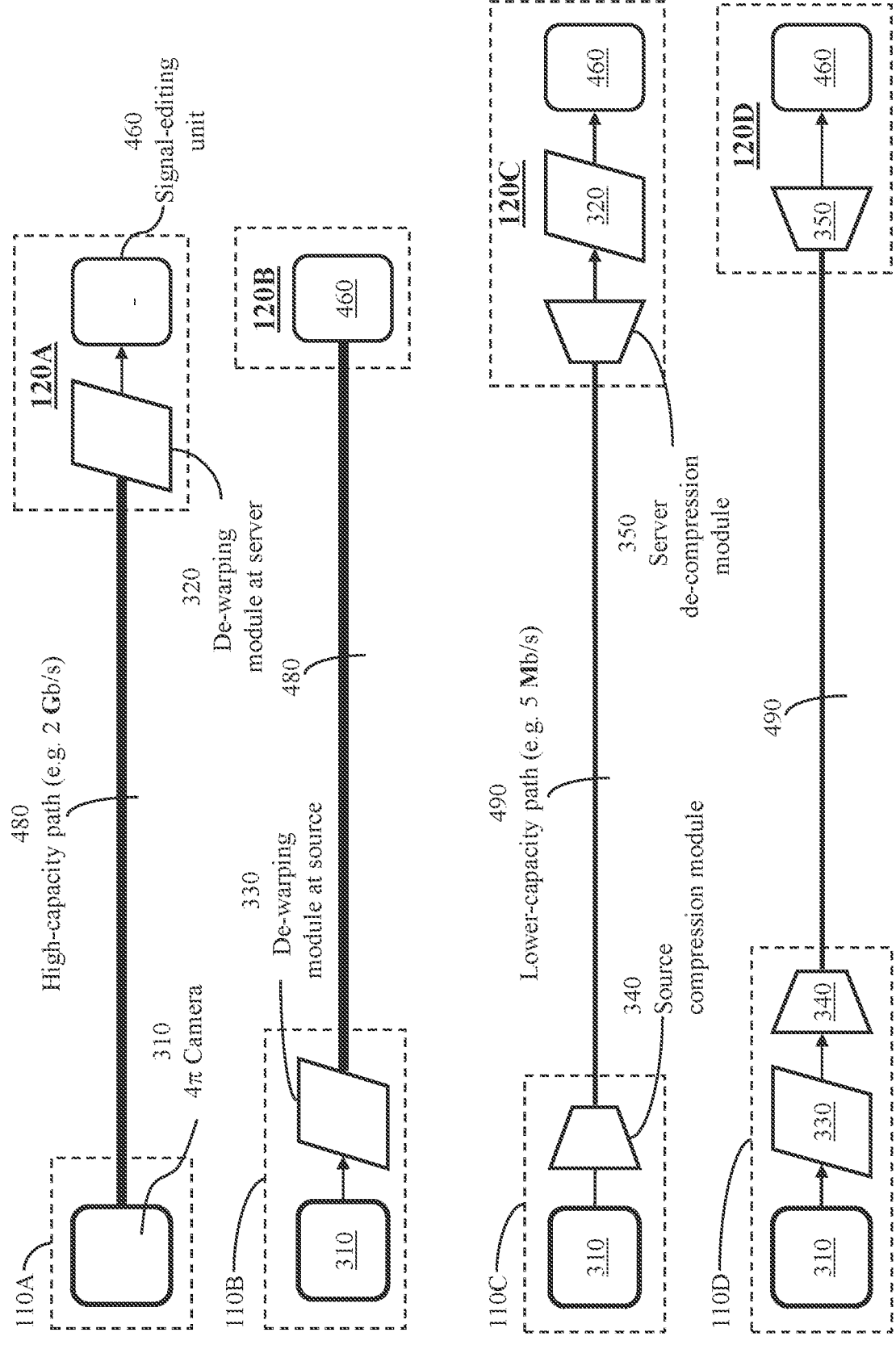
FIG. 4 illustrates communication paths corresponding to the communication options of FIG. 3.

FIG. 4 illustrates communication paths corresponding to the communication options of FIG. 3.

According to the first communication option, a panoramic signal produced at a 4π camera 310, of panoramic multimedia source module 110A, is transmitted over a high-capacity path 480 to server 120A which comprises a de-warping module 320 and a signal-editing unit 460 which performs both content filtering and signal adaptation to client devices and flow-rate constraints. Server 120A comprises at least one processor (not illustrated in FIG. 4) and memory devices storing processor executable instructions (software instructions) organized as the de-warping module 320 and the signal-editing unit 460. The software instructions of de-warping module 320 are executed to cause the at least one processor to use the received signal and known characteristics of the camera to produce a de-warped corrected signal 322 which may be directly presented to a flat display device or further processed in signal-editing unit 460. Signal-editing unit 460 may perform content filtering processes to produce selective partial-coverage streams, each tailored to a respective recipient. Signal-editing unit 460 may also produce full-coverage streams each tailored to a respective recipient.

According to the second communication option, source module 110B comprises a 4π camera 310, a de-warping module 330, and a processor (not illustrated) applying software instructions of de-warping module 330 to the output signal (raw signal 312) of the 4π camera. The resulting de-warped signal is sent over a high-capacity communication path 480 to server 120B which comprises a signal-editing unit 460 as in the first implementation above.

According to the third communication option, source module 110C comprises a 4π camera 310, a compression module 340, and a processor (not illustrated) applying software instructions of compression module 340 to the output signal (raw signal 312) of the 4π camera. The resulting compressed signal 342 is sent over a lower-capacity communication path 490 to server 120C which comprises a decompression module 350, a de-warping module 320, and signal-editing unit 460. Server 120C comprises at least one processor (not illustrated) which implements software instructions of decompression module 350 to produce decompressed signal 352. The at least one processor also implements software instructions of the de-warping module 320 to produce a rectified signal 324. Signal-editing unit 460 processes rectified signal 324 to perform content filtering processes to produce selective partial-coverage streams, each tailored to a respective recipient. Signal-editing unit 460 may also produce full-coverage streams each tailored to a respective recipient.

According to the fourth communication option, source module 110D comprises a 4π camera 310, a de-warping module 330, a compression module 340, and a processor (not illustrated) applying software instructions of the de-warping module 330 to the output signal (raw signal 312) of the 4π camera to produce a corrected signal 322. The processor applies the software instructions of the compression module 340 to produce a compact signal 343. The compact signal 343 is sent over a lower-capacity communication path 490 to server 120D which comprises a decompression module 350 and the signal-editing unit 460. Server 120D comprises at least one processor (not illustrated) which implements software instructions of decompression module 350 to reconstruct the corrected signal 322. As in the previous communication options, signal-editing unit 460 processes rectified signal 324 to perform content filtering processes to produce selective partial-coverage streams, each tailored to a respective recipient. Signal-editing unit 460 may also produce full-coverage streams each tailored to a respective recipient.

With the first or second communication option, a corrected video signal 322 is presented to a signal-editing unit 460. With the third or fourth communication options, a rectified video signal 324 is presented to a signal-editing unit 460. Both the corrected video signal 322 and the rectified video signal 324 are considered pure video signals closely representing a respective scene.

Figure 5:
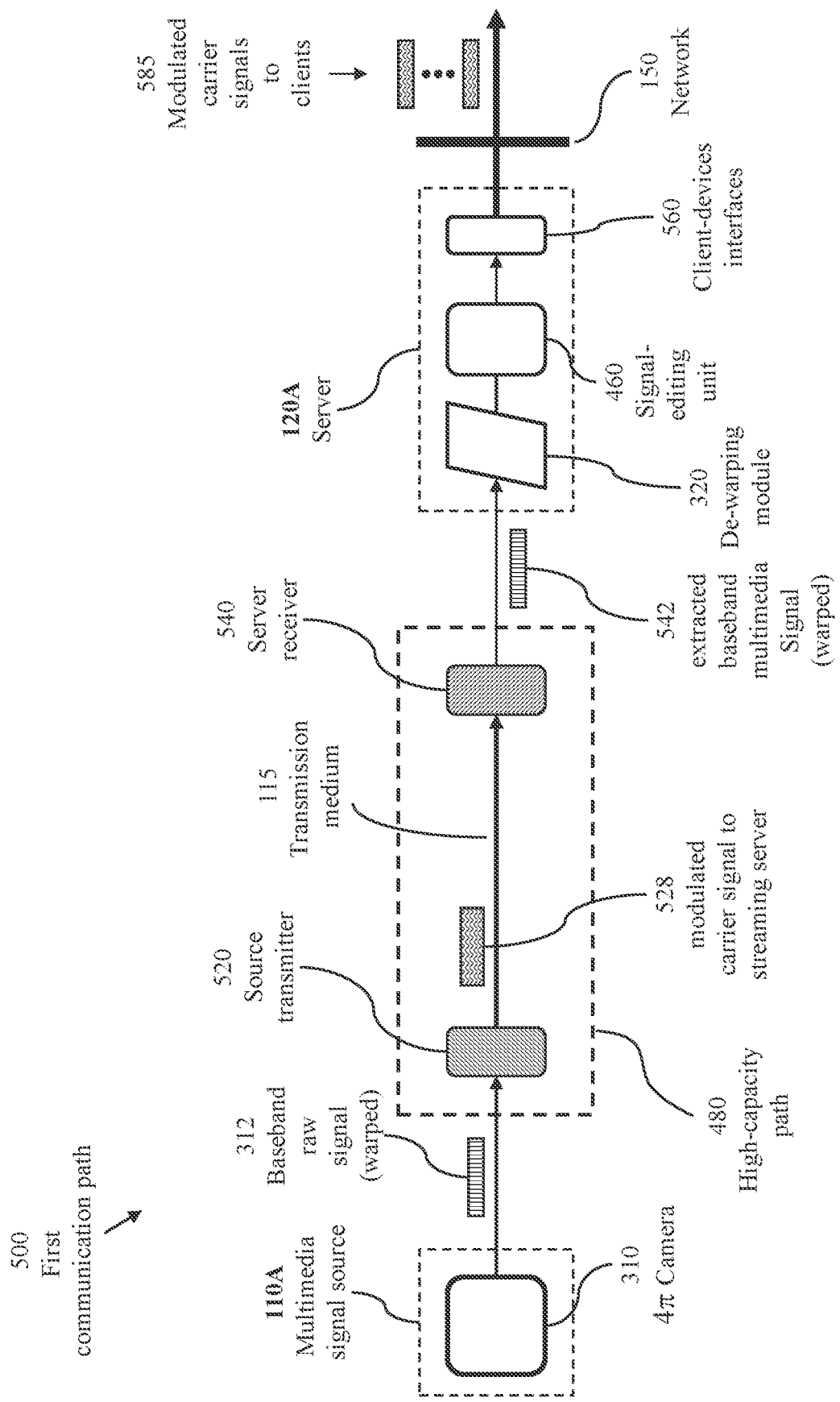
FIG. 5 illustrates components of an end-to-end path corresponding to a first communication option of the communication options of FIG. 3, in accordance with an embodiment of the present invention.

FIG. 5 illustrates components of an end-to-end path 500 corresponding to the first communication option of the communication options of FIG. 3. Source 110A produces (baseband) raw signal 312 which is transmitted over high-capacity path 480 to server 120A. The high-capacity path 480 comprises a source transmitter 520 collocated with source 110A, transmission medium 115, and server receiver 540 collocated with server 120A. Receiver 540 demodulates modulated carrier signal 528 received through transmission medium 115 to acquire a replica 542 of the raw signal 312. Server 120A comprises a memory device storing software instructions constituting de-warping module 320 and a memory device storing software instructions constituting signal-editing unit 460. Server 120A also comprises client-devices interfaces 560 which include server transmitters. Output signals 585 of server 120A are communicated through network 150 to respective client devices 180.

Figure 6:
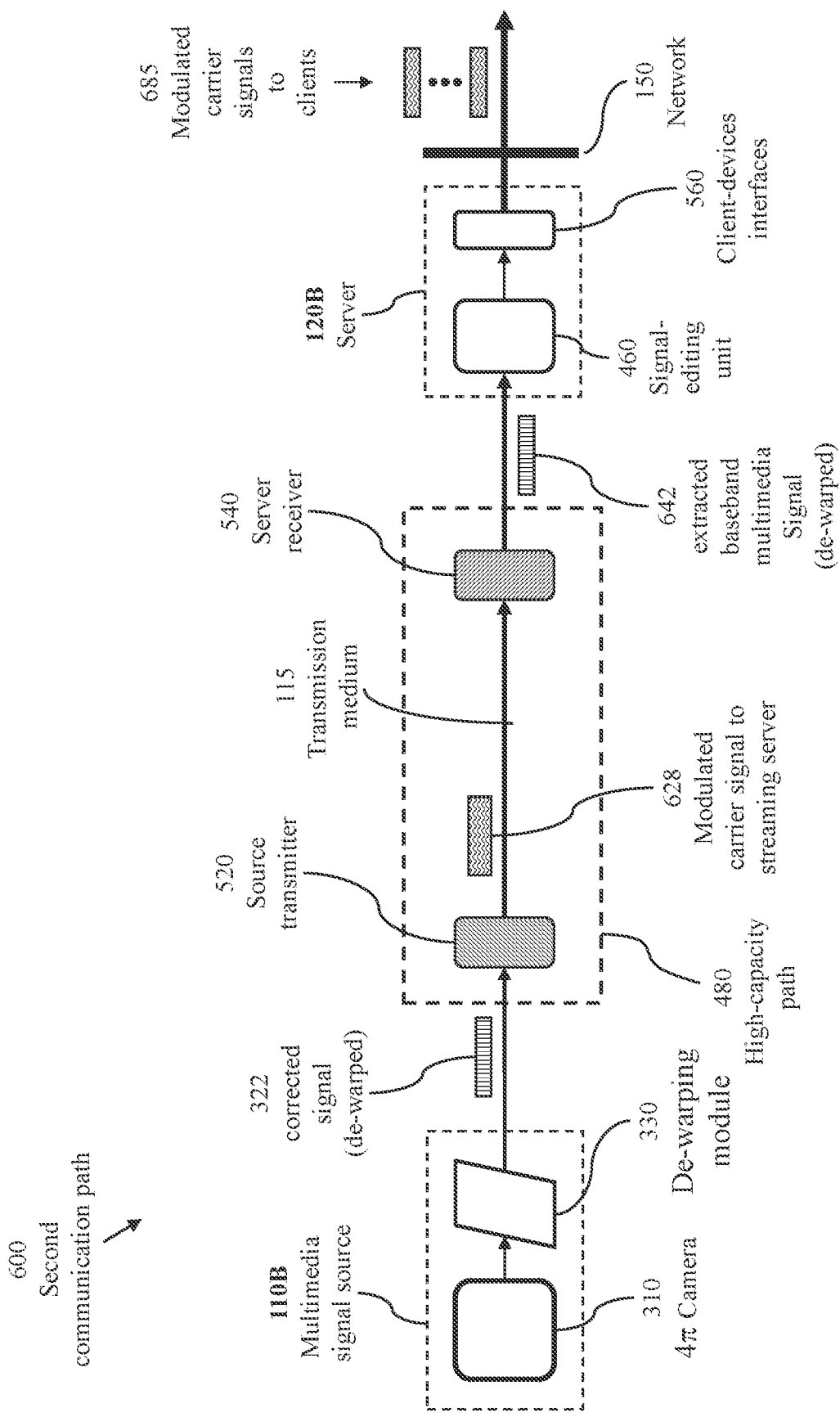
FIG. 6 illustrates components of an end-to-end path corresponding to a second communication option of the communication options of FIG. 3, in accordance with an embodiment of the present invention.

FIG. 6 illustrates components of an end-to-end path 600 corresponding to the second communication option of the communication options of FIG. 3. Source 110B comprises 4π camera 310 and a memory device storing software instructions constituting de-warping module 330 which cause a processor (not illustrated) to produce corrected signal 322. Corrected signal 322 is transmitted over high-capacity path 480 to server 120B. The high-capacity path 480 comprises a source transmitter 520 collocated with source 110B, transmission medium 115, and server receiver 540 collocated with server 120B. Receiver 540 demodulates modulated carrier signal 628 received through transmission medium 115 to acquire a replica 642 of the corrected signal 322. Server 120B comprises a memory device storing software instructions constituting signal-editing unit 460. Server 120B also comprises client-devices interfaces 560 which include server transmitters. Output signals 685 of server 120B are communicated through network 150 to respective client devices 180.

Figure 7:
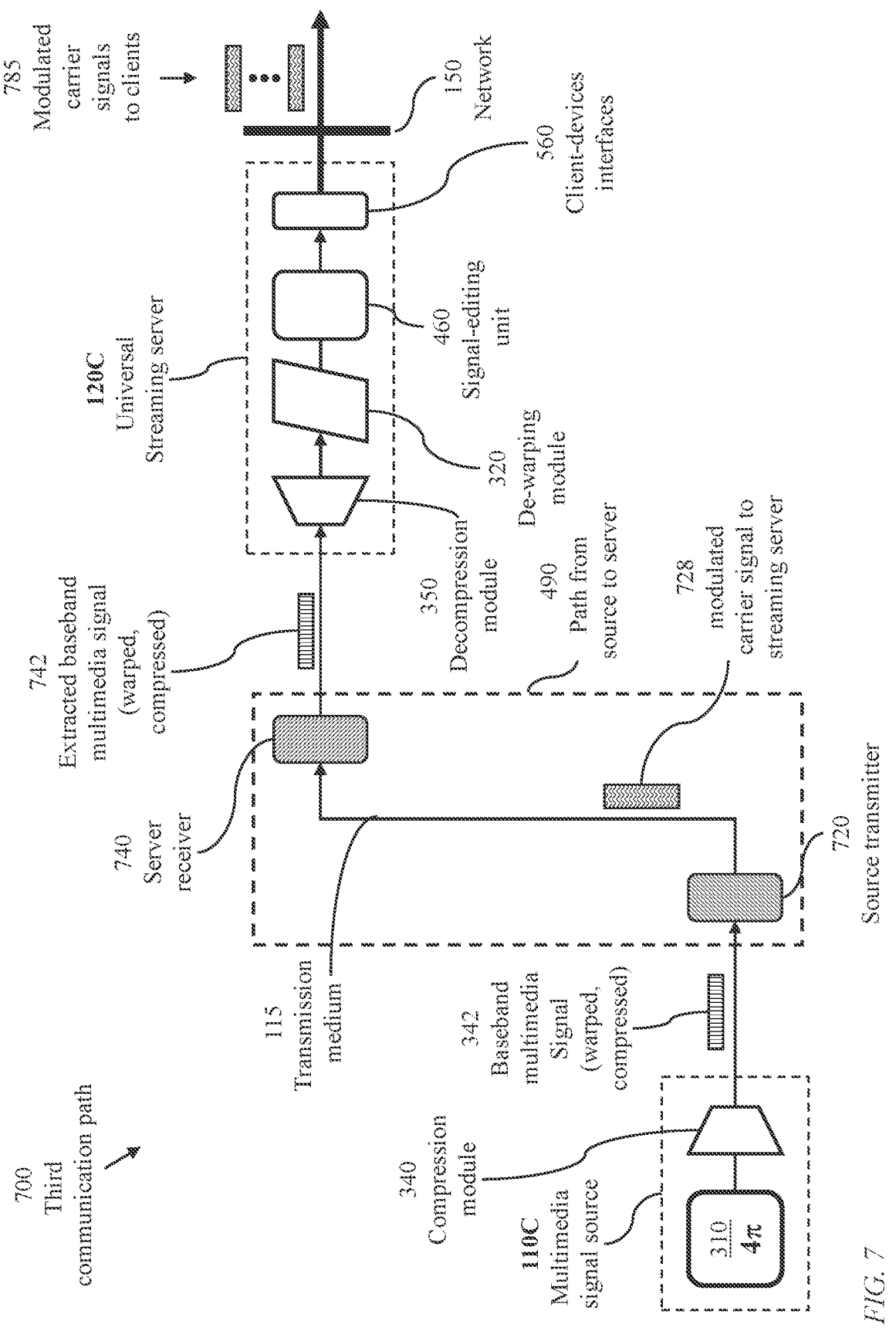
FIG. 7 illustrates components of an end-to-end path corresponding to a third communication option of the communication options of FIG. 3, in accordance with an embodiment of the present invention.

FIG. 7 illustrates components of an end-to-end path 700 corresponding to the third communication option of the communication options of FIG. 3. Source 110C comprises 4π camera 310, which produces (baseband) raw signal 312, and a memory device storing software instructions constituting compression module 340. Compression module 340 compresses raw signal 312 into compressed signal 342 which is transmitted over path 490 to server 120C. Path 490 comprises a source transmitter 720 collocated with source 110C, transmission medium 115, and server receiver 740 collocated with server 120C. Receiver 740 demodulates modulated carrier signal 728 received through transmission medium 115 to acquire a replica 742 of compressed signal 342. Server 120C comprises a memory device storing software instructions constituting decompression module 350, a memory device storing software instructions constituting de-warping module 320, and a memory device storing software instructions constituting signal-editing unit 460. Server 120C also comprises client-devices interfaces 560 which include server transmitters. Output signals 785 of server 120C are communicated through network 150 to respective client devices 180.

Figure 8:
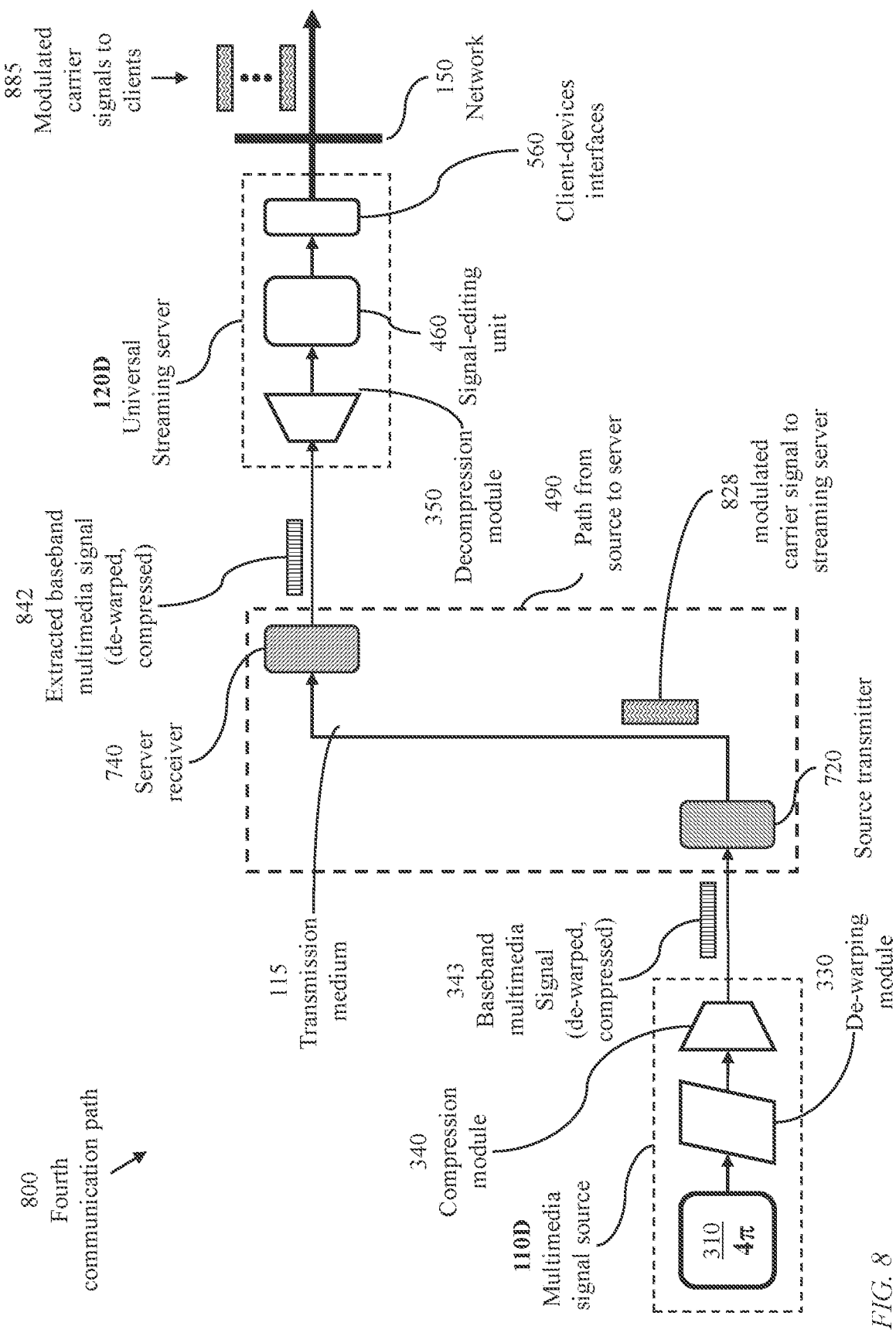
FIG. 8 illustrates components of an end-to-end path corresponding to a fourth communication option of the communication options of FIG. 3, in accordance with an embodiment of the present invention.

FIG. 8 illustrates components of an end-to-end path 800 corresponding to the fourth communication option of the communication options of FIG. 3. Source 110D comprises 4π camera 310, a memory device storing software instructions constituting de-warping module 330 which cause a processor (not illustrated) to produce corrected signal 322, and a memory device storing software instructions constituting compression module 340 which cause a processor (not illustrated) to produce compact signal 343. Compact signal 343 is transmitted over path 490 to server 120D. Path 490 comprises a source transmitter 720 collocated with source 110D, transmission medium 115, and server receiver 740 collocated with server 120C. Receiver 740 demodulates modulated carrier signal received through transmission medium 115 to acquire a replica 842 of compact signal 343. Server 120D comprises a memory device storing software instructions constituting decompression module 350, and a memory device storing software instructions constituting signal-editing unit 460. Server 120D also comprises client-devices interfaces 560 which include server transmitters. Output signals 885 of server 120D are communicated through network 150 to respective client devices 180.

Figure 9:
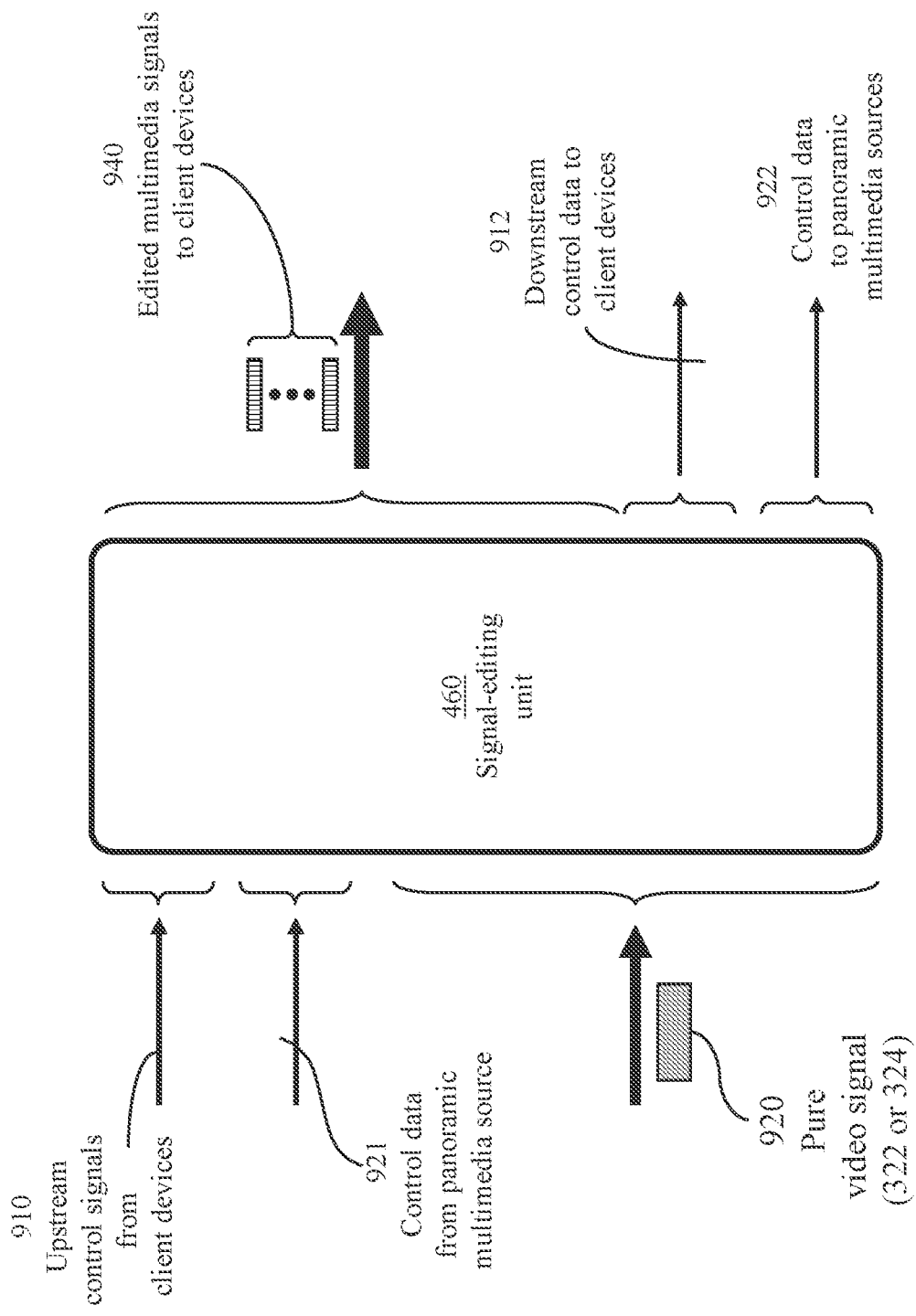
FIG. 9 illustrates multimedia signals and control signals at input and output of a signal-editing unit of a panoramic multimedia server, in accordance with an embodiment of the present invention.

FIG. 9 illustrates input and output signals of a signal-editing unit 460 of a server 120.

The server 120 receives from a source 110 multimedia signals including video signals which may be a raw signal 312, a corrected signal 322, a compressed signal 342, or a compact signal 343. A video signal received at a server from a source 110 is herein referenced as a "source video signal".

The server 120 may receive multimedia signals from different panoramic multimedia sources 110 as illustrated in FIG. 2. The server may, therefore receive a raw video signal 312 from a first source 110, a corrected video signal 322 from a second source 110, a compressed signal 342 from a third source, and/or a compact signal 343 from a fourth source. Preferably, then, the server may be equipped with a de-warping module 320 and a decompression module 350 to be able to engage with sources 110 of different types and produce a pure video signal 920 which may be a corrected video signal 322 or a rectified video signal 324.

The server receives upstream control signals 910 from client devices 180 and control signals 921 from a source 110. The server transmits downstream control signals 912 to client devices and may transmit control data 922 to the source 110. Regardless of the source type, the kernel of the server, which is signal-editing unit 460, processes the pure video signal 920 based on control signals 910 and 921.

The upstream control signals 910 may include clients' characterizing data and clients' requests. The downstream control signals 912 may include responses to clients' requests. The downstream control signals 912 may also include software modules to be installed at client devices 180 to enable each subtending client device to communicate preferred viewing regions to the server. Control data 921 may include data relevant to source characteristics and operations already performed at source, such as de-warping and/or data compression. Control data 922 may include data characterizing the server.

The signal-editing unit 460 produces edited multimedia signals 940, each edited multimedia signal being individually conditioned to: viewing preference of a respective client; capability of a respective client's device; and condition of a network path from the server to the respective client's device. The server 120 transmits to client devices the edited multimedia signals 940.

Figure 10:
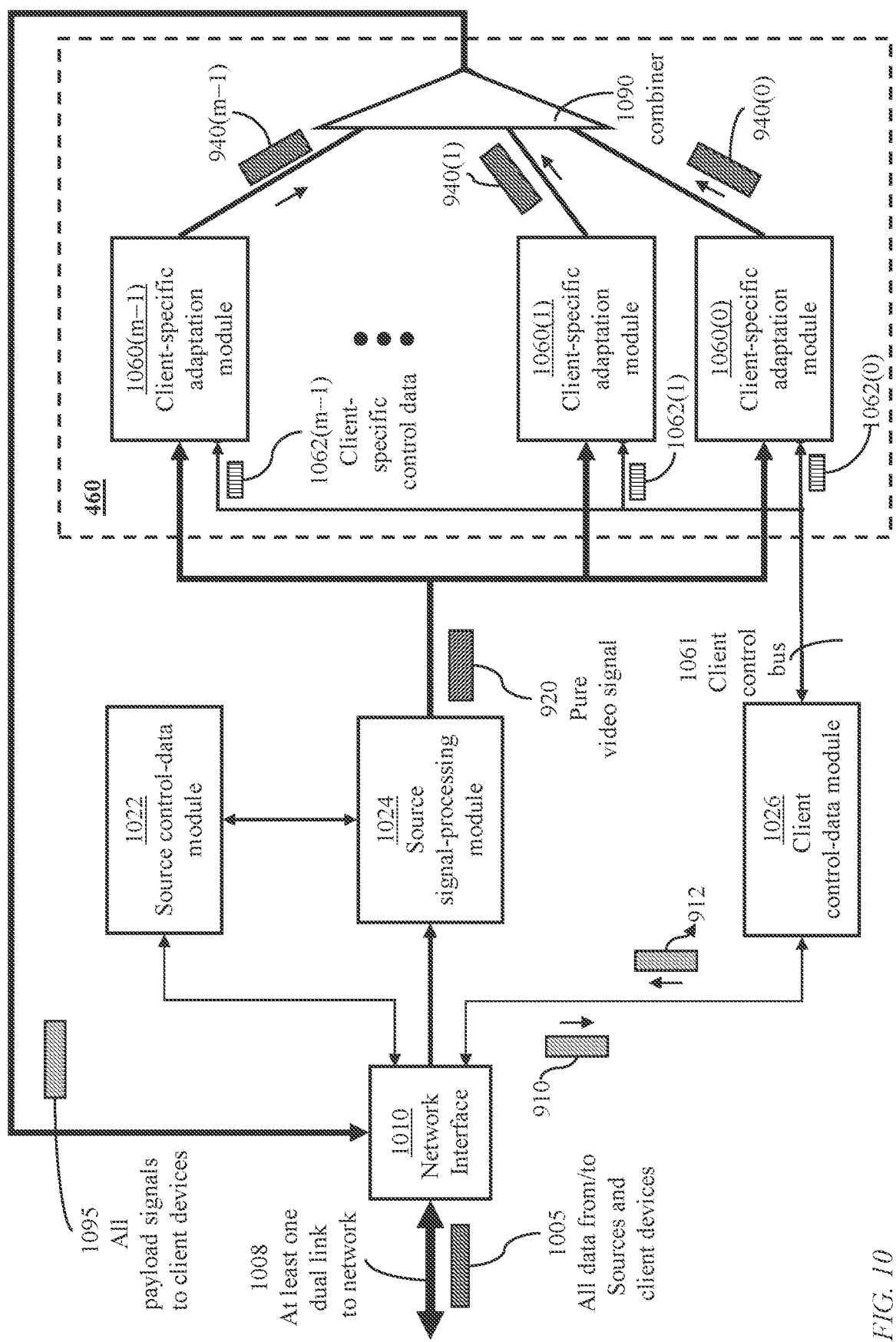
FIG. 10 illustrates components of an exemplary panoramic multimedia server employing client-specific adaptation modules, in accordance with an embodiment of the present invention.

FIG. 10 illustrates components of an exemplary server 120. The server comprises at least one processor (not illustrated) and multiple memory devices storing processor executable instructions organized into a number of modules including a network interface 1010, a source control-data module 1022, a source signal-processing module 1024, a client control-data module 1026, and a set of client-specific adaptation modules 1060. The network interface 1010 is coupled to at least one dual link 1008 to at least one network. The network interface 1010 comprises a server receiver 540 (FIG. 5 and FIG. 6) or 740 (FIG. 7 and FIG. 8) which demodulates a modulated carrier (optical carrier or wireless microwave carrier) to detect the baseband source video signal (raw signal 312, corrected signal 322, compressed signal 342, or compact signal 343) sent from a source 110 (110A, 110B, 110C, or 110D). A dual link of the at least one dual link 1008 carries: control data to and from at least one source 110 and a plurality of client devices; source multimedia signals; and edited multimedia signals directed to the plurality of client devices.

The source video-signal-processing module 1024 may be equipped with a de-warping module 320 and a decompression module 350 to produce a pure video signal 920 which may be a corrected video signal 322 or a rectified video signal 324.

Network interface 1010 directs source video signals to source video-signal-processing module 1024 and control data 921 to source-control data processing module 1022. Source video-signal-processing module 1024 performs processes of:
(1) video-signal de-warping (module 320, FIG. 5);
(2) video-signal decompression (module 350) and de-warping (module 320, FIG. 7); or
(3) video-signal decompression (module 350).

Modules 1022 and 1024 are communicatively coupled as indicated in FIG. 10. Outputs of module 1022 may influence processes of module 1024. Module 1024 may generate control data 922 directed to a source 110 to be communicated through module 1022 and network interface 1010.

Module 1024 directs pure video signals 920 to a number m, m>1, of client-specific adaptation modules 1060, individually identified as 1060(0) to 1060(m−1). Client-specific adaptation modules 1060 preferably employ independent hardware processors. Each client-specific adaptation module 1060 comprises a memory device storing instructions which cause a respective processor to perform requisite transcoding functions.

The data received from client devices comprises upstream control data 910. The data directed to client devices comprises control data 912 and edited multimedia signals 940. Upstream control data 910 are extracted at network interface 1010 and directed to clients' control-data module 1026. The client-specific adaptation modules 1060 access upstream control data 910 through a client control bus 1061, where client-specific control data are held in buffers 1062, or through other means known in the art. Downstream control data generated at the client-specific adaptation modules 1060 are distributed to respective client devices 180 through client control bus 1061, client control-data module 1026, network interface 1010, and the at least one dual link 1008. The edited client-specific multimedia signals 940 are combined (combiner 1090) and the aggregate stream 1095 is distributed to respective client devices 180 through network interface 1010, the at least one dual link 1008, and at least one network.

Figure 11:
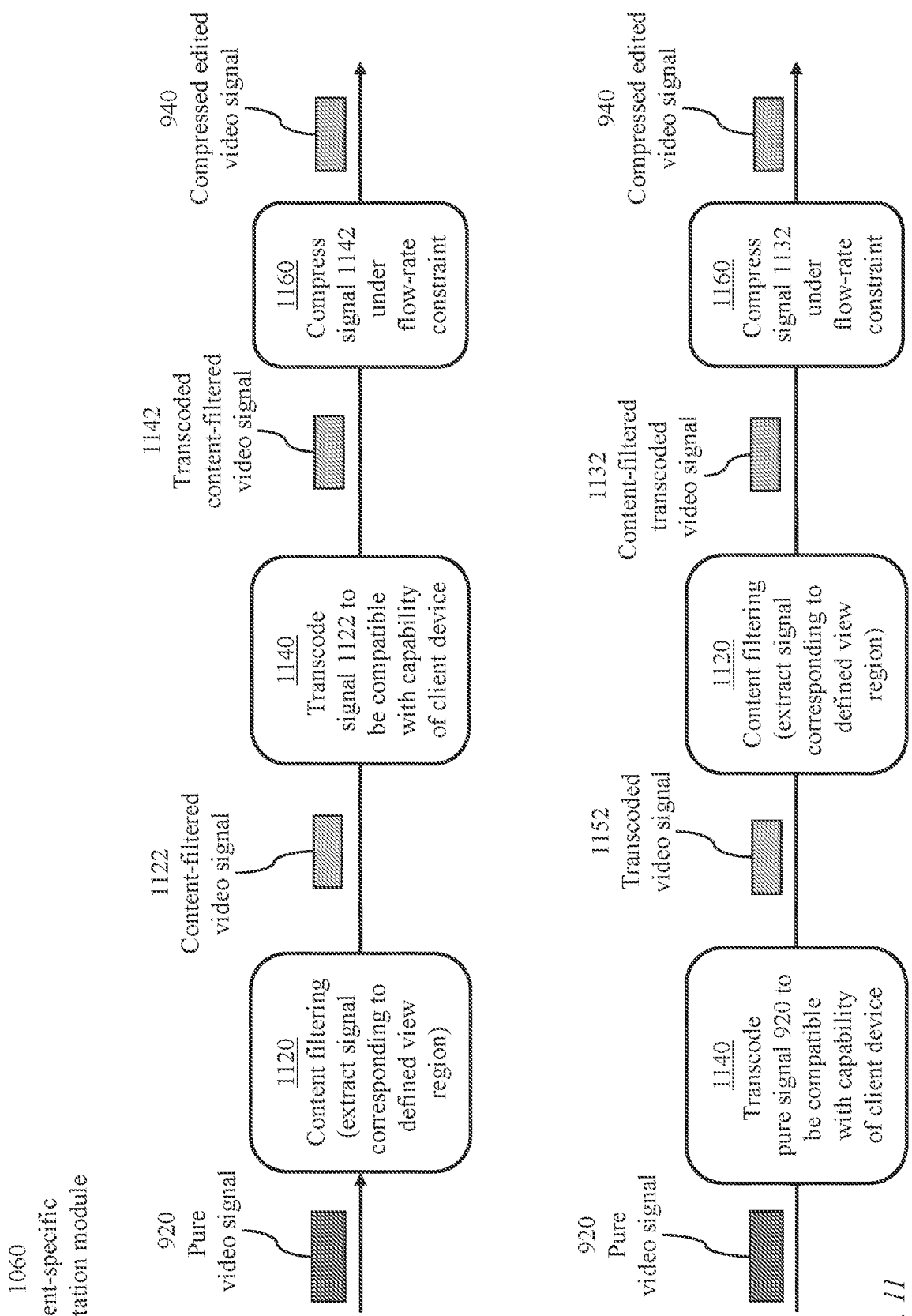
FIG. 11 details a client-specific adaptation module of the exemplary panoramic multimedia server of FIG. 10, in accordance with an embodiment of the present invention.

FIG. 11 details a client-specific adaptation module 1060. The module comprises at least one memory device storing processor-executable instructions which, when executed, cause at least one processor to perform processes of content filtering of a video signal to extract a signal corresponding to a selected view region and transcoding the content-filtered video signal to be compatible with the capability of a target client device 180. The video signal may be compressed under the constraint of a permissible flow rate which may be a representative value of a time-varying flow rate.

A client-specific adaptation module 1060 comprises constituent modules: 1120 for content filtering; 1140 for adaptation to client-device capability; and 1160 for producing a video signal having a flow rate within a permissible flow rate.

In accordance with one embodiment, content-filtering module 1120 processes the pure video signal 920 to extract signal portions which correspond to a specified view region yielding a content-filtered signal 1122. The mean flow rate of content-filtered signal 1122 would be lower than the mean flow rate of signal 920. If signal 1122 is compatible with the capability of a target client device and has a flow rate satisfying a permissible value, the signal may be transmitted to the target client device. Otherwise, module 1140 is applied to transcode signal 1122 to be compatible with characteristics of the target client device such as an upper bound of a frame rate and a frame resolution upper bound. If the resulting transcoded content-filtered signal 1142 has a flow rate not exceeding the permissible value, signal 1142 may be transmitted to the target client device. Otherwise, module 1160 may be applied to compress signal 1142 according to the permissible flow rate yielding signal 940 which is compressed, transcoded, and content-filtered.

In accordance with another embodiment, module 1140 may be applied to transcode pure video signal 920 to yield a transcoded signal 1152 compatible with the capability of the target client device. Content-filtering module 1120 processes signal 1152 to extract signal portions which correspond to a specified view region yielding a content-filtered transcoded signal 1132. The mean flow rate of content-filtered transcoded signal 1132 would be lower than the mean flow rate of signal 920. If signal 1132 has a flow rate satisfying a permissible value, the signal may be transmitted to the target client device. Otherwise, module 1160 may be applied to compress signal 1132 according to the permissible flow rate yielding signal 940 which is now compressed, transcoded, and content-filtered.

Figure 12:
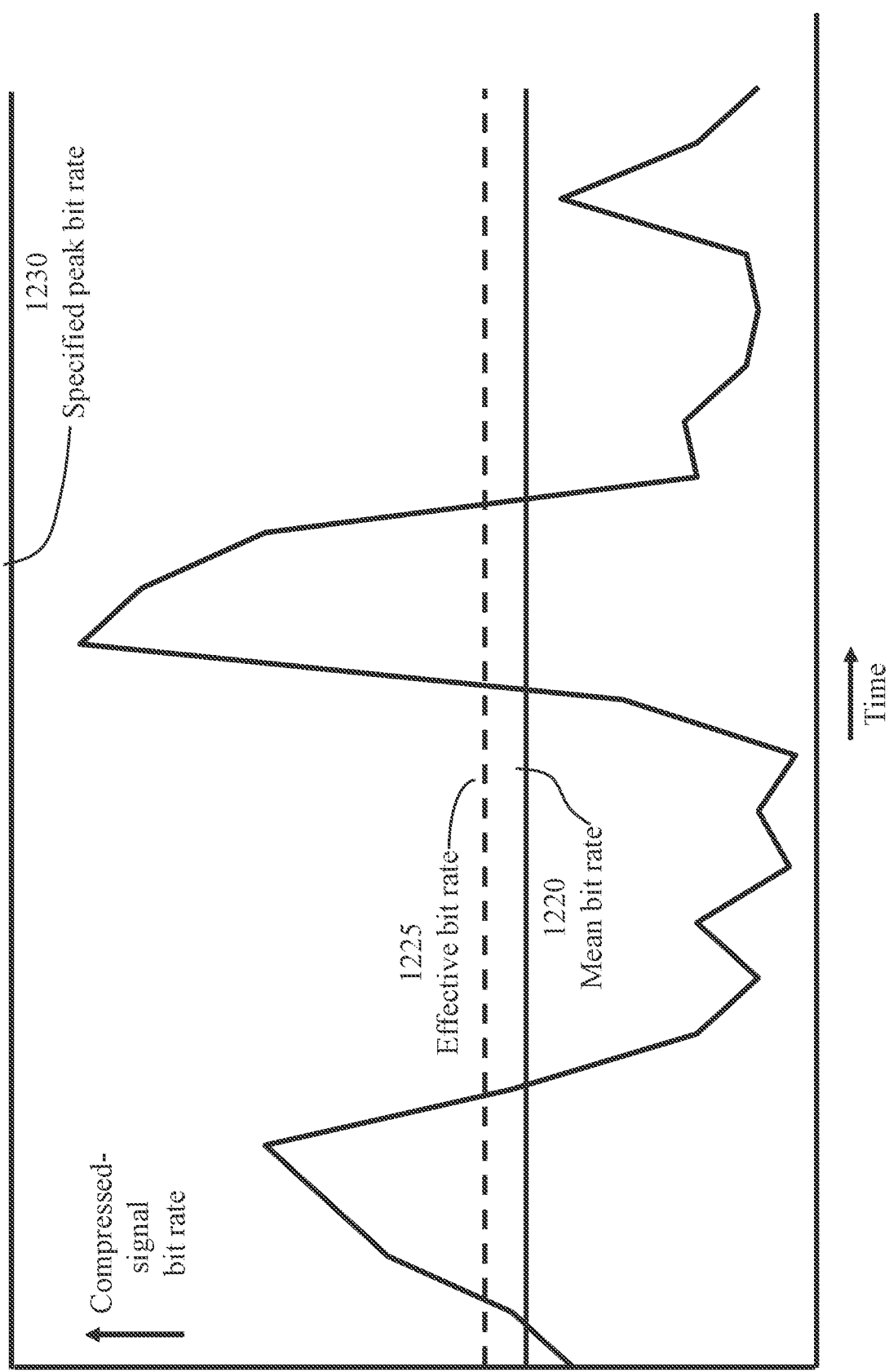
FIG. 12 illustrates temporal variation of flow rate of a compressed video signal.

FIG. 12 illustrates temporal variation of the flow rate (bit rate) of a compressed video signal. Conventionally, a number of descriptors are used to characterize a variable flow rate (bit rate) signal such as a mean value and a peak value of the flow rate, and a parameter representing burst duration. The descriptors and the capacity of a shared network path designated to transport the signal may be used to determine an effective flow rate (effective bit rate). Module 1160 ensures that the effective flow rate (effective bit rate) does not exceed a permissible flow rate of a (purchased) network connection.

Figure 13:
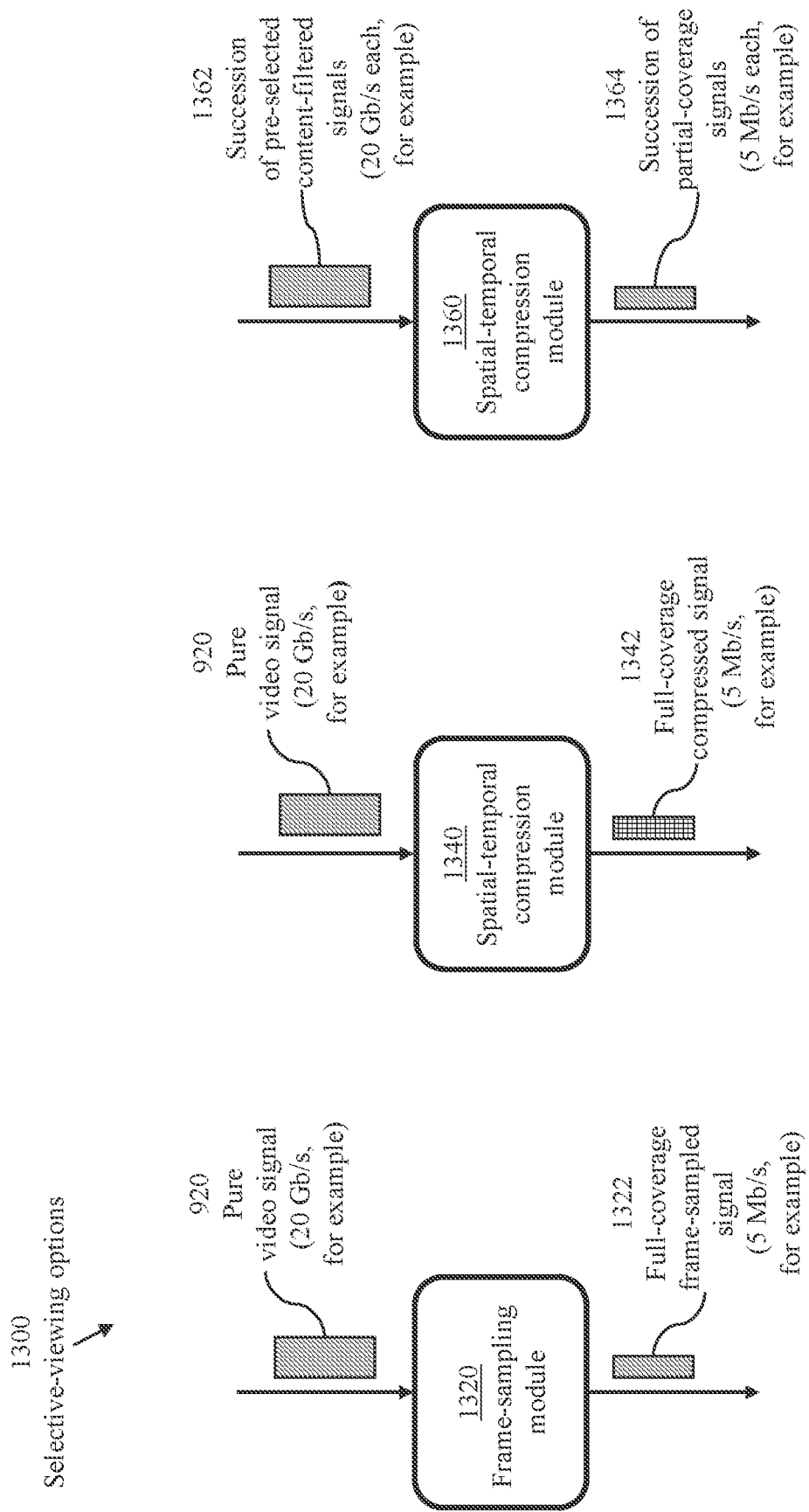
FIG. 13 illustrates modules for generating video signals of reduced flow rates yet suitable for exhibiting panoramic full spatial coverage to enable a client to select a preferred partial-coverage view, in accordance with an embodiment of the present invention.

FIG. 13 illustrates modules 1300 for generating a time-limited video signal of reduced flow rates yet suitable for exhibiting panoramic full spatial coverage to enable a client receiving the time-limited video signal to select a preferred partial-coverage view.

Frame-sampling module 1320 comprises processor executable instructions which cause a processor to sample pure video signal 920, or a transcoded video signal derived from the pure video signal, during distant frame intervals to produce a frame-sampled video signal 1322 corresponding to full spatial-coverage sampled images. Frame-sampled video signal 1322 is not compressed and has a constant flow rate not exceeding a permissible flow rate. The frame-sampled video signal 1322 is displayed at a client device after accumulating all data corresponding to one frame of the pure video signal 920.

Pure video signal 920 may be a corrected signal 322 or a rectified signal 324 (FIG. 3). The inter-frame sampling period is selected so that the (constant) flow rate of the stream of sampled portions of video signal 920 does not exceed a permissible flow rate. For example, if the data flow rate of video signal 920 is 1 Gb/s and the permissible flow rate is 5 Mb/s, then frame-sampling module 1320 would select one frame out of each set of 200 successive frames. A specific client device 180 receiving the sampled frames would then display each frame repeatedly during a period of 200 frame intervals (5 seconds at a frame rate of 40 frames per second). The server 120 starts to send a respective edited multimedia signal 940 and terminates transmitting frame samples after the server receives an indication of a preferred view region from the specific client device.

The server 120 may send view-selection software instructions to each client device to facilitate client's selection of a preferred view region. The software instructions may be sent along the same path carrying downstream control data 912 (FIG. 9).

Spatial-temporal compression module 1340 comprises processor executable instructions which cause a processor to compress pure video signal 920, or a transcoded video signal derived from the pure video signal, to produce a compressed signal 1342 corresponding to full spatial-coverage images. Compressed signal 1342 would have a fluctuating flow rate as illustrated in FIG. 12 and compression module 1340 ensures that the effective flow rate (effective bit rate) does not exceed a permissible flow rate.

A spatial-temporal compression module 1360, similar to spatial-temporal compression module 1340, causes a processor to compress preselected content-filtered (partial coverage) signals 1362 derived from pure video signal 920. A succession of compressed content filtered signals 1364, occupying successive time windows, is sent to a target client device. Each of compressed signals 1364 would have a fluctuating flow rate as illustrated in FIG. 12 and compression module 1360 ensures that the effective flow rate (effective bit rate) of each compressed signal 1364 does not exceed a permissible flow rate.

Figure 14:
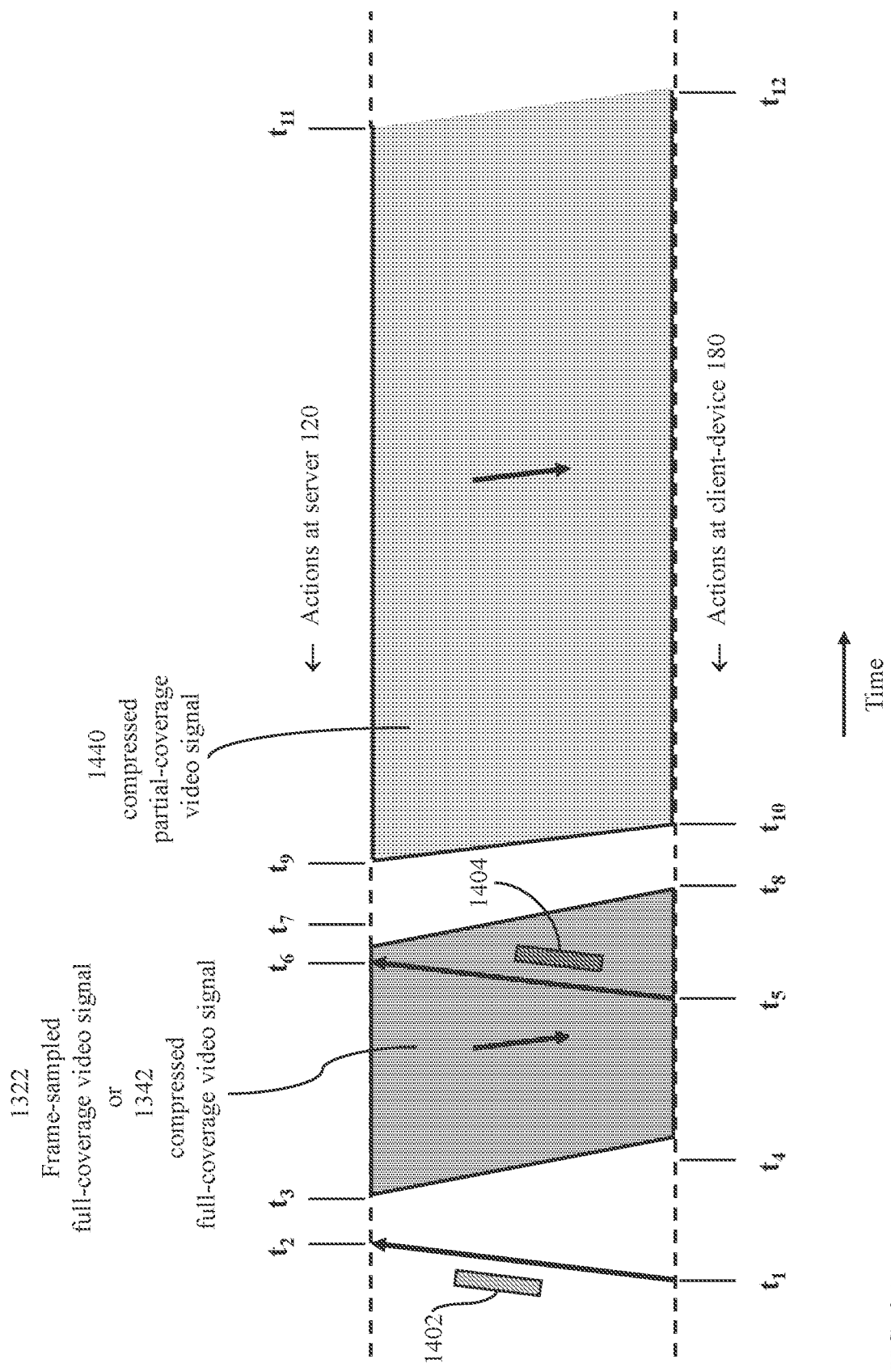
FIG. 14 illustrates a process of requesting and acquiring a content-filtered video signal, in accordance with an embodiment of the present invention.

FIG. 14 illustrates a process of providing a content-filtered video signal to a client device. At an instant of time $t_1$, a user of a specific client device 180 sends a message 1402 to a server 120 requesting viewing of a specific event. The message is received at the server 120 at time $t_2$. Several methods may be devised to enable a user of the specific client device to communicate identifiers of a preferred view region to the server.

In one method, the server sends a frame-sampled signal 1322 which corresponds to selected full spatial-coverage panoramic images at time $t_3$. At time $t_4$, the client device 180 starts to receive frame-sampled signal 1322 which is submitted to a display device after accumulating content of one frame. At time $t_5$, the user of the specific client device sends a message 1404 providing parameters defining a selected view region. Message 1404 is received at the server at time $t_6$. The server 120 formulates a respective content filtered video signal corresponding to the selected view region. The respective content filtered video signal may be compressed to produce a compressed content-filtered (partial spatial coverage) signal 1440. The server terminates transmission of the frame-sampled signal 1322 at time $t_7$ and starts to send signal 1440 to the client device 180 at time $t_9$. Signal 1440 is decompressed and displayed at the client device. The client device receives the last frame of frame-sampled signal 1322 before time $t_8$ and starts to receive compressed signal 1440 at time $t_{10}$. Transmission of compressed signal 1440 ends at time $t_{11}$ and receiving the signal at the client device ends at time $t_{12}$.

In another method, the server generates a full-coverage video signal 1342 that is client-device compatible and compressed to a permissible flow rate as illustrated in FIG. 13. The server sends the signal 1342 at time $t_3$ and the client device 180 starts to receive the compressed signal at time $t_4$. The compressed signal 1342 is decompressed at the client device and submitted to a display device. The sequence of events after time $t_4$ would be similar to the sequence of events corresponding to the case of frame-sampled video signal 1322.

In another method, the server derives from pure video signal 920 several content-filtered video signals 1362 corresponding to preselected view regions as illustrated in FIG. 13. Each of the derived content-filtered video signals is compatible with the capability of the client device and compressed to a permissible flow rate. A succession of signals 1362 may be sent to the client device and a user of the client device may send a message to the server indicating a preferred one of the preselected view regions.

Figure 15:
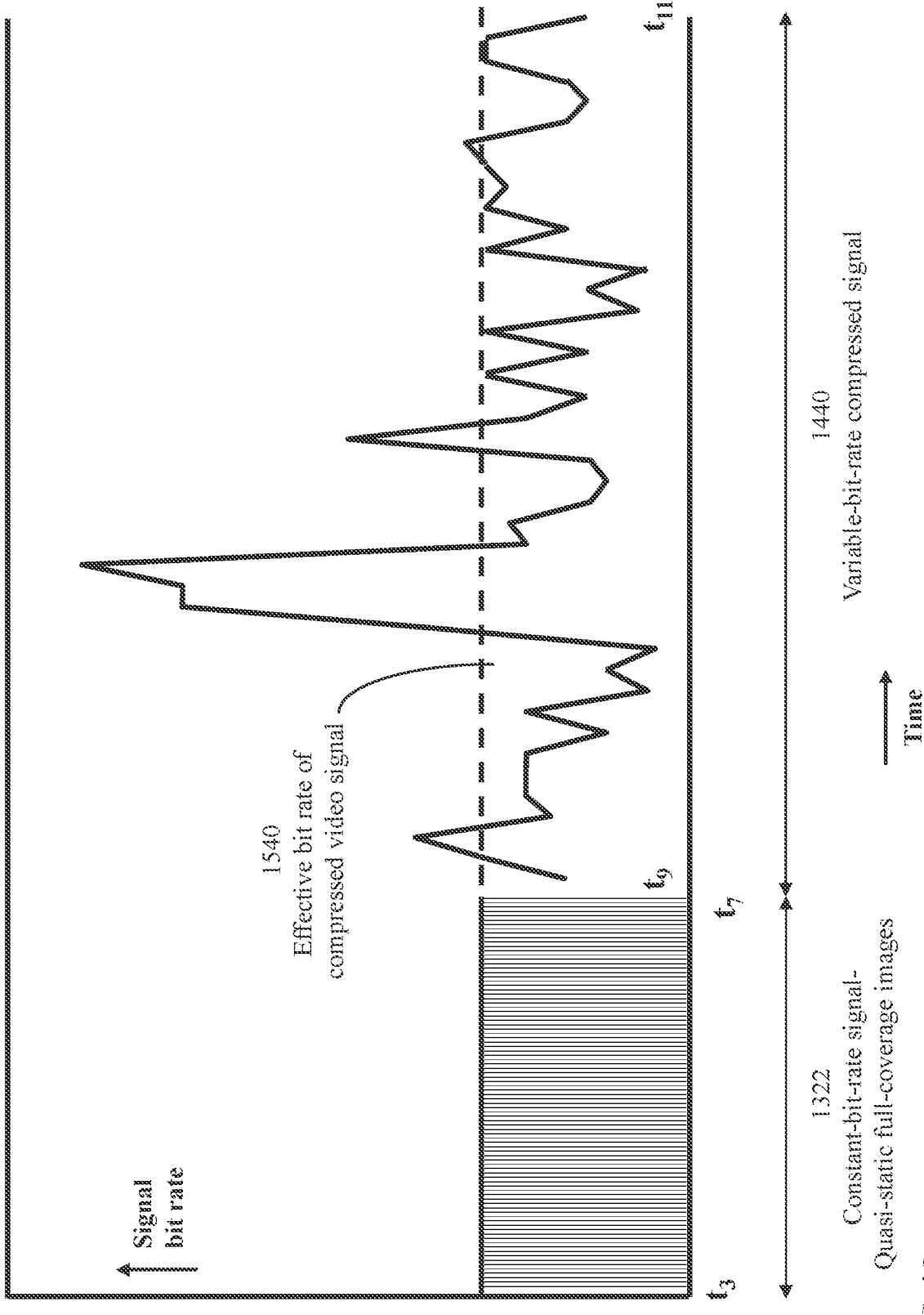
FIG. 15 illustrates temporal flow-rate variation of video signals transmitted from a panoramic multimedia server to a client device, the video signals including a frame-sampled video signal followed by a compressed video signal.

FIG. 15 illustrates temporal bit-rate variation (flow rate variation) of video signals transmitted from a server 120 to a client device 180. The bit rate of frame-sampled signal 1322 is constant and set at a value not exceeding a predefined permissible bit rate. The bit rate of compressed content-filtered signal 1440 is time variable. Conventionally, a variable bit rate is characterized by parameters such as a mean bit rate, a peak bit rate, and a mean data-burst length.

The parameters, together with the capacity of a respective network path, may be used to determine an "effective bit rate" which is larger than the mean bit rate. The formulation of the frame-sampled signal 1322 ensures that the resulting constant bit rate does not exceed the predefined permissible bit rate (which may be based on a service-level agreement). The compression process at the server 120 is devised to ensure that the effective bit rate of the compressed signal 1440 does not exceed the permissible bit rate.

Figure 16:
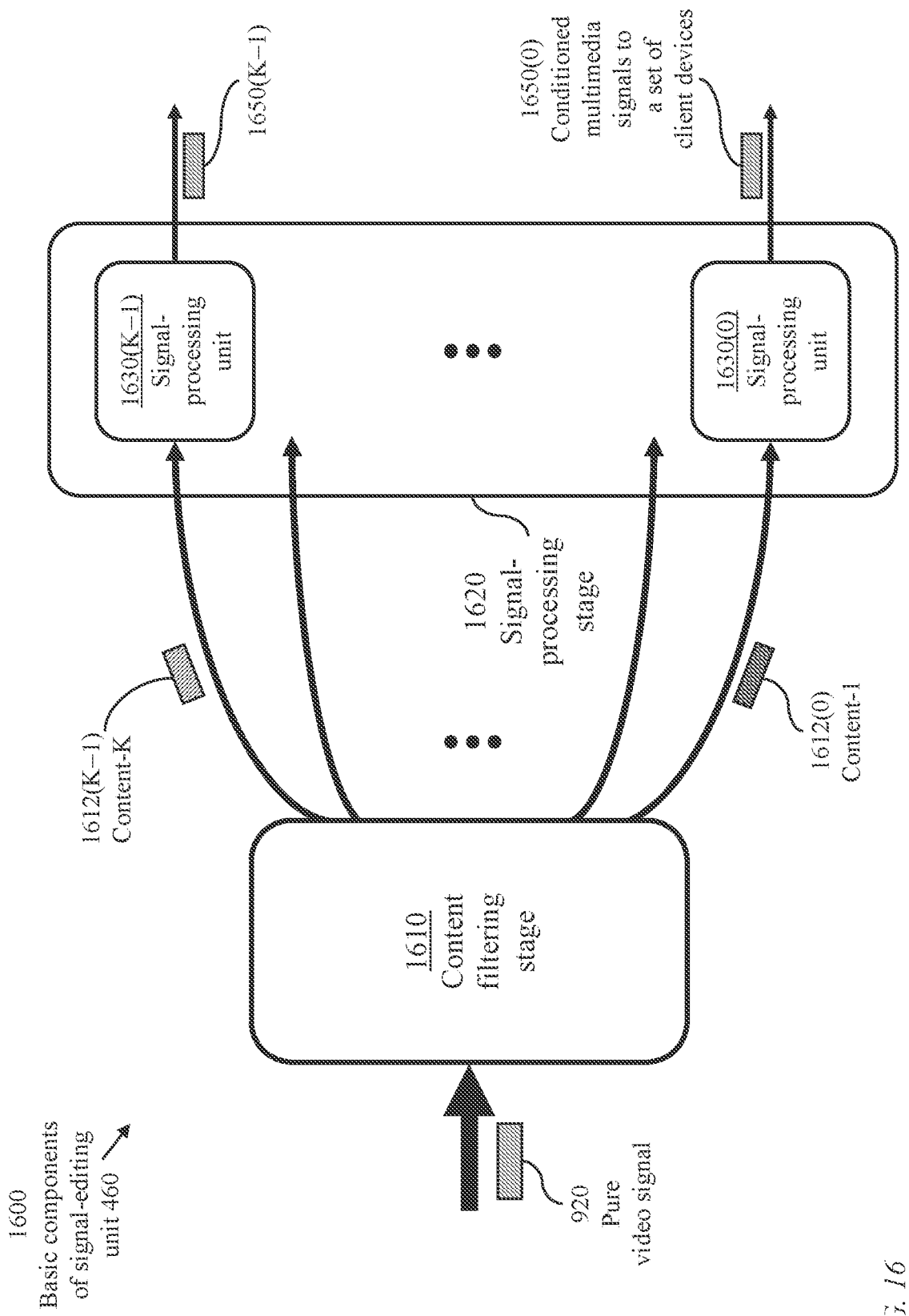
FIG. 16 illustrates the signal-editing unit of FIG. 9 structured as a content-filtering stage and a signal-processing stage, in accordance with an embodiment of the present invention.

FIG. 16 illustrates basic components 1600 of signal-editing unit 460 (FIG. 4 to FIG. 9) of a server 120. In a first stage 1610, the pure video signal 920 is processed to produce a number K, K≥1, of content-filtered signals 1612. In a second stage 1620, each content-filtered signal 1612 is adapted to a respective client device or group of client devices 180. Each content-filtered signal is directed to a respective signal-processing unit 1630 to produce a respective conditioned signal 1650 satisfying a number of conditions including upper bounds of frame-rate, resolution, and flow rate (bit rate). A conditioned signal 1650 may be suitable to multicast to a number of client devices. The content-filtered signals 1612 are individually identified as 1612(0) to 1612(K−1). The signal-processing units 1630 are individually identified as 1630(0) to 1630(K−1). The conditioned signals 1650 are individually identified as 1650(0) to 1650(K−1).

Figure 17:
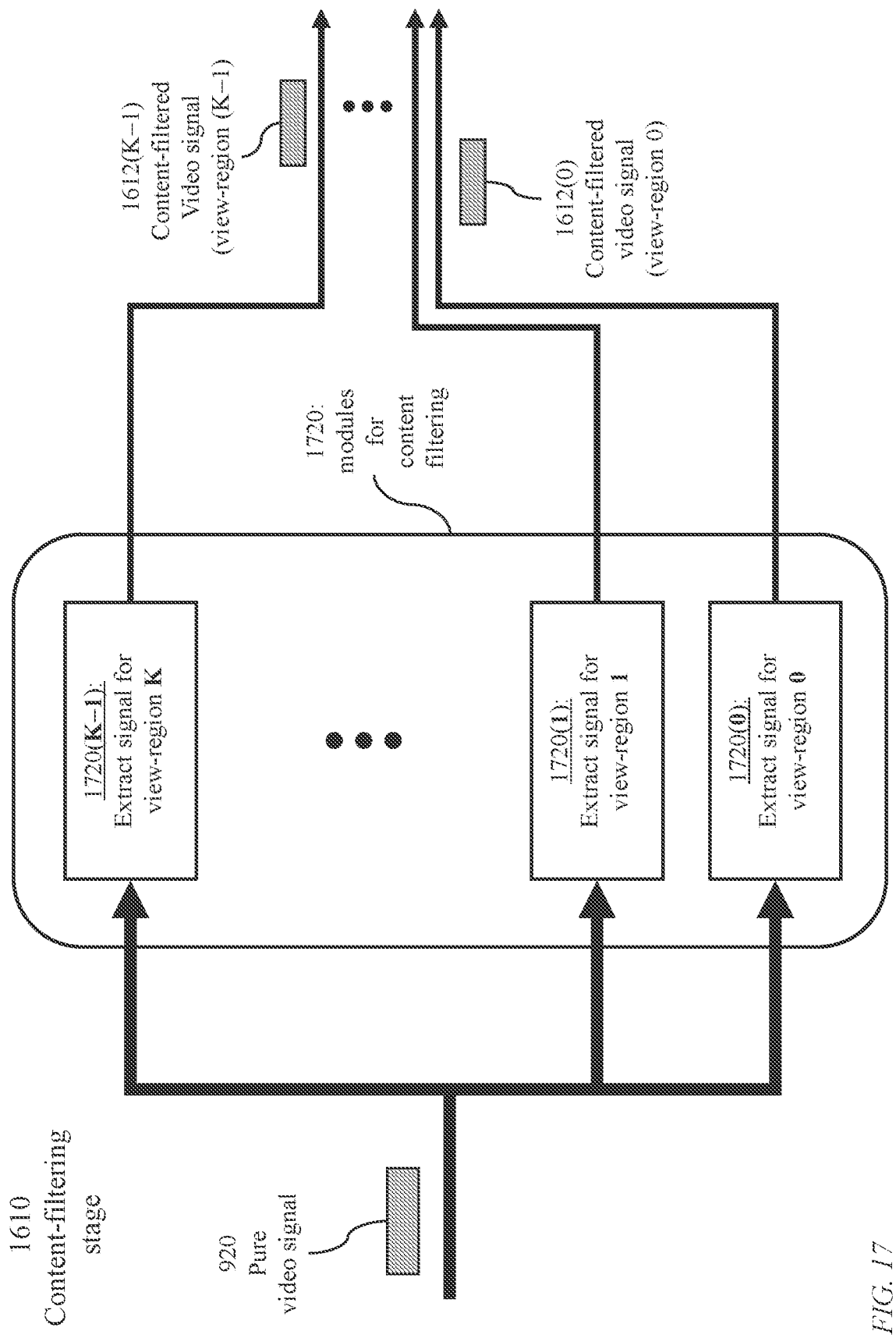
FIG. 17 illustrates the content-filtering stage of FIG. 16.

FIG. 17 illustrates a content-filtering stage 1610 comprising K content-filtering modules 1720, individually identified as 1720(0) to 1720(K−1). Each content-filtering module 1720 is devised to cause a physical processor (not illustrated) to extract portions of pure video signal 920 which corresponds to a specified view region. The pure video signal 920 is submitted to each content-filtering module 1720 which is activated to produce a corresponding content-filtered signal 1612. A particular content-filtered signal 1612 may be multicast to a number of clients that have indicated preference of the view region corresponding to the particular content-filtered signal. However, the client devices may have different characteristics, the capacities of network paths to the client devices may differ, and the permissible flow rates to the client devices may differ due differing network-path capacities and time-varying traffic loads at the client devices. Thus, content-filtered signals 1612 are processed in the second stage 1620 for adaptation to client devices and network-paths.

Figure 18:
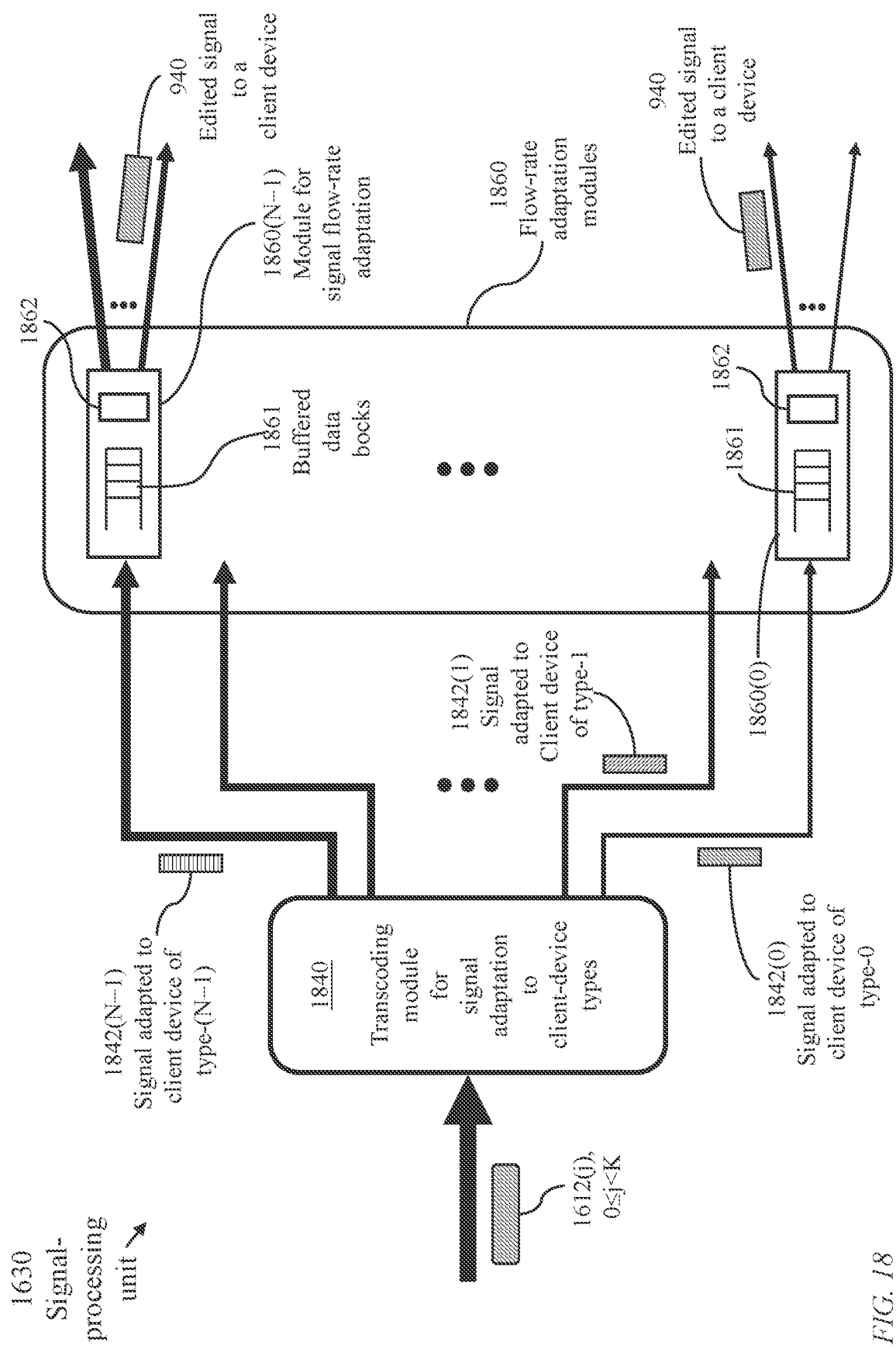
FIG. 18 illustrates a signal-processing unit of the signal-processing stage of FIG. 16.

FIG. 18 illustrates a signal-processing unit 1630, of the second stage 1620, comprising a transcoding module 1840 for signal adaptation to client-device types and modules 1860 for signal flow-rate adaptation to conform to permissible flow-rates. A module 1840 may adapt a video signal to have a frame rate and resolution within the capability of a respective client device. With N types of active client devices, N≥1, module 1840 produces N signals 1842, individually identified as 1842(0) to 1842(N−1), each adapted to a respective device type. A module 1860 may further reduce the flow rate of a signal if the flow rate exceeds a permissible value. Each module 1860 (j), 0≤j<N, comprises a buffer 1861 for holding a data block of a respective signal 1842 and a memory device 1862 storing processor-executable instruction for flow-rate adaptation.

Figure 19:
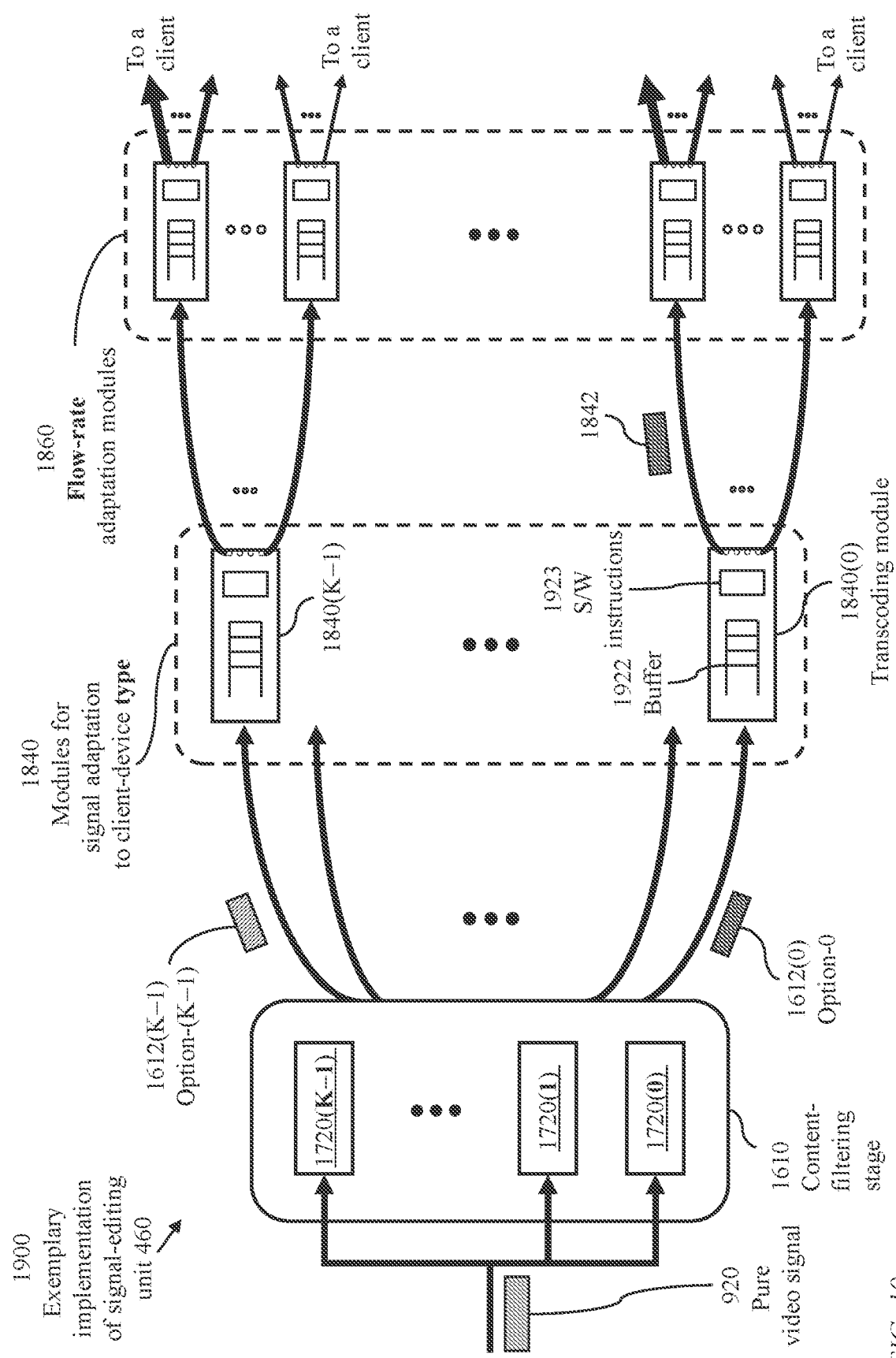
FIG. 19 illustrates the signal-editing unit of FIG. 16 including details of the content-filtering stage and signal-processing stage, in accordance with an embodiment of the present invention.

FIG. 19 illustrates an exemplary implementation 1900 of the signal-editing unit 460. The content filtering stage 1610 comprises K content-filtering modules 1720 as illustrated in FIG. 17. Each content-filtered signal 1612 is submitted to a transcoding module 1840 to adapt the signal to a respective client-device type. A transcoding module 1840 comprises a buffer 1922 for holding a data block of a content-filtered signal 1612 and a memory device 1923 storing processor executable instructions which cause a processor to modify the frame rate and/or resolution to be compatible with the capability of a client-receiver. Each output signals 1842 of a transcoding module 1840 may be further processed at a flow-rate adaptation module 1860.

Figure 20:
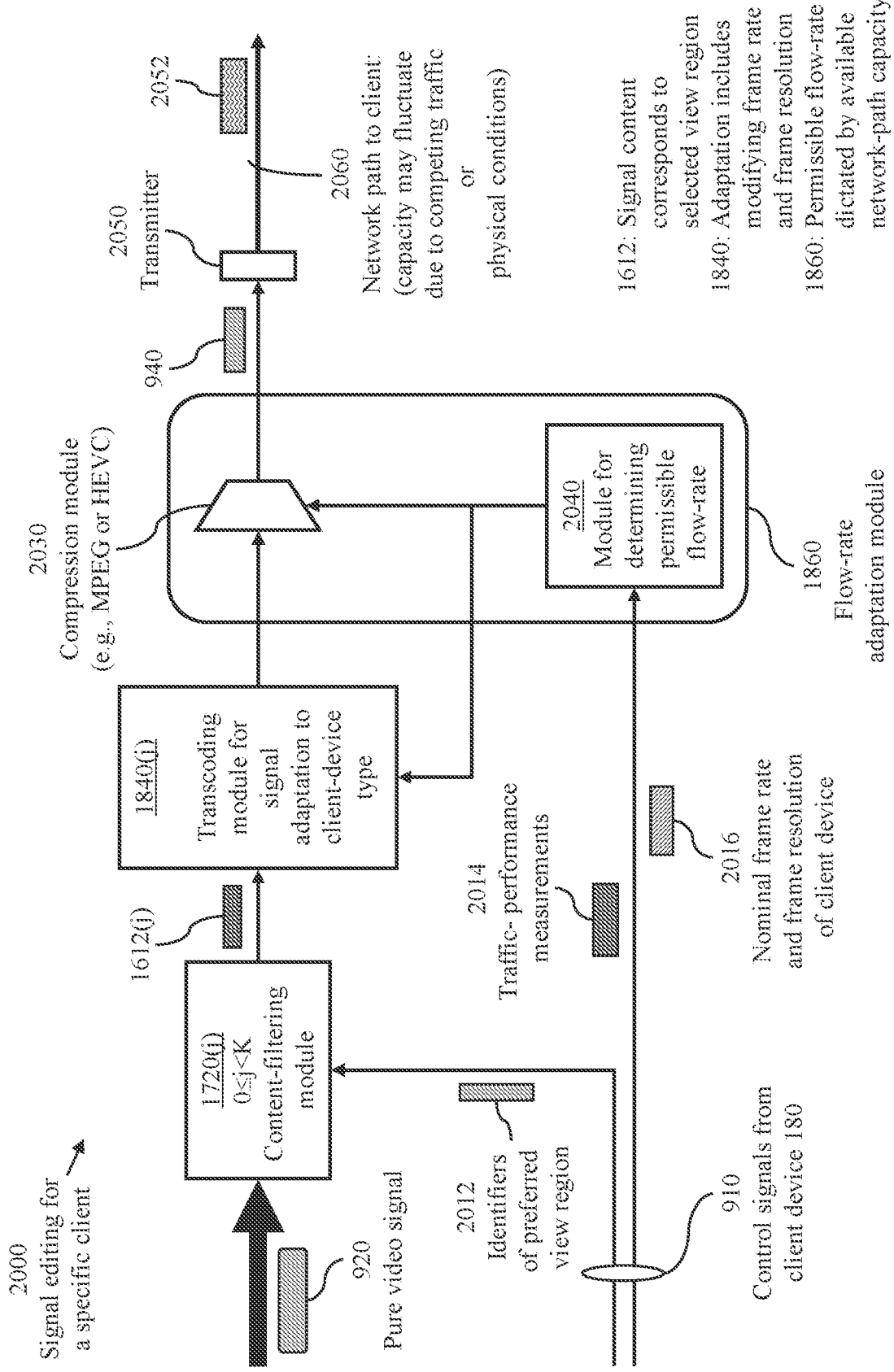
FIG. 20 illustrates processes of video signal editing for a target client device, in accordance with an embodiment of the present invention.

As illustrated in FIG. 17, K modules 1720, individually identified as 1720(0) to 1720(K−1), K>1, may be activated simultaneously to extract different content-filtered signals 1612(0) to 1612(K−1) each further processed at a respective signal-processing unit 1630 to produce a signal 1650 suitable for display at a respective client device or a set of client devices. As illustrated in FIG. 18, a content-filtered signal 1612 is transcoded to be compatible with a target client device 180 and further adapted to a flow rate not exceeding a permissible upper bound. FIG. 20 illustrates processes 2000 of video signal editing for a target client device 180. Control signals 910 may provide traffic-performance measurements 2014, a nominal frame rate and frame resolution 2016, and identifiers 2012 of a preferred view region. A pure video signal 920 is directed to a content-filtering module 1720(j) to extract content of video signal 920 that corresponds to a view region j identified by a user of the target client device. Module 2040 is activated to determine a permissible flow rate Φ as well as a frame rate and frame resolution, compatible with the target client device 180, to be used in module 1840(j). Transcoding module 1840(j) is activated to adapt the extracted content-filtered signal 1612 (j) to the frame rate and frame resolution determined by module 2040. Compression module 2030 produces an edited video signal 940 which complies with an identified view region and is adapted to the capability of the target client device 180 and the capability of the network path from the server 120 to the target client device 180. Transmitter 2050 sends a signal 2052 to the target client device. Signal 2052 comprises video signal 940 together with accompanying multimedia signals (such as audio signals and/or text) and control signals. Signal 2052 is routed to the target client device along a network path 2060.

Figure 21:
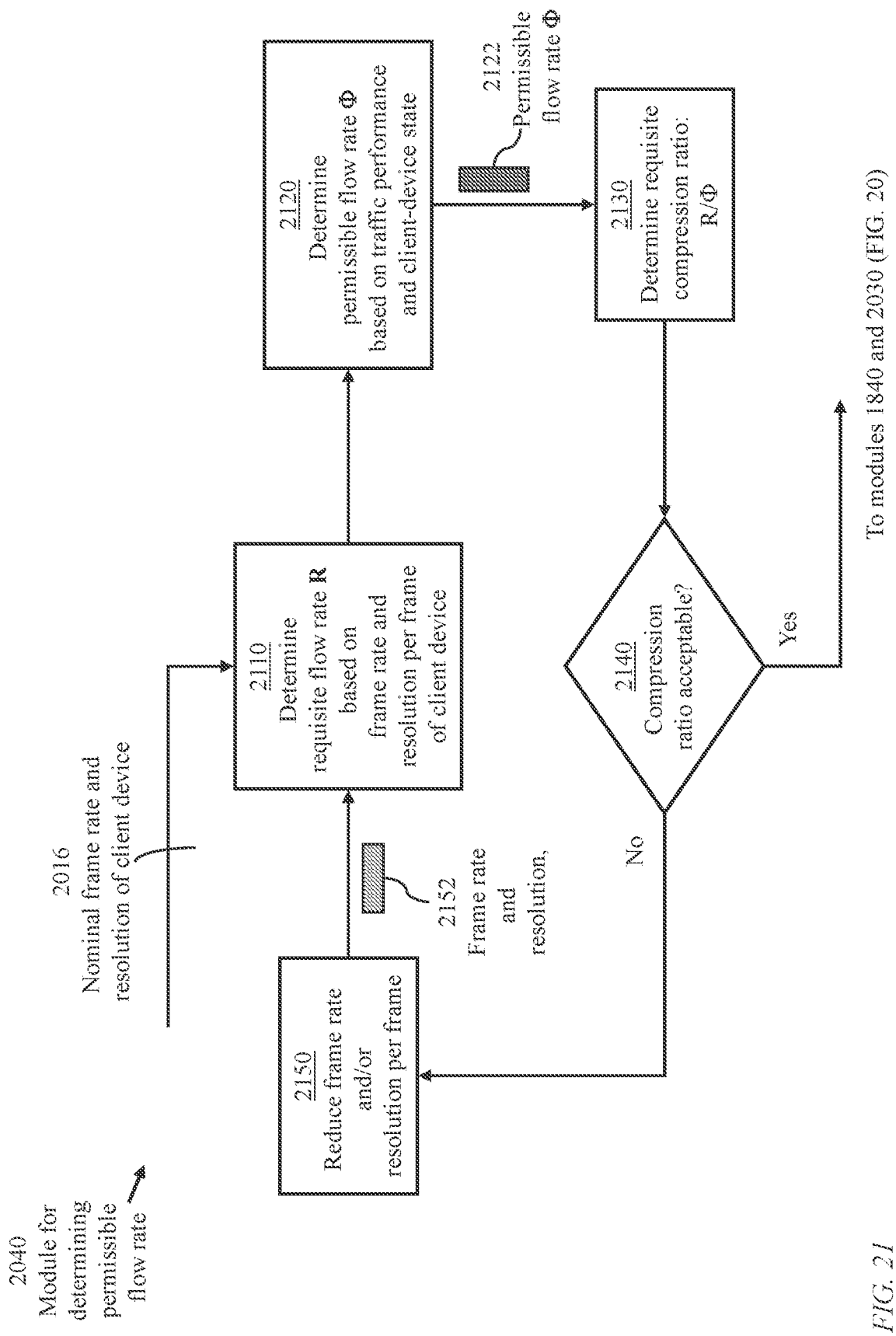
FIG. 21 details a module for determining permissible flow rates.

FIG. 21 details module 2040. Starting with a nominal frame rate and nominal frame resolution of the target client device 180, which may be stored at the server or included in control signals 910 received from the target client, process 2110 determines the requisite flow rate R at the display device of the target client device 180 as a direct multiplication of the frame rate, the number of pixels per frame, and the number of bits per pixel. Independently, process 2120 determines a permissible flow rate Φ (reference 2122) between the server and the target client device based on measurements of traffic performance along the network path 2060 and the occupancy of a receiving buffer at the client device. The traffic-performance measurements include a data-loss indicator (if any) and delay jitter. The traffic-performance measurements are determined using techniques well known in the art. Determining the permissible flow rate based on measured traffic performance may be based on empirical formulae or based on a parameterized analytical model.

Process 2140 determines whether the ratio of the requisite flow rate R at the display device of the target client server to the permissible flow rate Φ along the network path 2060 is suitable for compression module 2030. If the flow rate R is to be reduced to satisfy a compression-ratio limit, process 2150 may determine a revised frame rate and/or a revised resolution 2152 to be communicated to module 1840 (FIG. 20). The permissible flow rate Φ may be communicated to compression module 2030.

Figure 22:
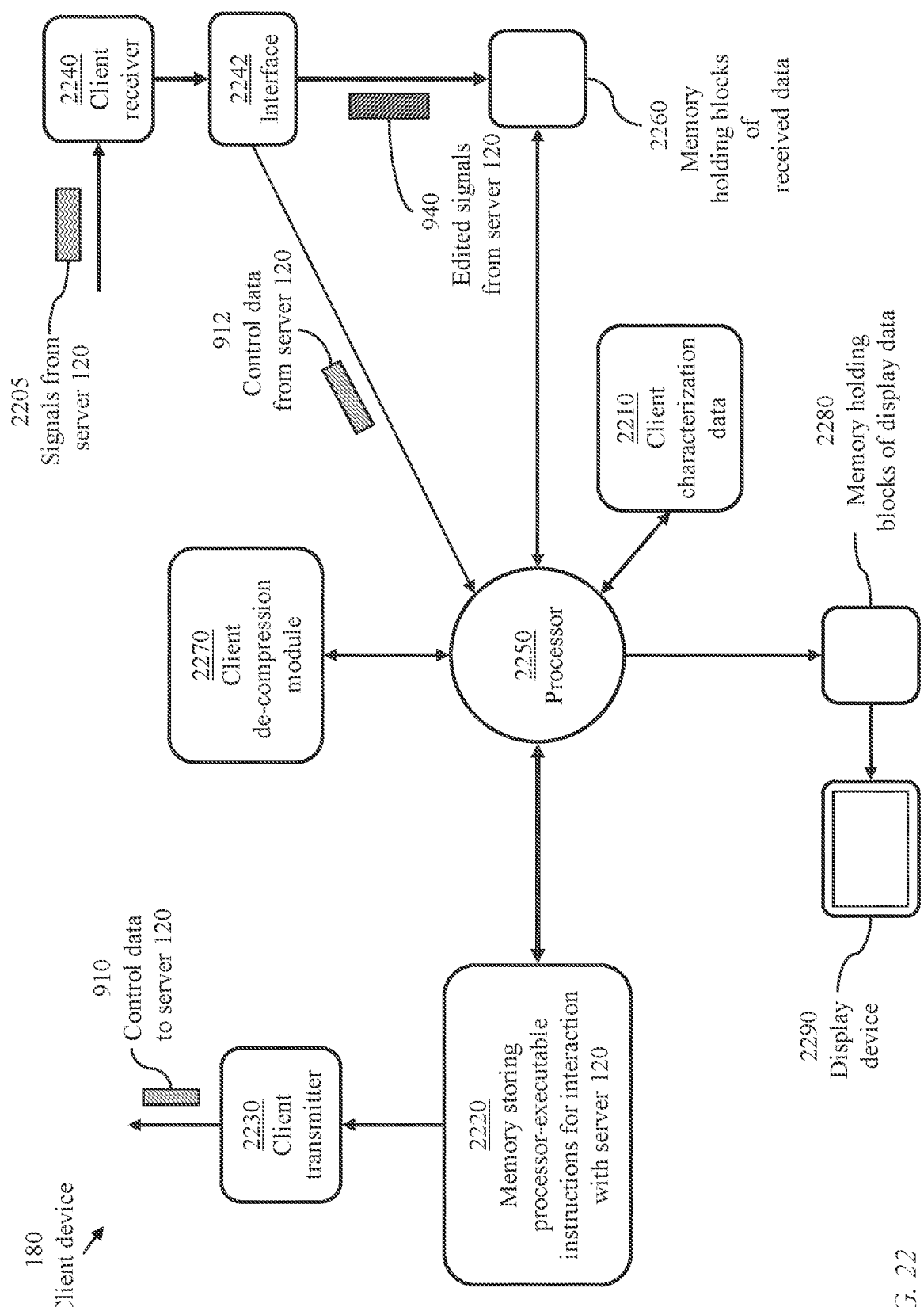
FIG. 22 illustrates components of a client device, in accordance with an embodiment of the present invention.

FIG. 22 illustrates components of a client device 180. A memory device 2210 stores client-device characterizing data, such as upper bounds of a frame rate and frame resolution of a display device. A memory device 2220 stores software instructions for interacting with specific servers 120. The instructions may include software modules to enable a user of a client device to communicate identifications of preferred viewing regions to the server. The software instructions may be installed by a user of a client device or sent from a server 120 together with the downstream control signals 912. A client transmitter 2230 transmits all control data from the client device to respective servers 120. A client receiver 2240 receives all signals from server(s) 120 including edited video signal 940 (which may be compressed), other multimedia data (audio signals and text), and control signals 912. An interface 2242 directs control signals 912 to processor 2250 and edited video signal 940, together with accompanying audio signals and text, to a memory device 2260 which buffers data blocks of incoming multimedia data comprising the video signal 940, audio data, and text. If the incoming multimedia data is not compressed, the data may be presented to the display device 2290. Otherwise, client decompression module 2270 decompresses the compressed data block buffered in memory device 2260 to produce display data held in memory device 2280 coupled to the display device 2290. Notably, a data block corresponding to one frame of a full-coverage frame-sampled signal 1322 (FIG. 13, FIG. 14) may be displayed numerous times before dequeueing from memory device 2280.

Figure 23:
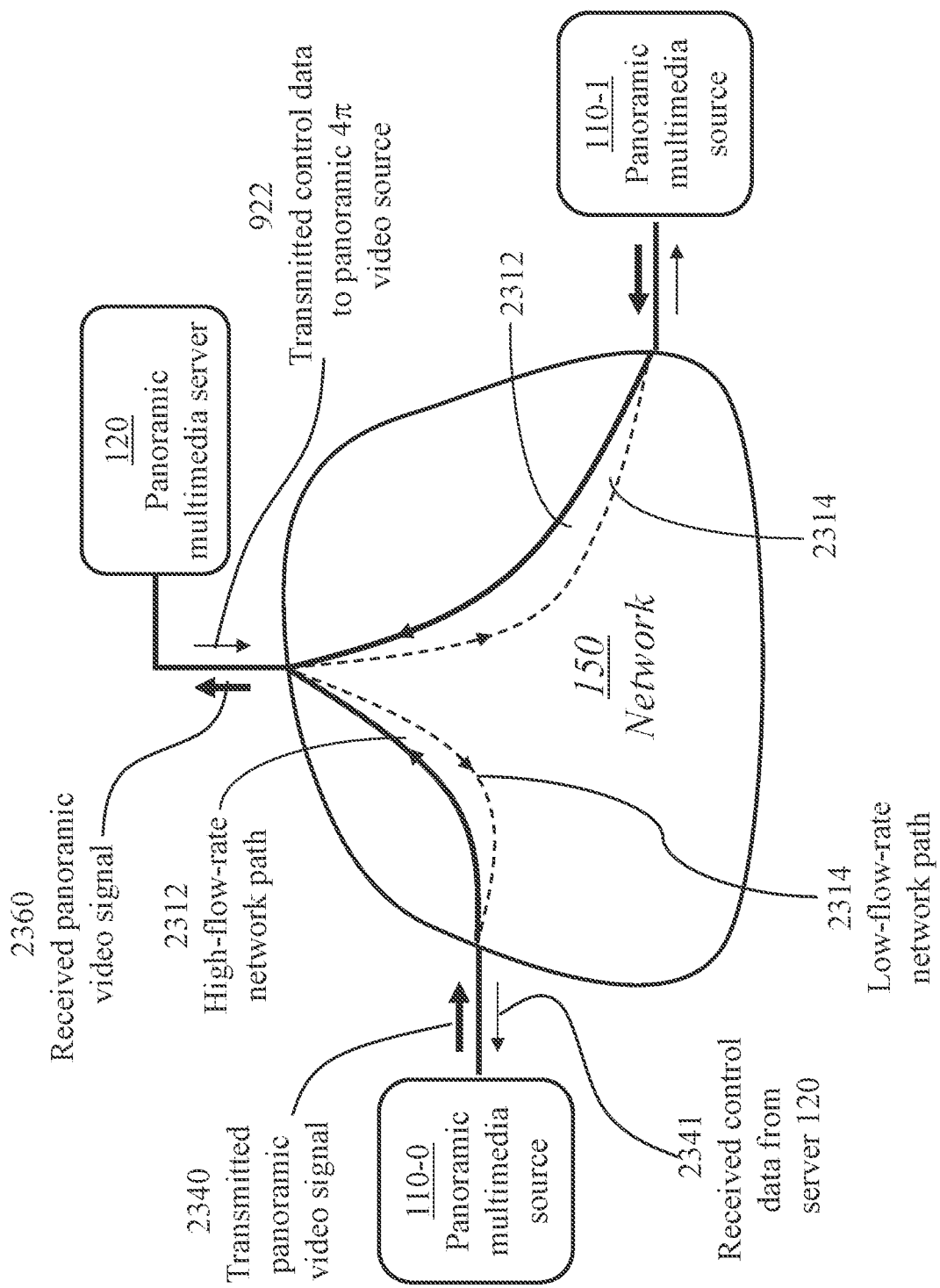
FIG. 23 illustrates communication paths between a panoramic multimedia server and panoramic multimedia sources in accordance with an embodiment of the present invention.

FIG. 23 illustrates communication paths between a panoramic multimedia server 120 and two panoramic multimedia sources 110-0 and 110-1. A multimedia source 110 comprises a panoramic camera 310 (e.g., a 4π camera), and may include a de-warping module 330 and/or a compression module 340 as illustrated in FIGS. 3 to 8. Although only two panoramic multimedia sources 110 are illustrated, it should be understood that the panoramic multimedia server 120 may simultaneously content to more multimedia sources 110. In a preferred implementation, the panoramic multimedia server is cloud-embedded so that the network connectivity and processing capacity of the panoramic multimedia server may be selected to suit the activity level. A source multimedia signal from a panoramic multimedia source 110 is transmitted to the panoramic multimedia server 120 through a network path 2312 of an appropriate transmission capacity. The source multimedia signal includes a source video signal 2340.

With an ideal network path 2312, the received multimedia signal at the panoramic multimedia server 120 would be a delayed replica of the transmitted video signal. The network path 2312, however, may traverse a router at source, a router at destination, and possibly one or more intermediate routers. Thus, the received multimedia signal may be subject to noise, delay jitter, and possibly partial signal loss. With signal filtering at the server 120 and flow-rate control, the content of the received multimedia signal would be a close replica of the content of the transmitted multimedia signal. The video signal component 2360 of the received multimedia signal constitutes the source video signal as defined above.

The source video signal 2360 may be a "raw" video signal 312 produced by a panoramic camera, a corrected video signal 322, or a compressed video signal 342, or a compact video signal 343 as illustrated in FIG. 3. A corrected video signal 322 is produced from the raw video signal using de-warping module 330. A compressed video signal 342 is produced from the raw signal 312, using compression module 340 (FIG. 3), according to one of standardized compression methods or a proprietary compression method. A compact video signal 343 is produced from a corrected video signal 322 using a compression module 340. The raw video signal may be produced by a single panoramic camera or multiple cameras.

The panoramic multimedia server 120 may send control signals 922 (FIG. 9) to the panoramic multimedia source 110 through a network path 2314, which would be of a (much) lower transmission capacity in comparison with the payload path 2312. The control signals 922 are received at the panoramic multimedia source 110 as control signals 2341 which have the same control information of signals 922.

Figure 24:
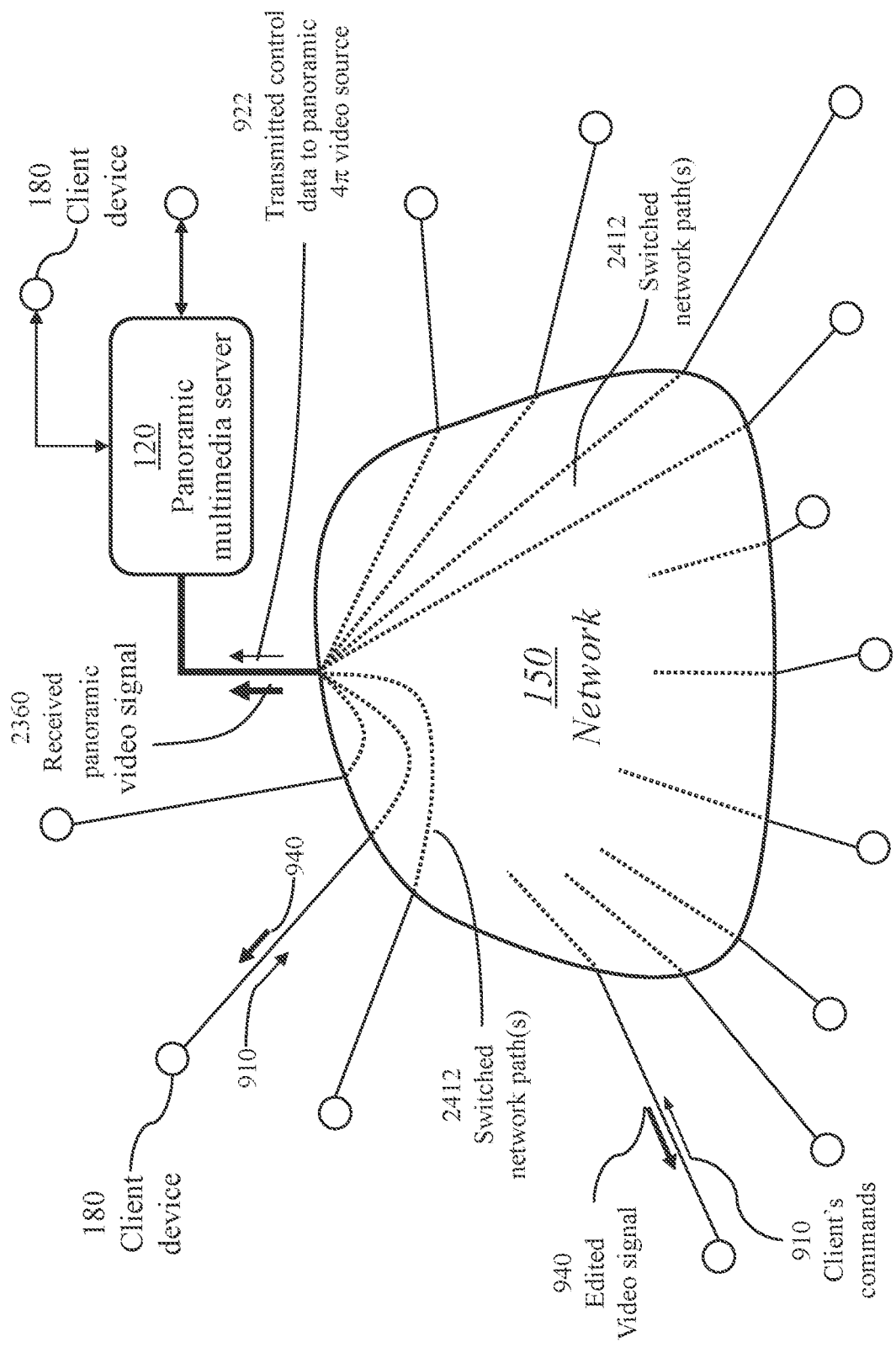
FIG. 24 illustrates communication paths between the panoramic multimedia server of FIG. 23 and a plurality of heterogeneous client devices in accordance with an embodiment of the present invention.

FIG. 24 illustrates communication paths between the panoramic multimedia server 120 and a plurality of heterogeneous client devices 180. The panoramic multimedia server 120 sends edited multimedia signals 940 to the client devices through network paths 2412. The panoramic multimedia server 120 receives control data 910 from individual client devices 180. The control data 910 may include requests for service and selection of view regions.

Figure 25:
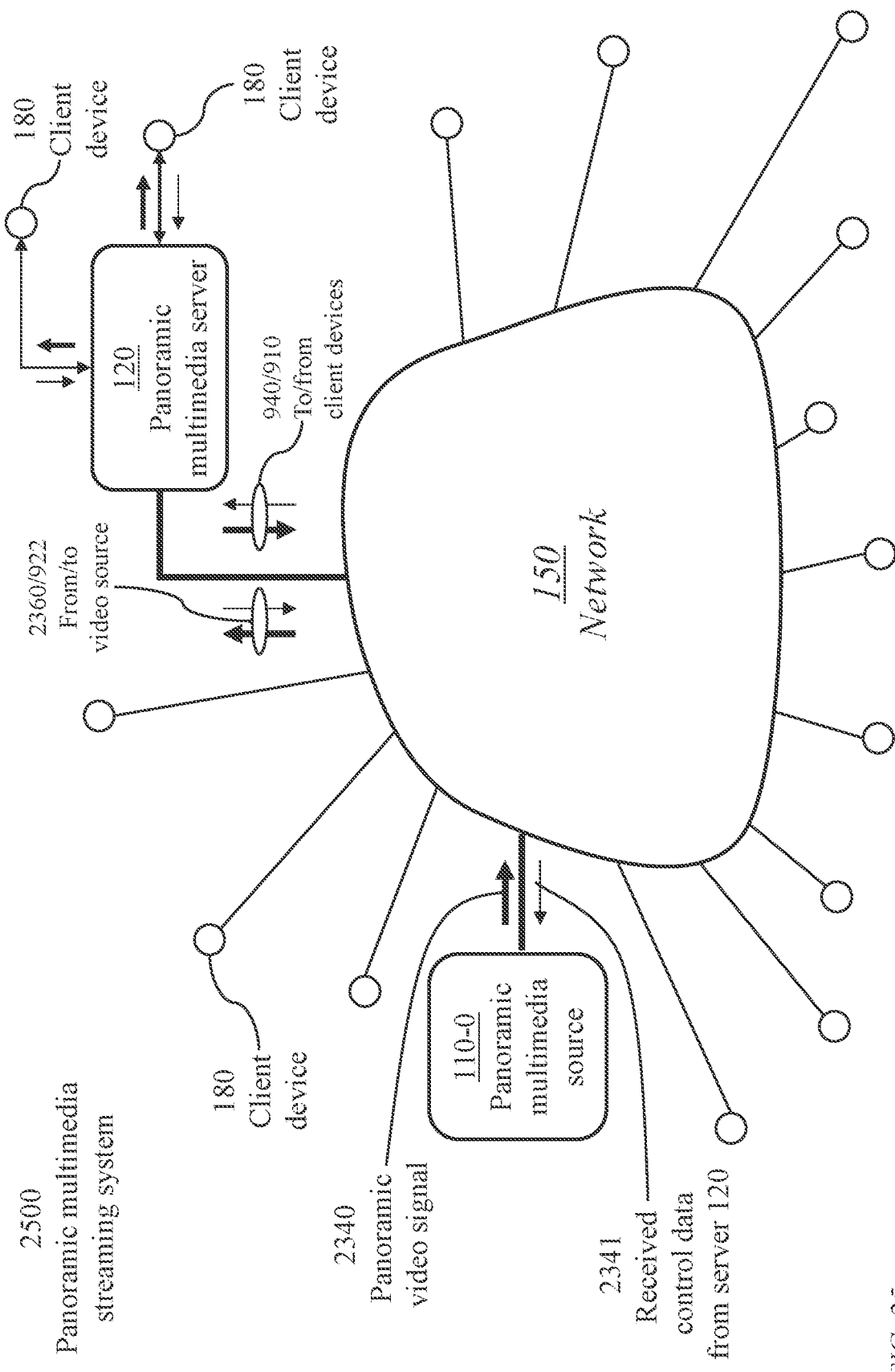
FIG. 25 illustrates a system of multicasting client-specific content-filtered multimedia signals adapted from a panoramic multimedia signal generated at a multimedia source of FIG. 23 to the plurality of heterogeneous client devices of FIG. 24 in accordance with an embodiment of the present invention.

FIG. 25 illustrates a system 2500 of multicasting the client-specific multimedia signals 940 adapted from a panoramic multimedia signal 2340 generated at the multimedia source 110 to the plurality of heterogeneous client devices 180. The multimedia signals 940 are individually adapted to capabilities of respective client devices, available capacities ("bandwidths") of network paths, and clients' preferences. The panoramic multimedia server 120 may be implemented using hardware processing units and memory devices allocated within a shared cloud computing network. Alternatively, selected processes may be implemented in a computing facility outside the cloud.

Figure 26:
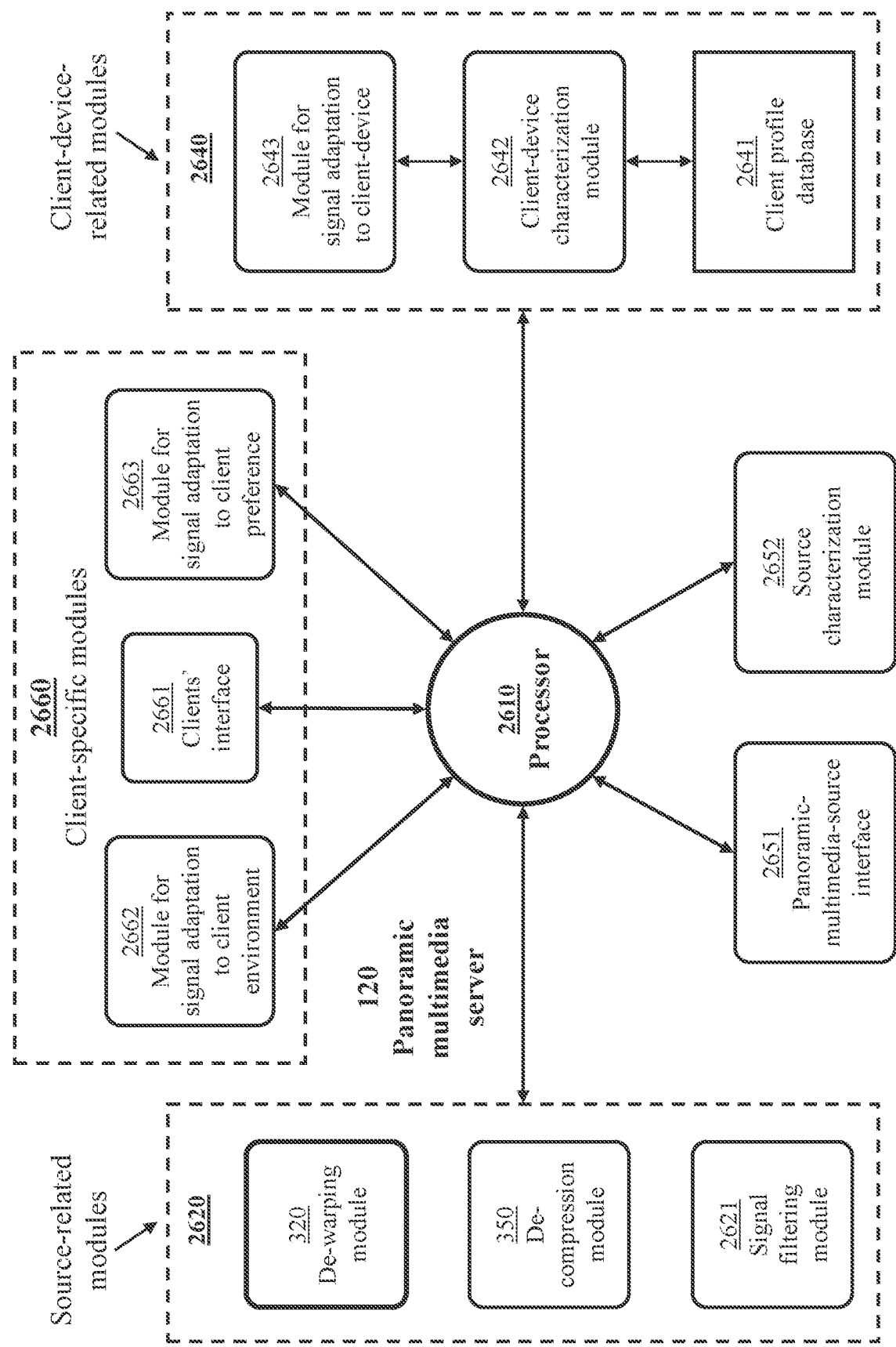
FIG. 26 illustrates a modular structure of the panoramic multimedia server, in accordance with an embodiment of the present invention.

FIG. 26 illustrates a modular structure of the panoramic multimedia server 120 comprising at least one hardware processor 2610. A multimedia source interface 2651 controls communication with the multimedia source 110. A module 2652 characterizes the multimedia source 110 and communicates source-characterization data to a set 2620 of modules devised to process the received panoramic multimedia signal 2360. The source-characterization data may be determined from characterization data communicated by a panoramic multimedia source or from stored records. The set 2620 of modules includes a signal filtering module 2621, for offsetting signal degradation due to transmission noise and delay jitter, and may include a decompression module 350 and a de-warping module 320. The signal-filtering module 2621 offsets signal degradation caused by noise and delay jitter. If the "raw" video signal 312 (FIG. 3) has been de-warped at source to produce a "corrected signal" 322 that is further compressed at source, the decompression module 350 applies appropriate decompression processes to produce a replica of the corrected signal 322. Otherwise, if the raw video signal 312 has been compressed at source without de-warping, the decompression module 350 applies appropriate decompression processes to produce a replica of the raw signal 312 which is then de-warped using de-warping module 320.

The client-device related modules 2640 include a client-device characterization module 2642 and a module 2643 for signal adaptation to client-device characteristics. The client-device characterization module 2642 may rely on a client-profile database 2641 or extract client-device characteristics from characterization data received via clients' interface

2661. A client's device characteristics may relate to processing capacity, frame rate, frame resolution, flow-rate limitation, etc.

Client-specific modules 2660 include clients' interface 2661, a module 2662 for signal adaptation to a client's environment, and a module 2663 for signal adaptation to a client's viewing preference.

Figure 27:
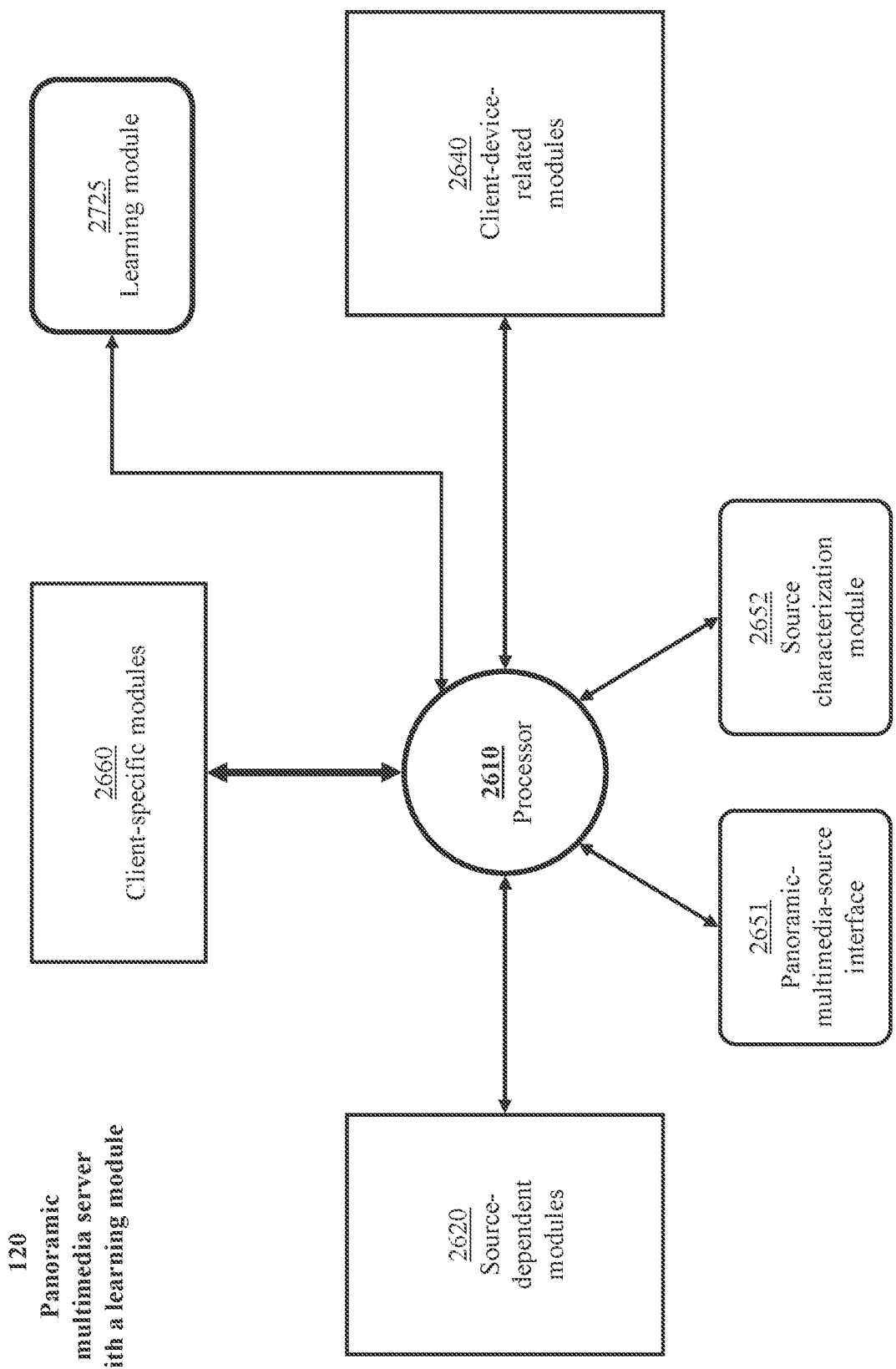
FIG. 27 illustrates a learning module coupled to the panoramic multimedia server of FIG. 26, in accordance with an embodiment of the present invention.

FIG. 27 illustrates a panoramic multimedia server 120 including a learning module 2725 for tracking clients' selections of viewing options and correlating the viewing options to characteristics of client devices and other clients' attributes.

Figure 28:
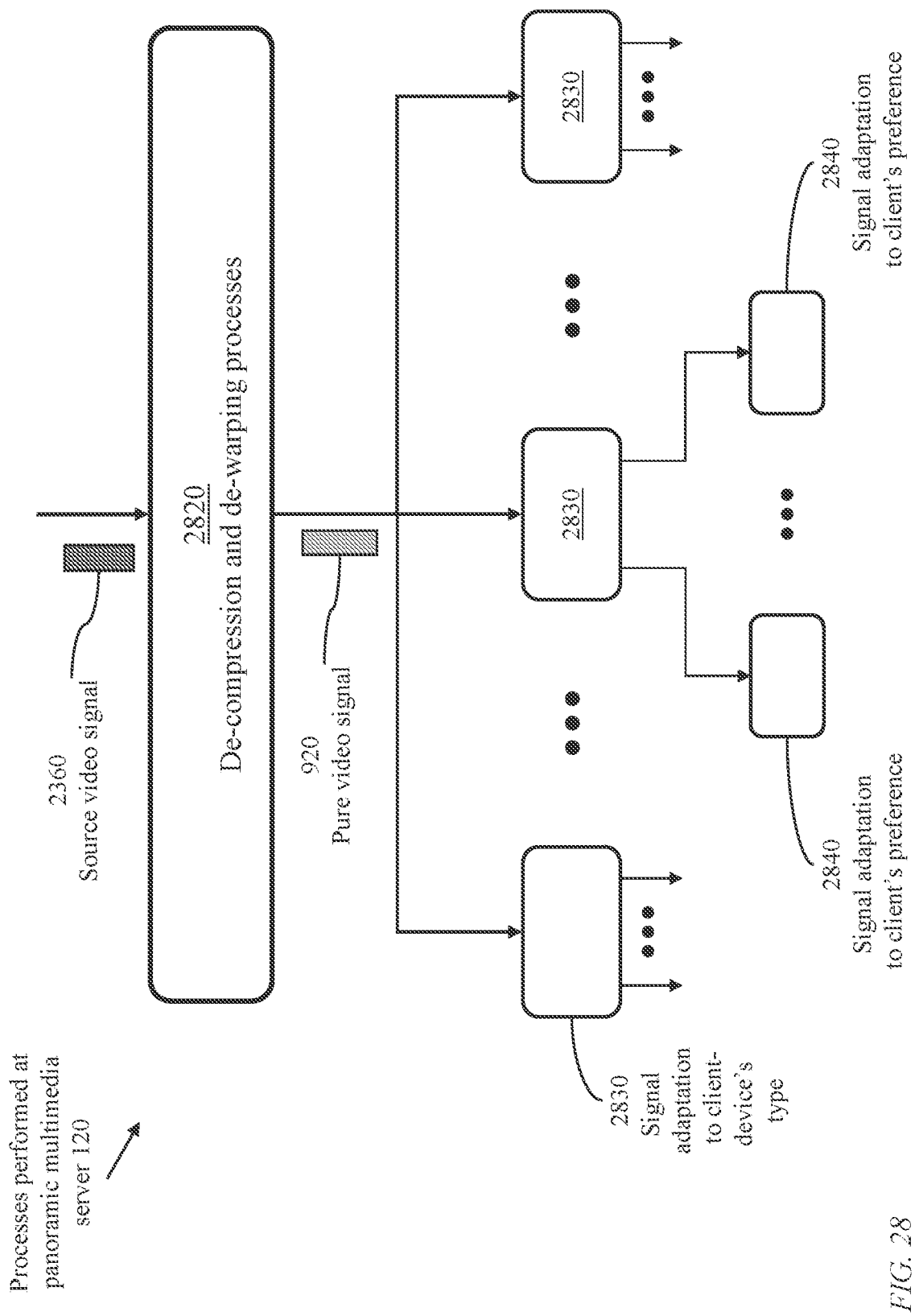
FIG. 28 illustrates processes performed at a panoramic multimedia server where a panoramic video signal is adapted to client-device types then content filtered, in accordance with an embodiment of the present invention.

FIG. 28 illustrates processes performed at panoramic multimedia server 120 where a panoramic video signal is adapted to client-device types then content filtered. In process 2820, a received source video signal 2360 is decompressed if the source video signal 2340 has been compressed at source. The received source video signal 2360 is de-warped if the source video signal 2340 has not been de-warped at source. Process 2820 produces a pure video signal 920, which may be a corrected video signal 322 or a rectified video signal 324 (FIG. 3) as described above. Multiple processes 2830 may be executed in parallel to transcode pure video signal 920 to video signals adapted to different types of client devices.

Each of processes 2830 is specific to client-device type. A process 2830 transcodes the pure video signal 920 resulting from process 2820 to produce a modified signal suitable for a respective client-device type. Several clients may be using devices of a same type. However, the clients may have different viewing preferences. A video signal produced by a process 2830 is adapted in process 2840 to a view-region selection of a respective (human) client. However, if two or more clients using devices of a same type also have similar viewing preferences, a single process 2840 may be executed and the resulting adapted signal is transmitted to the two or more clients.

Figure 29:
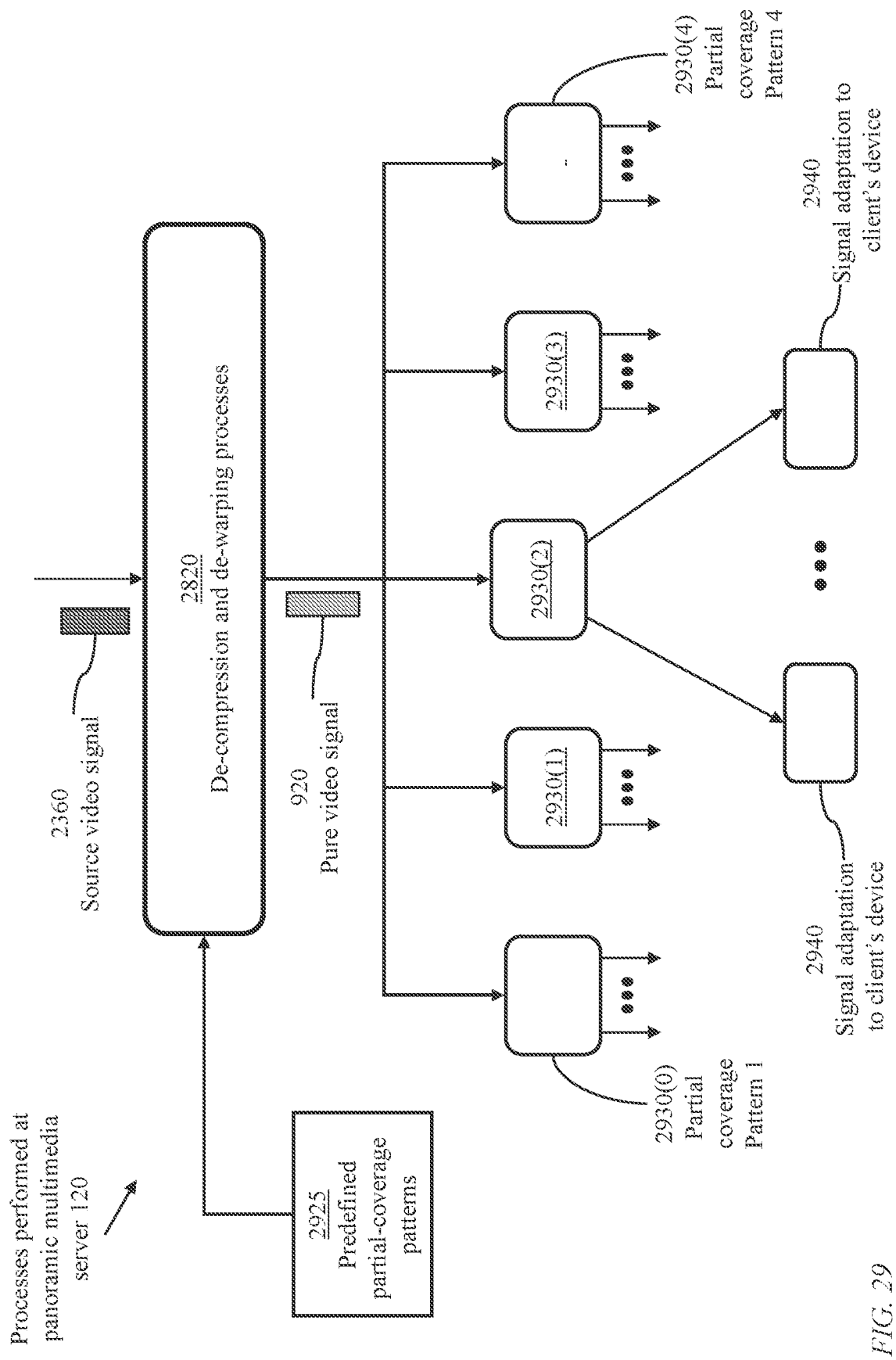
FIG. 29 illustrates processes performed at panoramic multimedia server where a panoramic video signal is content filtered then adapted to client-device types, in accordance with another embodiment of the present invention.

FIG. 29 illustrates processes performed at panoramic multimedia server 120 where a panoramic video signal is content filtered then adapted to client-device types. As in process 2820 of FIG. 28, a received source video signal 2360 is decompressed if the source video signal 2340 has been compressed at source. The received source video signal 2360 is de-warped if the source video signal 2340 has not been de-warped at source. Process 2820 produces a pure video signal 920, which may be a corrected video signal 322 or a rectified video signal 324 (FIG. 3) as described above. A memory device stores a set 2925 of predefined descriptors of partial-coverage view regions.

Multiple processes 2930 may be executed in parallel to perform content filtering of pure video signal 920 to produce content-filtered video signals corresponding to the predefined descriptors of partial-coverage view regions. Multiple processes 2940 may be executed in parallel to adapt a content-filtered video signal to different types of client devices. If two or more clients select a same view region and use client devices of a same type, a single process 2940 is executed and the resulting adapted video signal is transmitted to the two or more clients.

Figure 30:
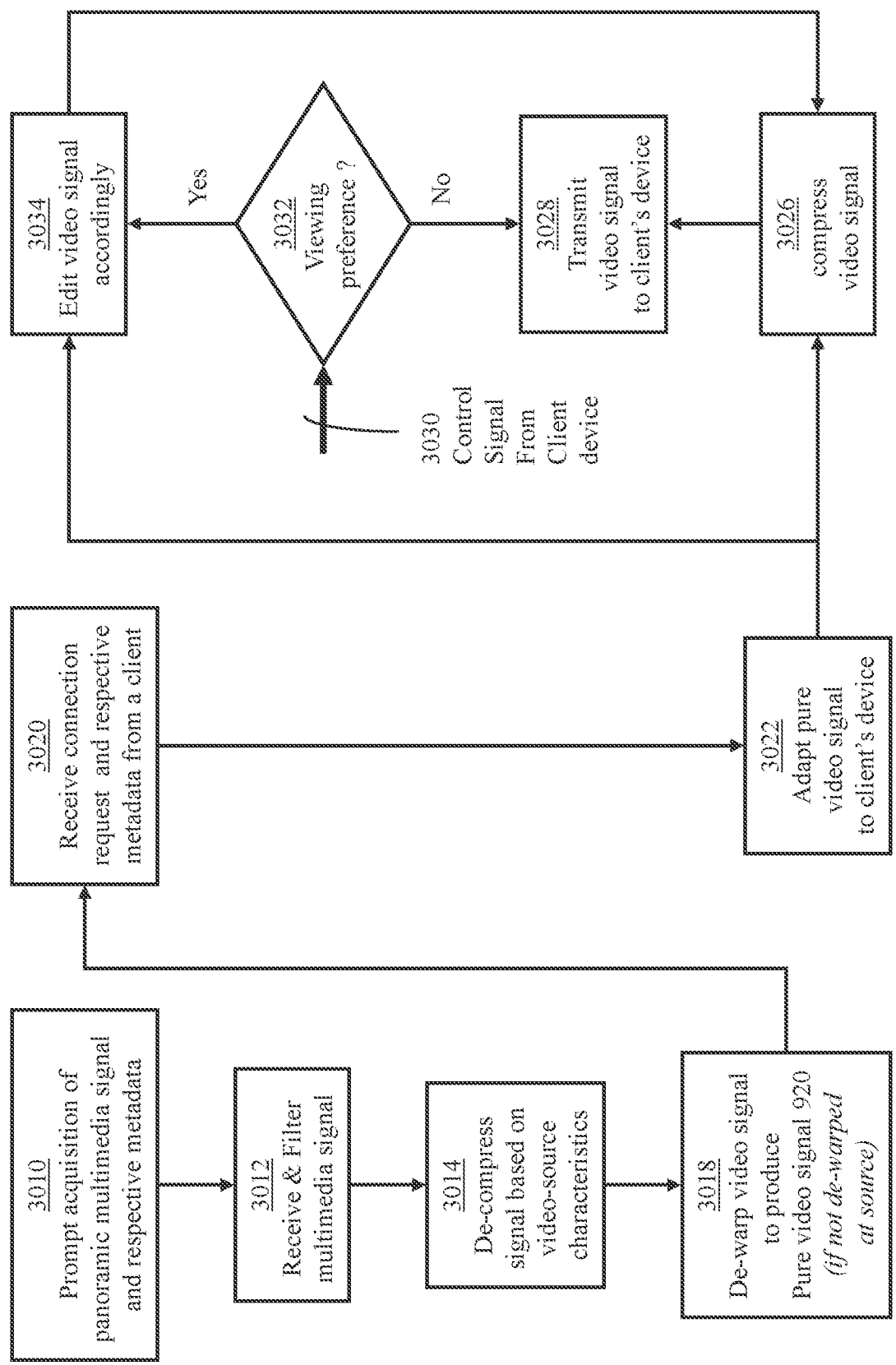
FIG. 30 is a flow chart depicting processes of acquisition of a panoramic multimedia signal and adapting the acquired multimedia signal to individual clients, in accordance with an embodiment of the present invention.

FIG. 30 illustrates a method of acquisition of a panoramic multimedia signal and adapting the acquired multimedia signal to individual clients. The panoramic multimedia server 120 acquires a panoramic multimedia signal and, preferably, respective metadata from a selected panoramic multimedia source 110 (process 3010). The acquired panoramic multimedia signal includes a source video signal which may be a raw video signal, corrected video signal, compressed video signal, or a compact video signal as illustrated in FIG. 3. The source video signal is filtered to offset degradation caused by noise and delay jitter (process 3012) and decompressed if the signal has been compressed at source (process 3014). The so-far-processed signal is de-warped if not originally de-warped at source (process 3018). Processes 3010 to 3018 yield a pure video signal 920.

When a service request is received from a client (process 3020), the pure video signal 920 is adapted to the characteristics of the client's device (process 3022). The adapted signal is compressed (process 3026) and transmitted to the client device (process 3028). Process 3026 takes into consideration flow-rate constraints which may be dictated by condition of the network path from the server to the client device The client may prefer a specific view region and communicate with the panoramic multimedia server 120 to indicate the preference. Upon receiving a control signal 3030 from the client specifying a preferred view region (process 3032), the adapted signal produced in process 3022 is content filtered (process 3034), compressed (process 3026), and transmitted to the client device (process 3028). The pure view signal 920 may be content-filtered several times during a streaming session.

Figure 31:
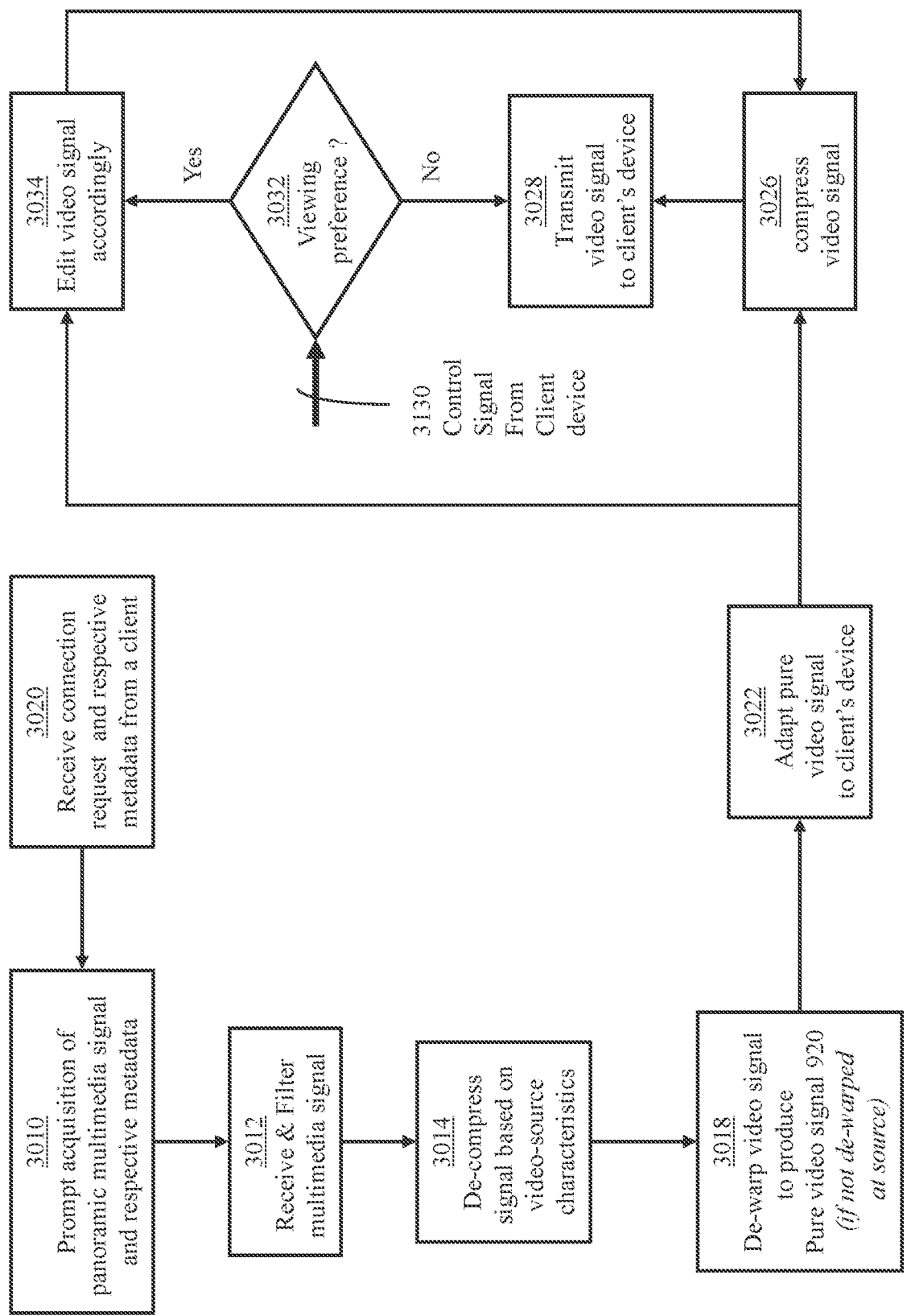
FIG. 31 is a flow chart depicting executing the processes of FIG. 30 in a different order, in accordance with another embodiment of the present invention.

FIG. 31 illustrates a method, similar to the method of FIG. 30, of acquisition of a panoramic multimedia signal and adapting the acquired multimedia signal to individual clients. The only difference is the order of executing processes 3010, 3020, and 3022.

FIG. 32 illustrates an exemplary streaming-control table 3200 corresponding to a specific panoramic multimedia source 110 maintained at the panoramic multimedia server 120. An edited multimedia signal 940 (FIG. 9, FIG. 24) delivered to a specific client device 180 depends on the characteristics of the client device and on the viewing preference of a viewer using the client device. With a large number of client devices 180 connecting concurrently to a panoramic multimedia server 120 (watching an activity in real time), it is plausible that:

(i) numerous clients use client devices 180 of the same characteristics but have differing viewing preferences;
(ii) numerous clients have similar viewing preferences but use client devices of differing characteristics; and/or
(iii) two or more clients use client devices of the same characteristics and have the same viewing preferences.

Thus, to reduce the processing effort of the panoramic multimedia server 120:

module 2643 may be exercised only once for all client devices of the same characteristics then module 2663 is exercised only once for all clients having similar client devices and similar viewing preferences; or module 2663 may be exercised only once for all clients having similar viewing preferences then module 2643 is exercised only once for all clients having similar viewing preferences and similar client devices.

As described earlier, module 2643 is devised for signal adaptation to client-device characteristics and module 2663 is devised for signal adaptation to a client's viewing preference.

The clients' requests for service may arrive in a random order and a simple way to track prior signal adaptation processes is to use a streaming control table 3200 (FIG. 32). Table 3200 is null initialized. In the example of FIG. 32, there are eight types of client devices 180, denoted D0, D1, . . . , D7, and there are six view options denoted V0, V1, . . . , V5, quantified, for example, according to viewing solid angles. A first client accessed the panoramic multimedia server 120 using a client device of type D1 and requested viewing option V3. A stream denoted stream-0 is then created and indicated in control table 3200. Another stream, denoted stream 1, is created for another client using a client device 180 of type D5 and specifying viewing option V2, and so on. Only six streams are identified in control table 3200, but it is understood that with a large number of simultaneously connected client devices 180 there may be numerous streams. When a new request from a client is received, control table 3200 is accessed to determine whether a new stream need be created or an existing stream be directed to the client. All of the streams corresponding to a device type are herein said to form a "stream category".

Figure 33:
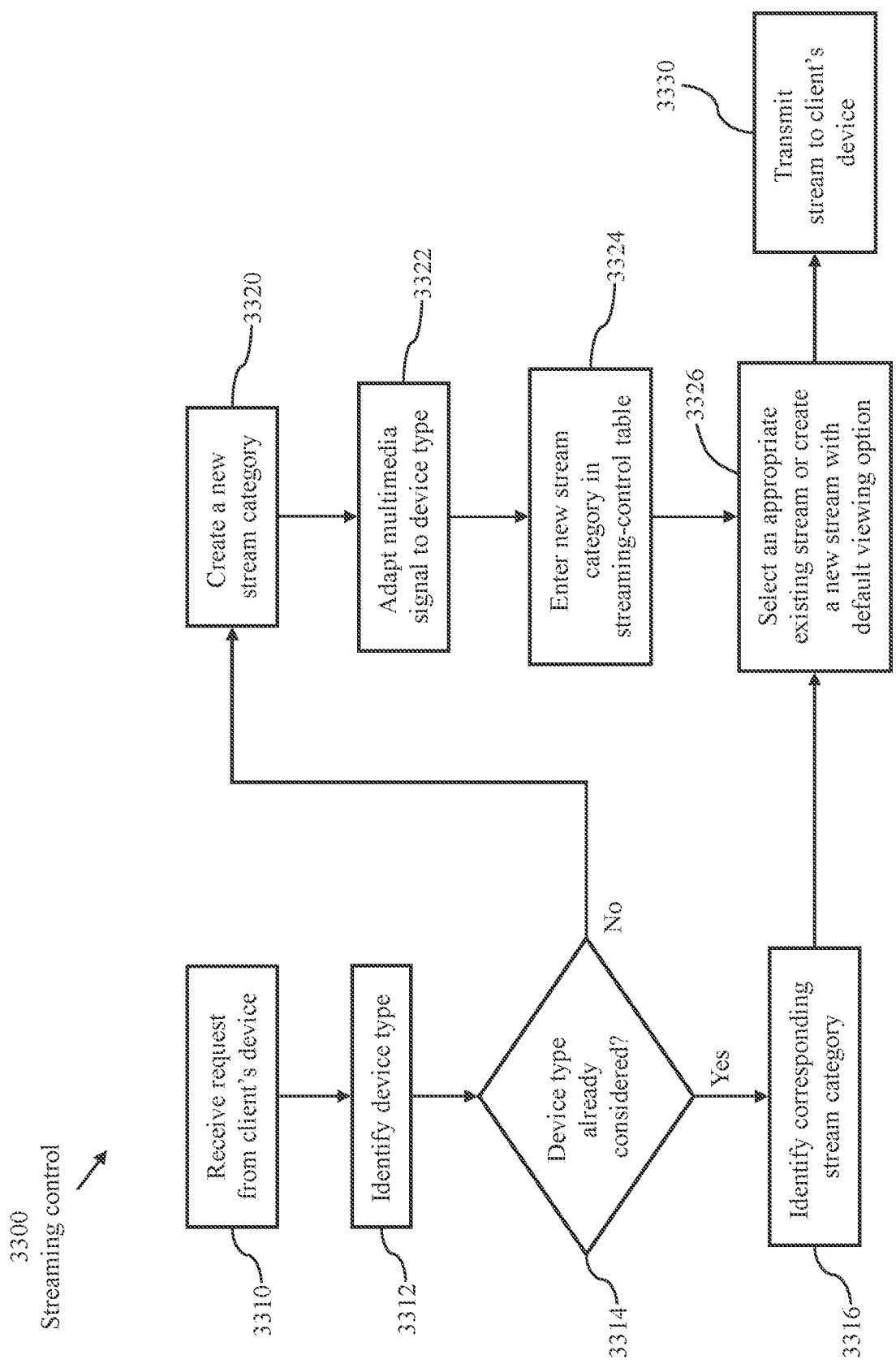
FIG. 33 illustrates a process of initial adaptation of a multimedia signal for a specific client, in accordance with an embodiment of the present invention.

FIG. 33 illustrates a streaming control process 3300 of initial adaptation of a video-signal for a specific client device 180. A request for service is received at client-interface module 2661 from a client device 180 (process 3310) and the type of client device 180 is identified (process 3312). Process 3314 determines whether the device type has been considered.

If the client device type has not been considered (process 3314), a new stream category is created (process 3320) and the pure video signal 920 is adapted to the device type (process 3322). The new stream category is recorded (process 3324), a new stream is created (process 3326) and transmitted to the specific client device (process 3330).

If the device type has already been considered (process 3314), a stream category is identified (process 3316). At this point, the client may not have indicated a viewing preference and a default viewing option may be assigned. If a stream corresponding to an identified view region has already been created (process 3326), the stream is transmitted to the specific client device (process 3330). Otherwise, a new stream is created (process 3326) and transmitted to the specific client device (process 3330).

FIG. 34 illustrates an exemplary table 3400 produced by the learning module 2725 indicating a count of viewing options for each type of client devices 180. Eight client-device types denoted D0, D1, . . . , D7 and six viewing options denoted V0, V1, . . . , V5 are considered. The table may accumulate a count of selections of each stream defined by a device type and a viewing option over a predefined time window which may be a moving time window.

In the exemplary table of FIG. 34, the most popular viewing option for clients using the client-device denoted D1 is viewing option V3 (selected 64 times over the time window). Thus, a new request for service received at the panoramic multimedia server 120 from a client device of type D1 may be initially assigned viewing option V3.

Figure 35:
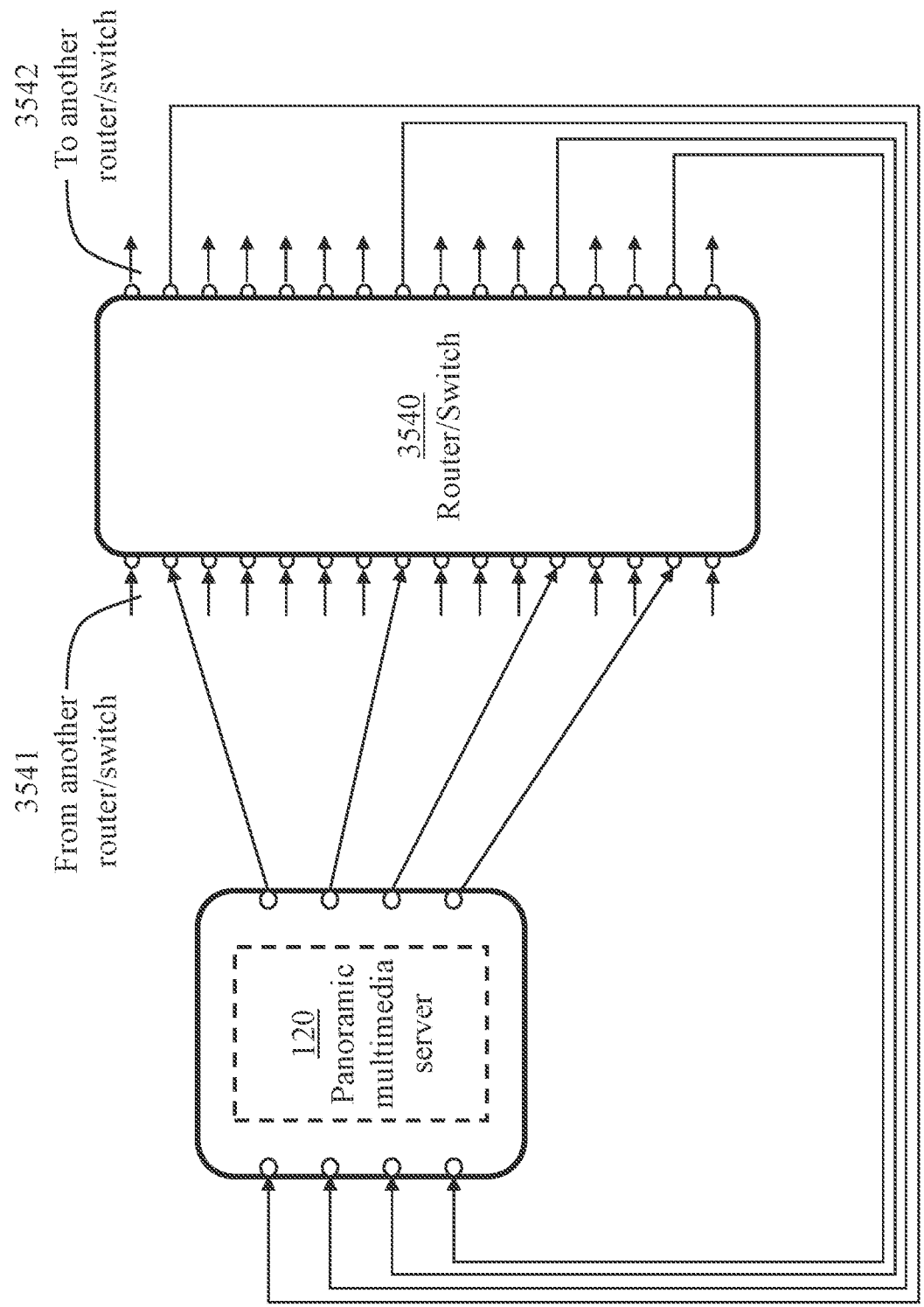
FIG. 35 illustrates coupling the panoramic multimedia server to a router-switch of a network, in accordance with an embodiment of the present invention.

FIG. 35 illustrates coupling the panoramic multimedia server 120 to a network. The panoramic multimedia server 120 may be implemented in its entirety within a cloud computing network and communication with the client devices 180 may also take place within the cloud computing network. Alternatively, the generated client bound streams 940 may be routed to the client devices through a router/switch 3540 of another network. Router-switch 3540 may connect to numerous other servers or other router-switches through input ports 3541 and output ports 3542.

Figure 36:
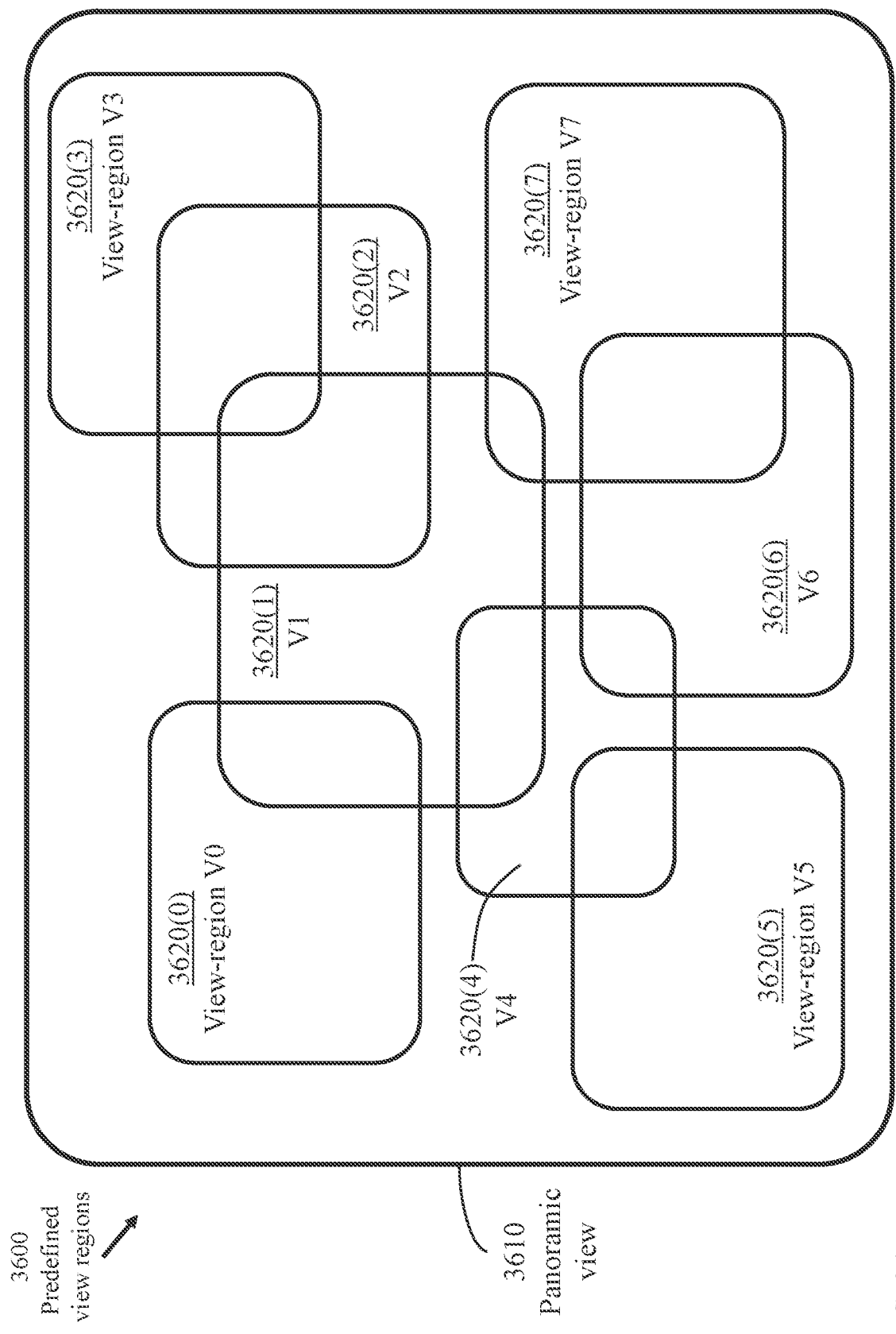
FIG. 36 illustrates predefined view-regions of a panoramic view.

FIG. 36 illustrates a plurality 3600 of predefined view-regions of a panoramic view. In the example of FIG. 36, eight view-region 3620, individually labelled {V0, V1, . . . , V7} are predefined within a frame 3610 of a panoramic view. For each predefined view region, a respective partial-coverage video signal (view-region-specific video signal) is extracted from a pure video signal derived from a source video signal capturing the panoramic view. The predefined view regions, V0 to V7, may partially overlap. The view regions are preferably selected to be of rectangular shapes to simplify extracting respective partial-coverage video signals from the pure video signal.

Figure 37:
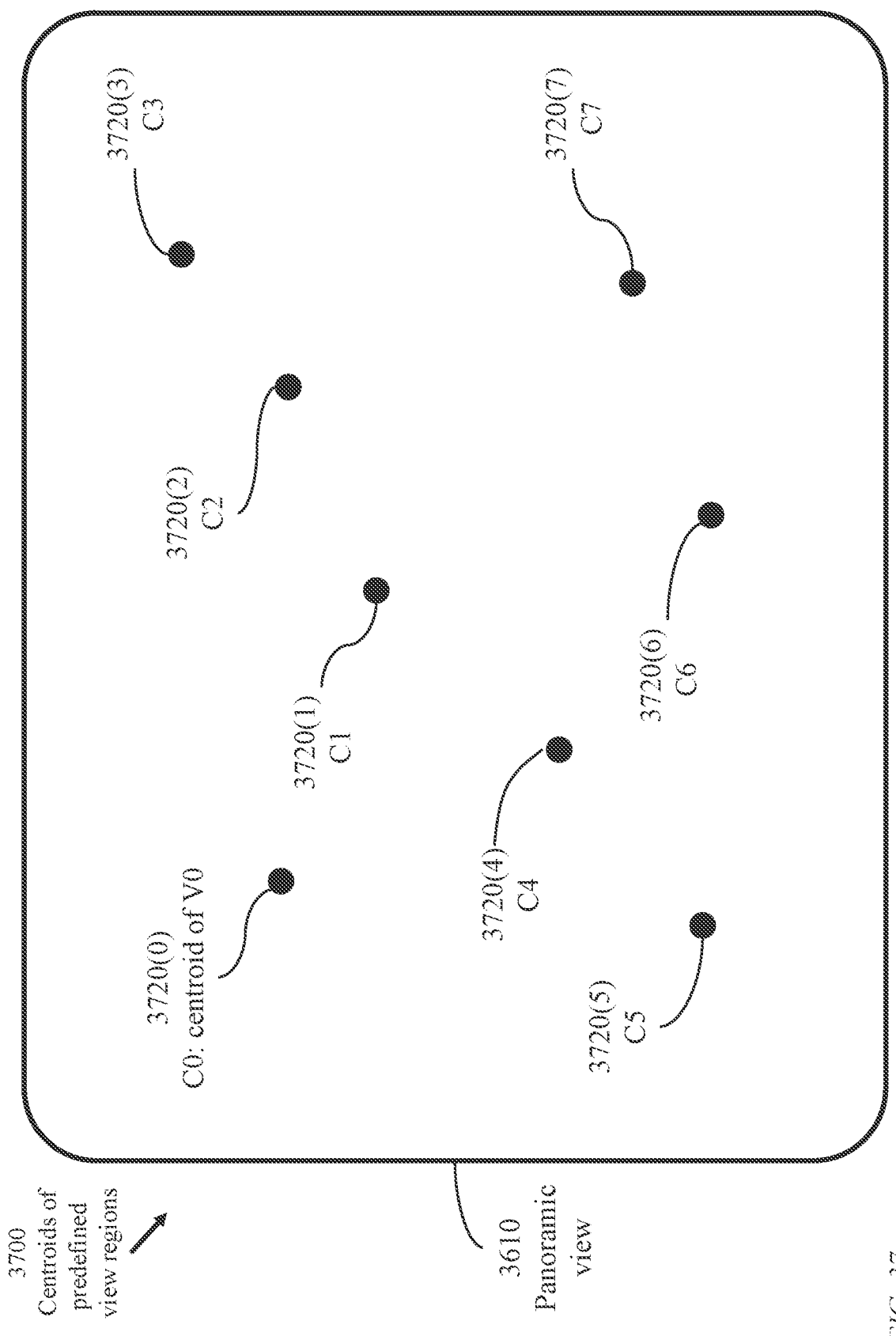
FIG. 37 illustrates centroids of the predefined view regions of FIG. 36.

FIG. 37 illustrates a plurality 3700 of centroids 3720 of the predefined view regions of FIG. 36. Selecting the view regions 3620 to be of rectangular shapes, the centroid of a view region is easily determined.

Figure 38:
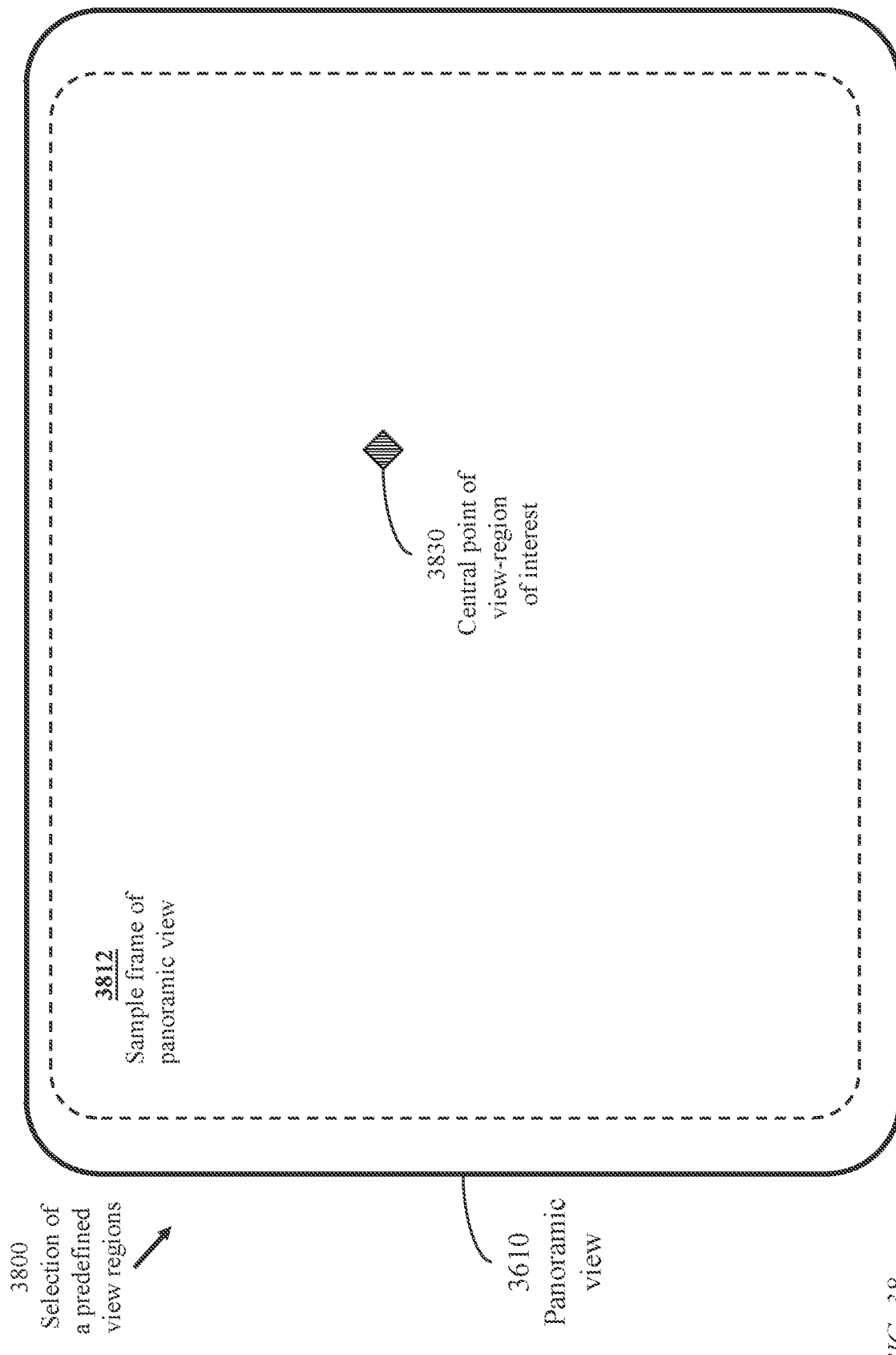
FIG. 38 illustrates selection of a view-region of interest based on a display of a derivative video signal, in accordance with an embodiment of the present invention.

FIG. 38 illustrates a process 3800 of selecting a view-region of interest based on a display of a derivative video signal derived from the pure video signal to have a flow rate not exceeding the transport capacity of a path from the server 120 to a client device. As described above, a derivative video signal may be generated as a frame-sampled video signal 1322 (FIG. 13, FIG. 15) of a constant flow rate not exceeding a predefined nominal flow rate.

A sample frame 3812 of the display of the derivative video signal is illustrated. Rather than defining a contour of a view region of interest, a user of the client device may only select a central point 3830 of a view region of interest. Alternatively, a user of the client device may define a view region of interest as:
  a rectangle, in which case only two points defining a diagonal need be indicated;
  a circle, where a centre and any point on the circumference would suffice; or
  any regular polygon, where indications of some vertices would be needed.

It may also be desirable to define at least one view region of interest as any other arbitrary shape.

Figure 39:
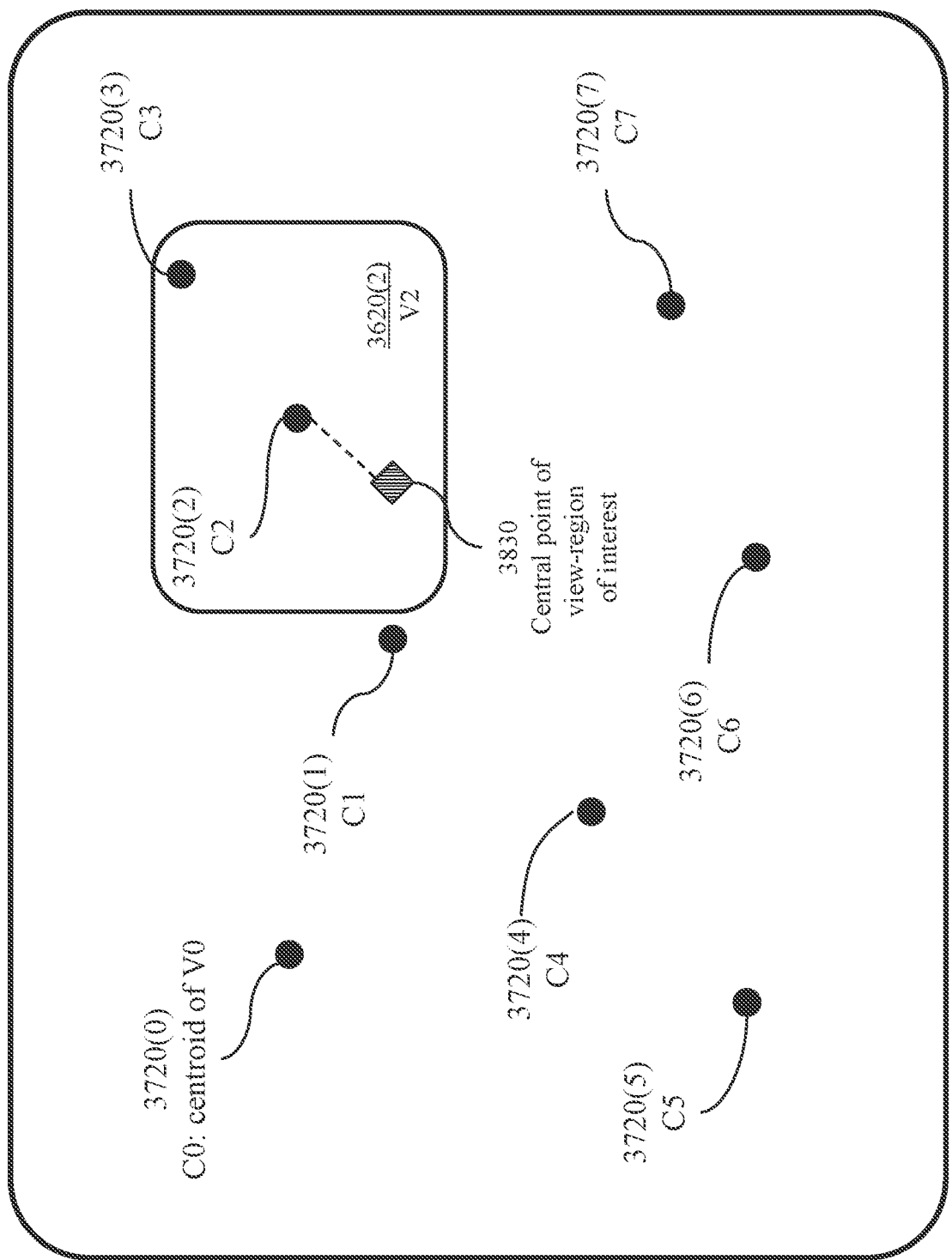
FIG. 39 illustrates selection of a predefined view-region based on proximity to a view-region of interest, in accordance with an embodiment of the present invention.

FIG. 39 illustrates a process 3900 of selecting a predefined view-region based on proximity to a view-region of interest based on computing the distance between the central point 3830 and each of centroids 3720 of the predefined view regions.

If the indication of a view region of interest is a location of a selected point within a display of the frame samples, the proximity of each predefined region to the view region of interest is determined as a Euclidean distance between a centroid of a predefined region and the selected point.

If the indication of a view region of interest is a user-defined shape, within the display of the frame samples, such as a rectangle, a circle, a polygon, or any other arbitrary shape, the proximity of each predefined region to the view region of interest is determined based on intersection of a predefined view region and the user-defined shape.

Figure 40:
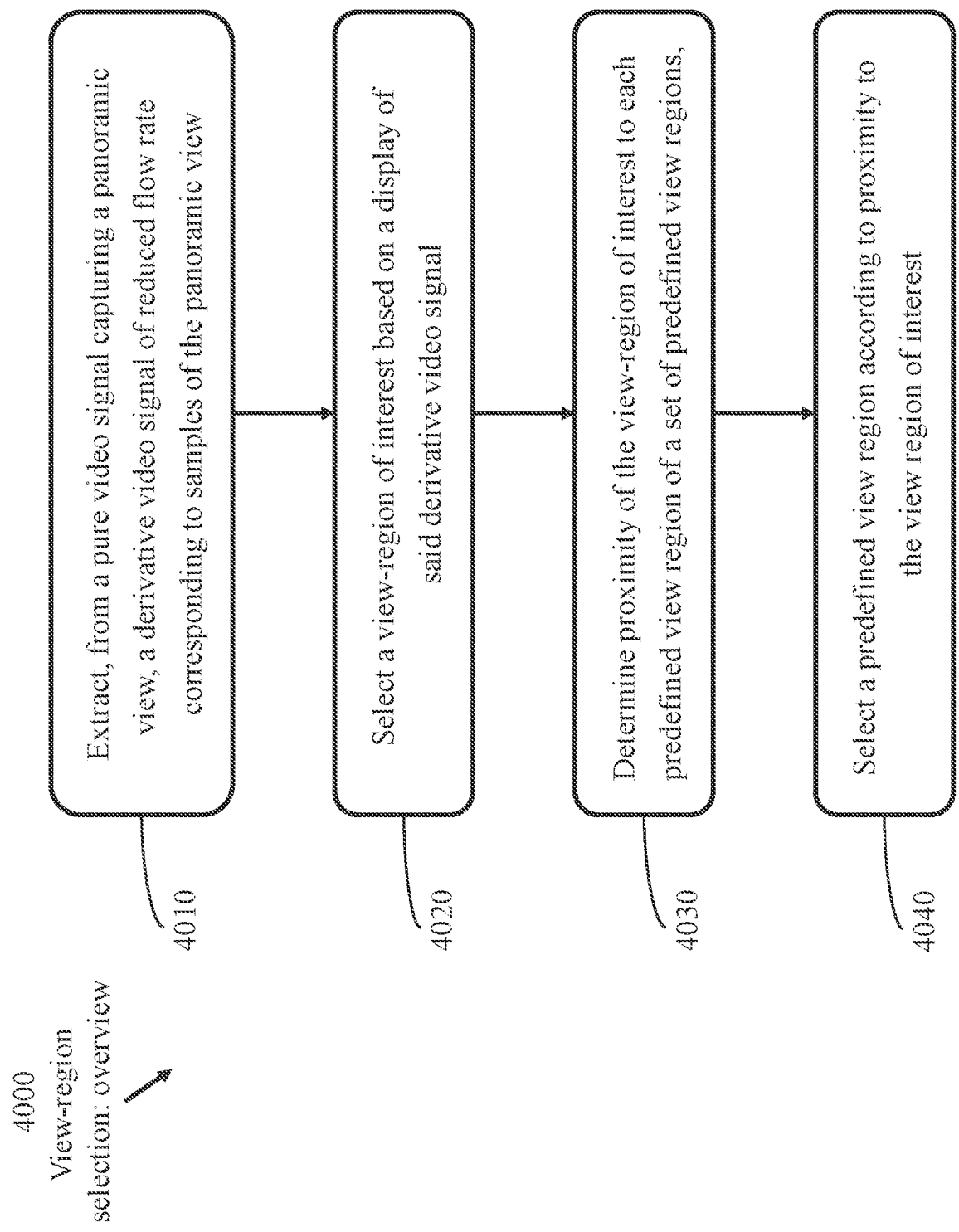
FIG. 40 depicts an overview of a method of view-region selection, in accordance with an embodiment of the present invention.

FIG. 40 depicts an overview 4000 of a method of view-region selection. A process 4010 extracts a derivative video signal from a pure video signal. The derivative video signal may comprise sample frames of the pure video signals selected so that the flow rate does not exceed a permissible flow rate. A process 4020 selects a view region of interest based on a display of the derivative video signal. A process 4030 determines proximity of the view-region of interest to the predefined view regions. In general, the proximity may be based on an overlap of a view region of interest and each of the predefined view regions. However, the distance between the central point of a view region of interest and the centroids 3720 is an appropriate indicator of proximity. A process 4040 selects the nearest predefined view region to the view region of interest to be streamed to the client device.

Figure 41:
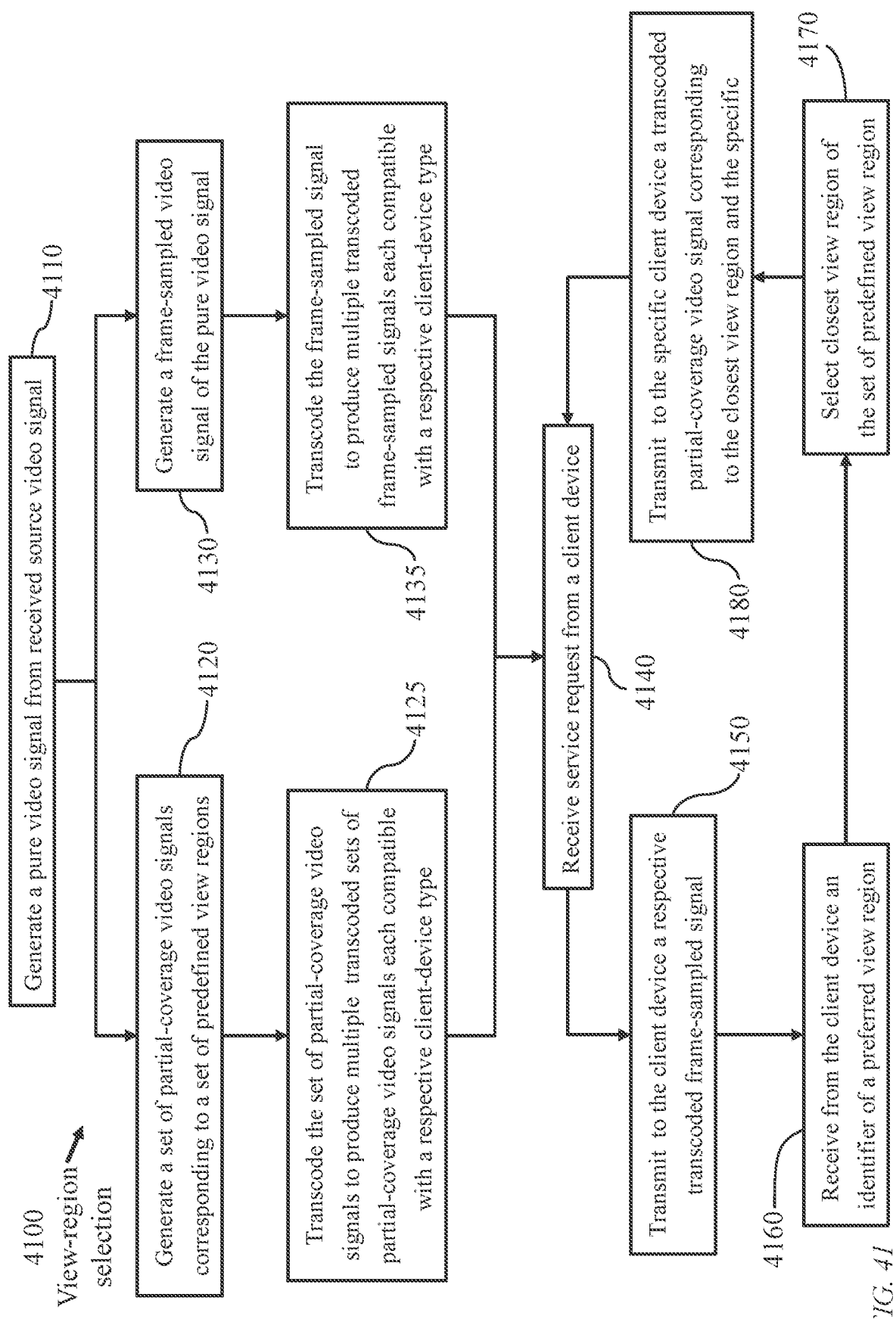
FIG. 41 details processes of view-region selection, in accordance with an embodiment of the present invention.

FIG. 41 details processes 4100 of view-region selection. A process 4110 generates a pure video signal from a source video signal which may be warped and/or compressed. The pure video signal accurately represents a captured panoramic view. A process 4120 generates a set of partial-coverage video signals corresponding to a set of predefined view regions. A process 4125 transcodes the set of partial-coverage video signals to be compatible with client-device types of a set of predefined client-device types. A process 4130 generates a frame-sampled video signal as described above. The frame-sampled video signal may have a flow rate not exceeding a common permissible flow rate or may be individually adapted to capacities of individual network paths from the server to client devices. A process 4135 transcodes the frame-sampled video signal to be compatible with client-device types of a set of predefined client-device types.

The server continually receives requests for service from a plurality of client devices and stream appropriate partial video signals in response. A process 4140 receives a service request from a client device. A process 4150 transmits a transcoded frame-sampled signal to the client device. A process 4160 receives from the client device an identifier of a preferred view region. The identifier may simply be a central point 3830 of a view region of interest. A process 4170 selects a predefined view region determined to be the nearest to the client's view region of interest. A process 4180 transmits a transcoded partial-coverage video signal corresponding to the selected predefined view region.

Figure 42:
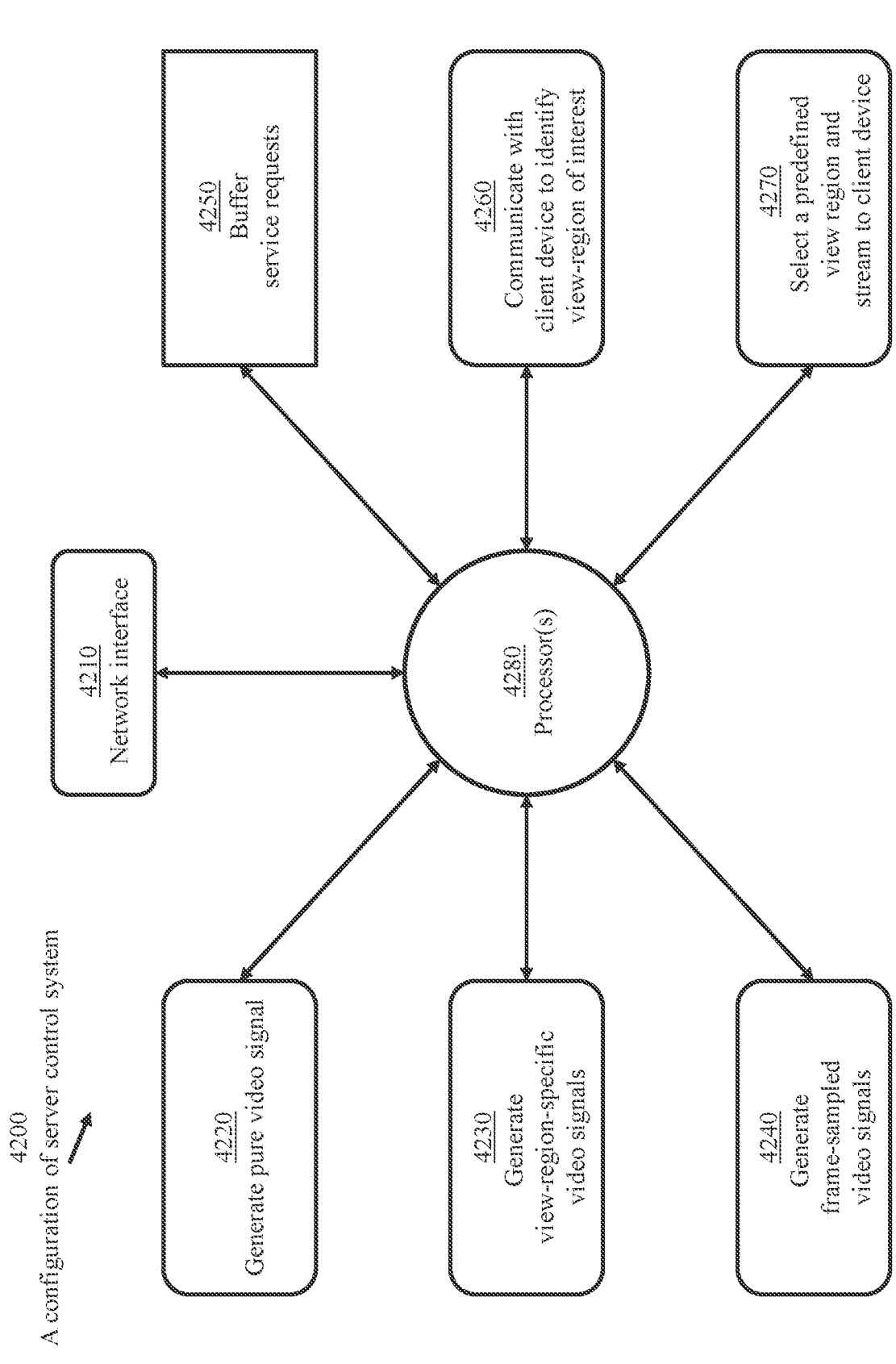
FIG. 42 illustrates a configuration of a control system of a server 120, in accordance with an embodiment of the present invention.

FIG. 42 illustrates a configuration of a control system 4200 of a server 120. The control system comprises a central processor 4280 coupled to network interface 4210, video-signal processing modules 4220, 4230, and 4240, interactive modules 4260 and 4270, and buffer 4250.

The network interface 4210 and modules 4220, 4230, 4240, 4260, and 4270 may have respective hardware processors, or may dynamically share a plurality of hardware processors.

Network interface 4210, similar to network interface 1010, comprises a memory device holding software instructions causing a respective processor to:

receive a source multimedia signal comprising a panoramic video signal from a single panoramic camera or a video signal produced by combining individual video signals from multiple cameras;

receive service requests from the plurality of clients 180 (FIG. 2); and transmit to the plurality of clients control data, derivative video signals, and view-region-specific video signals.

Module 4220 comprises a memory device holding software instructions which cause a respective processor to generate a pure video signal (process 4110) from a source multimedia video signal which may be warped and/or compressed.

Module 4230 comprises a memory device holding software instructions which cause at least one processor to generate a set of view-region-specific video signals (process 4120) corresponding to a set of predefined view regions. The instructions further cause the at least one processor to transcode (process 4125) the set of partial-coverage video signals (view-region-specific video signal) to be compatible with client-device types of a set of predefined client-device types.

A module 4240 comprises a memory device holding software instructions which cause a respective processor to generate a derivative video signal, such as a frame-sampled video signal (process 4130). The instructions further cause the processor to transcode the frame-sampled video signal (process 4135) to produce multiple transcoded frame-sampled signals to be compatible with client-device types of a set of predefined client-device types.

Buffer 4250 holds service requests received from client devices 180 through network interface 4210 (process 4140).

Module 4260 comprises a memory device holding software instructions which cause a respective processor to transmit a transcoded frame-sampled signal to a client device (process 4150), and receive from the client device an identifier of a view region of interest (process 4160).

Module 4270 comprises a memory device holding software instructions which cause a respective processor to select a predefined view region (process 4170) determined to be the nearest to the client's view region of interest, and transmit a transcoded partial-coverage video signal (view-region-specific video signal) corresponding to the selected predefined view region (process 4180).

Figure 43:
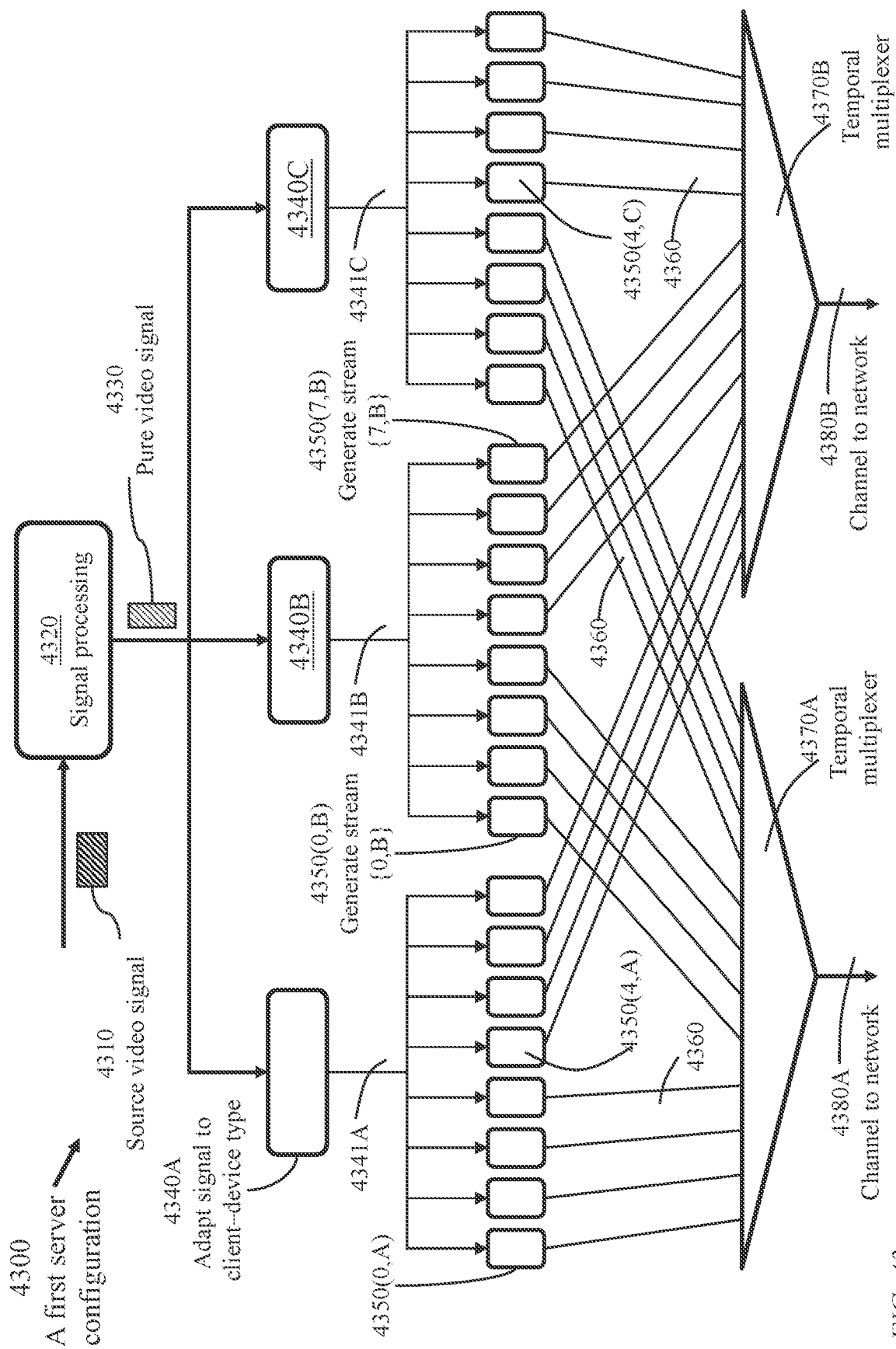
FIG. 43 illustrates a first configuration of a streaming server, in accordance with an embodiment of the present invention.

FIG. 43 illustrates a first configuration 4300 of a streaming server configured for multicasting view-region-specific video signals. A signal-processing unit 4320 receives a source video signal 4310 and produces a pure video signal 4330 as described above (FIGS. 3 to 8). A transcoding unit 4340 adapts the pure video signal to a client-device type pure video signal compatible with a specific client-device type. In the example of FIG. 43, only three client-device types are considered to simplify the illustration. Each of transcoding units 4340A, 4340B, and 4340C adapts the pure video signal to a respective client-device type.

A content filter 4350 extracts, from a pure video signal that is transcoded to adapt to a client-device type, a partial-coverage video signal corresponding to a specific view region. In the example of FIG. 43, only eight predefined view regions are considered to simplify the illustration. Content filter 4350 may further compress the partial-coverage video signal.

Each of content filters 4350($j$, A), $0 \le j < 8$, extracts a partial-coverage video signal corresponding to a respective view region (one of V0 to V7) from a device-adapted pure video signal 4341A processed in transcoding unit 4340A. Likewise, each of content filters 4350($j$, B), $0 \le j < 8$, extracts a partial-coverage video signal corresponding to a respective view region from a device-adapted pure video signal 4341B processed in transcoding unit 4340B. Each of content filters 4350($j$, C), $0 \le j < 8$, extracts a partial-coverage video signal corresponding to a respective view region from a device-adapted pure video signal 4341C processed in transcoding unit 4340C.

An output channel 4360 carries a partial-coverage video signal, or a compressed partial-coverage video signal, to an input port of a temporal multiplexer 4370 which combines a number of partial-coverage video signals (outputs of content filters 4350) into a stream of partial-coverage video signals. A channel 4380 connects a temporal multiplexer to network 150 (FIG. 2). In the example of FIG. 43, only two temporal multiplexers are used. However, the number of channels 4360 connecting to the input side of a temporal multiplexer and, consequently, the number of temporal multiplexers, are design parameters. Channel 4380A connects a temporal multiplexer 4370A to network 150. Channel 4380B connects a temporal multiplexer 4370B to network 150.

Preferably, where multiple temporal multiplexers are used, channels 4360 carrying streams directed to client devices of a same type are equitably distributed among the temporal multiplexers for load-balancing purposes.

Figure 44:
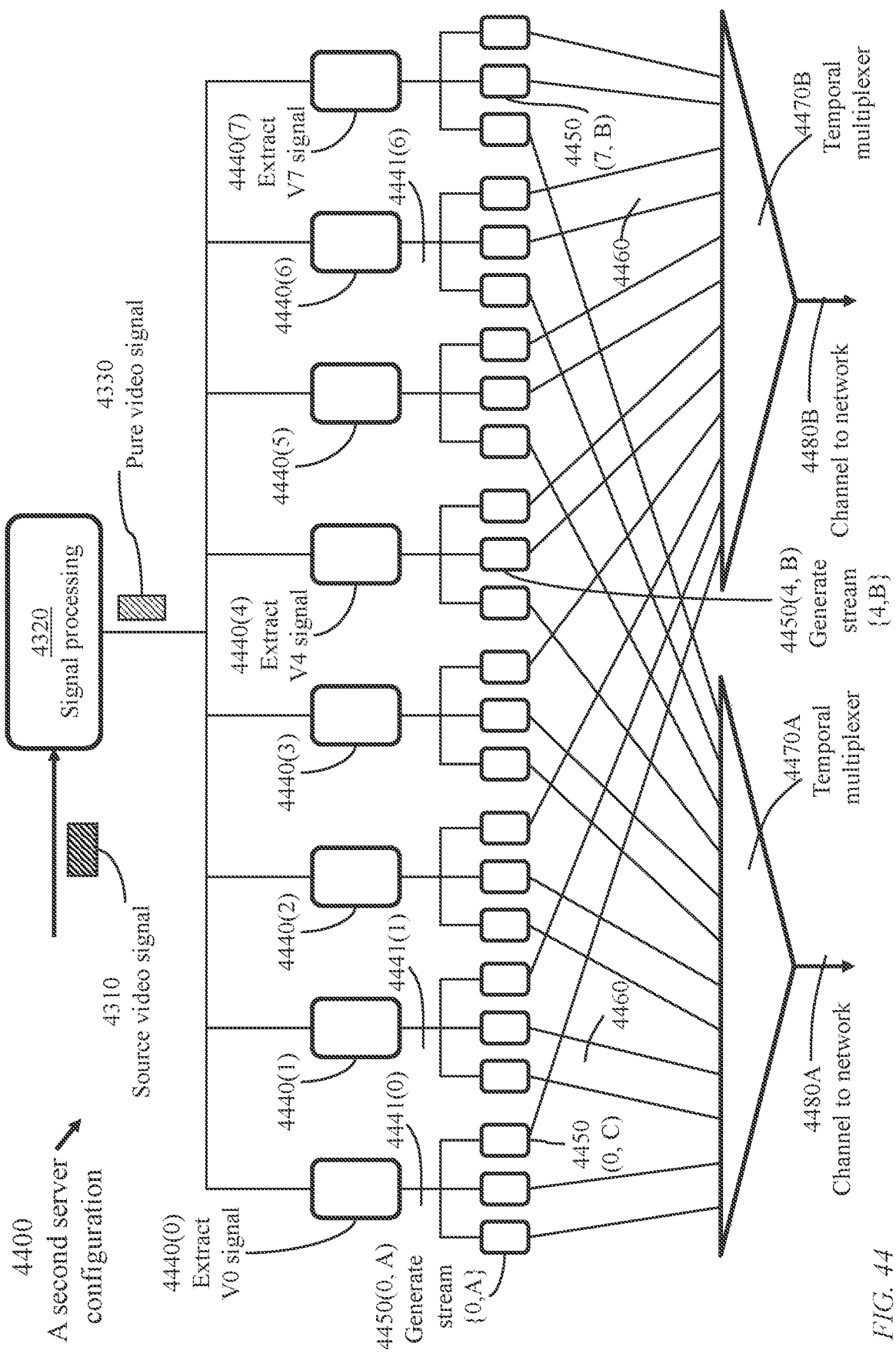
FIG. 44 illustrates a second configuration of a streaming server, in accordance with an embodiment of the present invention.

FIG. 44 illustrates a second configuration 4400 of a streaming server. As in configuration 4300, a signal-processing unit 4320 receives a source video signal 4310 and produces a pure video signal 4330 as described above (FIGS. 3 to 8).

A content filter 4440 extracts, from pure video signal 4330, a partial-coverage video signal (view-region-specific video signal) corresponding to a specific view region. In the example of FIG. 44, only eight predefined view regions are considered. Each of content filter 4440(0) to 4440(7) extracts a respective partial-coverage video signal 4441 corresponding to a respective view region (one of V0 to V7) from pure video signal 4330. The extracted partial-coverage video signals are referenced as 4441(0) to 4441(7).

A transcoding unit 4450 adapts a partial-coverage video signal to a client-device type and may further compress the adapted partial-coverage video signal. In the example of FIG. 44, only three client-device types are considered. Each of transcoding units 4450(0, A), 4450(0, B), and 4450(0, C) adapts partial-coverage video signal 4441(0) to a respective client-device type. Likewise, each of transcoding units 4450 (j, A), 4450(j, B), and 4450(j, C) adapts partial-coverage video signal 4441(j) to a respective client-device type, 0<j<8.

An output channel 4360 carries an output of a transcoding units 4350 (a partial-coverage video signal or a compressed partial-coverage video signal) to an input port of a temporal multiplexer 4370 which combines a number of partial-coverage video signals (outputs of transcoding units 4350) into a stream of partial-coverage video signals (view-region-specific video signals). A channel 4380 connects a temporal multiplexer to network 150 (FIG. 2). As in the configuration of FIG. 43, where multiple temporal multiplexers are used, channels 4360 carrying streams directed to client devices of a same type are equitably distributed among the temporal multiplexers.

Figure 45:
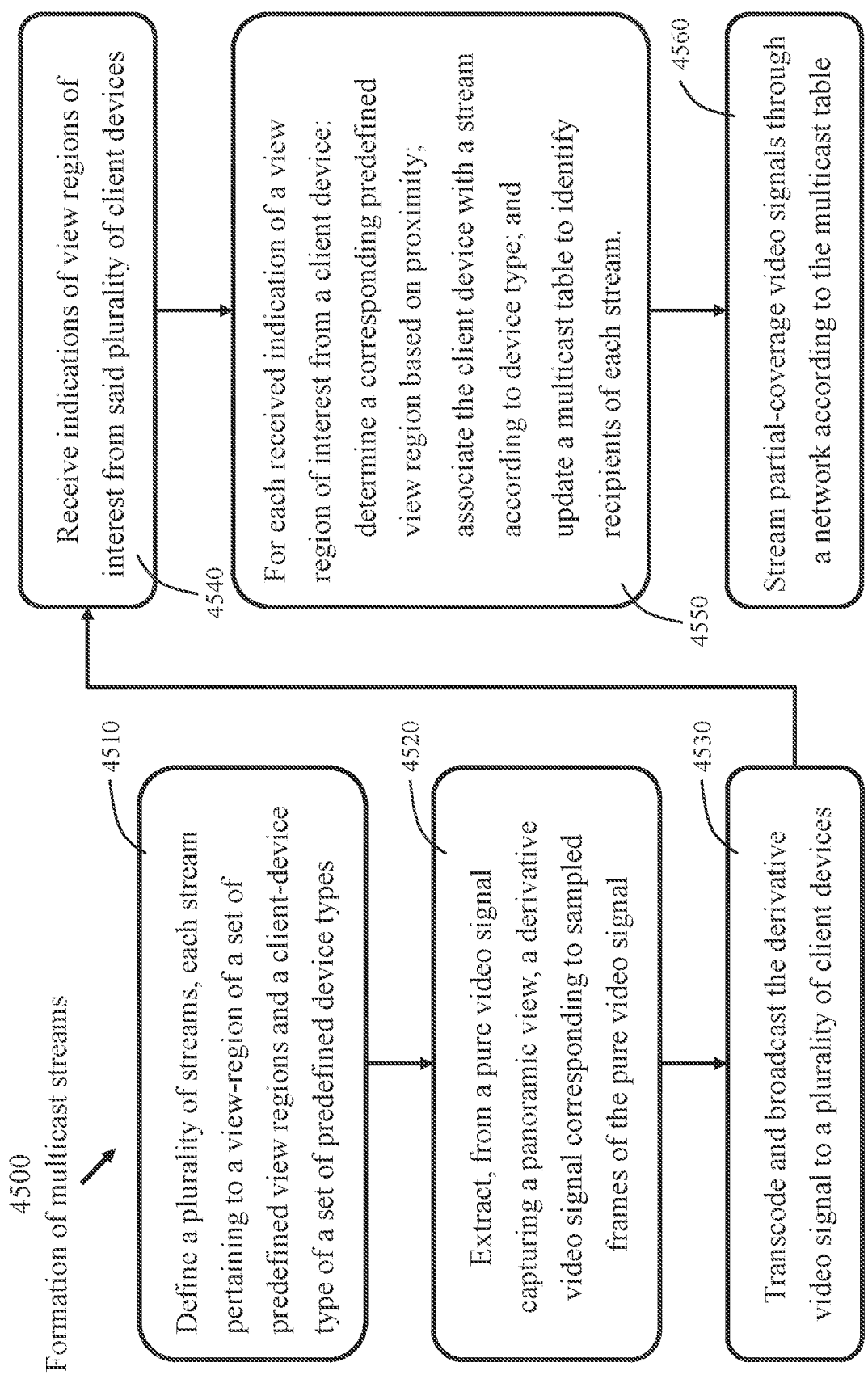
FIG. 45 illustrates a method of forming multiple streams, each stream corresponding to a single view region and addressed to all client devices of a same type, in accordance with an embodiment of the present invention.

FIG. 45 illustrates a method 4500 of forming multiple streams, where each stream corresponds to a single view region and is addressed to all client devices of a same type. Process 4510 defines aggregate streams based on predefined view regions and client-device types as illustrated in FIG. 46. Process 4520 extracts a derivative video signal from a pure video signal as described above (FIGS. 3 to 8). The derivative video signal may be a frame-sampled pure video signal. Process 4530 broadcasts the derivative video signal to a plurality of client devices requesting service. Process 4540 receives an indication of a view region of interest from a client device based on a display, at the client device, of the derivative video signal. Process 4550 selects a predefined view region corresponding to the view region of interest Process 4560 streams partial-coverage video signals through network 150.

FIG. 46 illustrates a multicast table 4600 used for tracking the formation of streams. In the example of FIG. 46, eight view regions 3620, labelled V0 to V8, and three client-device types, labeled D0, D1, and D2, are considered. A stream is defined according to a view region and a client-device type. Thus, 24 streams are defined. Upon selecting a predefined view region (one of V0 to V7) for a client device, a network address of the client device is appended to a stream defined according to the client-device type and the selected predefined view region. Thus, each stream may be directed to multiple client devices. While several cells 4650 of the multicast table may be empty, a cell 4650 may contain network addresses of several client devices.

Thus, the invention provides a method of streaming, implemented at a controller 4200, of a panoramic multimedia server 120, enabling individual client devices to dynamically select view regions of interest of a panoramic field of view. Upon receiving, from a panoramic multimedia source, a source video signal 312, FIG. 3, capturing a panoramic field of view 3610, the source video signal is processed to generate a pure video signal (322, 324, FIGS. 3-8) faithfully representing the panoramic field of view.

The pure video signal is content filtered (module 4230) to produce a plurality of view-region-specific video signals 4441 corresponding to a plurality of predefined view regions 3620 within the panoramic field of view 3610. A view-region-specific video signal has a flow rate that is substantially lower than the flow rate of the pure video signal. A view-region-specific video signal may be compressed at an acceptable compression ratio to have a flow rate not exceeding a typical capacity of a communication path from the server to any client device communicatively coupled to the server.

The pure video signal may be compressed at an acceptable compression ratio and sent to client devices for the purpose of selecting view regions of interest. However, the flow rate of the compressed pure video signal may still be much higher than a typical capacity of a communication path from the server to any client device communicatively coupled to the server. In order to enable a user of a client device to select a view region of interest, a frame-sampled signal is extracted from the pure video signal and sent to a client device. The frame-sampled signal need not be compressed since the frame-sampling rate can be selected to render a flow rate not exceeding the capacity of a communication path from the server to a client device.

Upon receiving, at the controller 4200, a service request (process 4140) from a client device 180, frame samples of the pure video signal (1322, process 4010) are transmitted (process 4150) to the client device to be displayed at the client device to enable selection of a view region of interest (process 4020).

Upon receiving, from the client device 180, an indication (process 4160) of a view region of interest, the controller 4200 determines proximity of each predefined region, of the plurality of predefined view regions, to the indicated view region of interest. A specific predefined view region is selected (FIG. 39, process 4170) according to the proximity of each predefined view region to the view region of interest. A particular view-region-specific video signal, of the plurality of view-region-specific video signals, corresponding to the specific predefined view region is streamed to the client device (process 4180).

To produce a pure video from the source video signal, the received source video signal is decompressed, subject to a determination that the source video signal has been compressed at source, and de-warped, subject to a determination that the source video signal has not been de-warped at source (FIGS. 3-8).

The method comprises a step of determining a client-device type of the client device requesting the service and transcoding the frame samples to be compatible with the client-device type prior to transmitting the frame samples of the pure video signal to the client device (process 4135).

According to an implementation, the indication of a view region of interest is a location of a selected point 3830 within a display of the frame samples and the proximity of each predefined region to the view region of interest is determined as a Euclidean distance between a centroid of a predefined region and the selected point. The predefined view regions are preferably of rectangular shapes.

According to another implementation, the indication of a view region of interest is a regular polygon within the display of the frame samples and the proximity of each predefined region to the view region of interest is determined based on intersection of a predefined region and the regular polygon.

The pure video signal is supplied to a plurality of content-filters 4440, where each content filter is configured to extract a respective view-region-specific video signal of the plurality of view-region-specific video signals. A view-region-specific video signal is transcoded to be compatible with a client-device type prior to streaming (transcoding units 4450).

Thus, the invention provides a control system 4200 of a streaming server 120. The control system comprises a plurality of processors organized into a number of processing modules as well as network interface 4210 configured to communicate with multimedia signal sources 110 (FIGS. 1 and 2) and a plurality of client devices 180.

A first module 4220 is configured to generate a pure video signal accurately representing a panoramic field of view. A second module 4230 is configured to generate from the pure video signal a set of view-region-specific video signals corresponding to a plurality of predefined view regions within the panoramic field of view. A third module 4240 is configured to generate a frame-sampled video signal from the pure video signal.

A fourth module 4260 is configured to transmit a frame-sampled signal to a client device and receive an identifier of a view region of interest through the network interface. A fifth module 4270 is configured to:
select a specific predefined view region according to proximity to the view region of interest (FIG. 39); and
transmit a corresponding view-region-specific video signal through the network interface.

A central processor 4280 is coupled to the network interface 4210, and the first, second, third, fourth module, and fifth modules.

The second module 4230 is further configured to transcode the set of view-region-specific video signals to produce multiple transcoded view-region-specific video signals compatible with a set of predefined client-device types. The third module 4240 is further configured to transcode the frame-sampled video signal to produce multiple frame-sampled video signals compatible with the set of predefined client-device types.

The identifier of a view region of interest may be a client-selected central point and the fifth module is further configured to: determine centroids 3720 of the predefined view regions; and determine the proximity of each predefined view region to the view region of interest based on Euclidean distances between the client-selected central point and the centroids. Alternatively, the identifier of a view region of interest may be a client-selected rectangular shape. Thus, the fifth module is further configured to determine the proximity of each predefined view region to the view region of interest based on intersection of the client-selected rectangle and the predefined view regions.

A memory device 4250 stores service requests from the plurality of client devices and holds a multicast-control data structure associating each granted request for service with one of predefined aggregated streams. Each aggregated stream is specific to a predefined view region of the plurality of predefined view regions and a client-device type of the set of predefined client-device types.

A method, implemented at the streaming server, of multicasting aggregated streams comprises the following steps:
(1) content filtering a pure video signal 4330 faithfully representing a panoramic field of view 3610 to produce a plurality of view-region-specific video signals 4441 corresponding to a plurality of predefined view regions 3620 within the panoramic field of view;
(2) forming multiple aggregated streams, where each aggregated stream comprises a view-region-specific video signal adapted to a client-device type of a plurality of predefined client-device types (process 4510);
(3) extracting a derivative video signal (process 4520) from the pure video signal;
(4) broadcasting the derivative video signal to a plurality of client devices communicatively coupled to the streaming server;
(5) receiving, from responding client devices, indications of respective client-device types and respective view regions of interest based on displays, at the responding client devices, of the derivative video signal;
(6) for each responding client device: determining a respective predefined view region based on proximity (FIG. 39) to an indicated view region of interest, associating the responding client device with an aggregated stream corresponding to the respective predefined view region and a respective client-device type; and
(7) multicasting, through a network, each aggregated stream to respective associated client devices.

A multicast data structure 4600 is used for routing the aggregated streams. The data structure stores for each aggregated stream a respective list 4650 of network addresses of all associated client devices designated to receive the aggregated stream.

Extracting the derivative video signal from the pure video signal comprises selecting distant frames of the pure video signal where the separation of successively selected frames exceeds a predefined lower bound.

The derivative video signal is transcoded to produce several transcoded derivative video signals, each compatible with a respective client-device type of the plurality of predefined client-device type, prior to broadcasting to the plurality of client devices.

According to an implementation, the indicated view region of interest is based on a central point 3830 within a display of the derivative video signal and the proximity of a predefined view region to the indicated view region of interest is determined according to the Euclidean distance between the central point and the centroid of the predefined view region.

According to another implementation, the indicated view region of interest is based on vertices of a predefined regular polygon within a display of the derivative video signal and the proximity of a predefined view region to the indicated view region of interest is determined according to intersection of the regular polygon with the predefined view region.

The disclosed panoramic multimedia server is devised to interact with multiple panoramic multimedia sources of different types and with client devices of different capabilities. The server may exchange control signals with a panoramic multimedia source to enable acquisition of multimedia signals together with descriptors of the multimedia signals and data indicating signal processes performed at source. The server may exchange control signals with a client device to coordinate delivery of a signal sample of a full-coverage (attainable-coverage) panoramic video signal and acquire identifiers of a preferred view region from a viewer at the client device.

The server is devised to implement several methods of capturing a client's viewing preference. According to one method, a signal sample corresponding to attainable spatial coverage is sent to client device and a viewer at a client device may send an identifier of a preferred view region to the server. The server then sends a corresponding content-filtered video signal. The server distributes software module to subtending client devices to enable this process. According to another method, the server may multicast to client devices a number of content-filtered video signals corresponding to different view regions. The content-filtered video signals are derived from a full-coverage (attainable-coverage) panoramic video signal. Viewers at the client devices may individually signal their respective selection. The server may use a streaming-control table (FIG. 32) to eliminate redundant processing.

Processor-executable instructions causing respective hardware processors to implement the processes described above may be stored in processor-readable media such as floppy disks, hard disks, optical disks, Flash ROMS, non-volatile ROM, and RAM. A variety of processors, such as microprocessors, digital signal processors, and gate arrays, may be employed.

It should be noted that methods and systems of the embodiments of the invention and data streams described above are not, in any sense, abstract or intangible. Instead, the data is necessarily presented in a digital form and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems having processors on electronically or magnetically stored data, with the results of the data processing and data analysis digitally stored in one or more tangible, physical, data-storage devices and media.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

The invention claimed is:

1. At a controller of a panoramic multimedia server, having at least one processor, a method comprising:
receiving a source video signal capturing a panoramic field of view;
processing the source video signal to generate a pure video signal representing the panoramic field of view, said pure video signal, when compressed at an acceptable compression ratio, having a flow rate exceeding a capacity of a communication path from the server to a client device;
content filtering the pure video signal to produce a plurality of view-region-specific video signals corresponding to a plurality of predefined view regions within said panoramic field of view, each said view-region-specific video signal, when compressed at said acceptable compression ratio, having a flow rate not exceeding said capacity;
receiving a service request from a client device;
transmitting to said client device frame-samples of said pure video signal, said frame samples having a flow rate not exceeding said capacity;
receiving from said client device an indication of a view region of interest based on a display of said frame samples;
determining proximity of each said predefined region to the view region of interest;
selecting a specific predefined view region according to said proximity; and
streaming to said client device a particular view-region-specific video signal corresponding to said specific predefined view region.

2. The method of claim 1 wherein said processing comprises:
decompressing the received source video signal subject to a determination that the source video signal has been compressed at source; and
de-warping the received source video signal subject to a determination that the source video signal has not been de-warped at source.

3. The method of claim 1 further comprising:
determining a client-device type of said client device; and
transcoding said frame samples to be compatible with said client-device type prior to said transmitting.

4. The method of claim 1 wherein:
said indication of a view region of interest is a location of a point within said display of said frame samples; and
said proximity is determined as a Euclidian distance between a centroid of said predefined region and said point.

5. The method of claim 1 wherein:
said indication of a view region of interest is a regular polygon within said display of said frame samples; and
said proximity is determined based on intersection of said predefined region and said regular polygon.

6. The method of claim 1 wherein said predefined view regions are of rectangular shapes.

7. The method of claim 1 wherein said content filtering comprises supplying said pure video signal to a plurality of content-filters each configured to extract a respective view-region-specific video signal.

8. The method of claim 1 further comprising:
determining a client-device type of said client device; and
transcoding said particular view-region-specific video signal to be compatible with said client-device type prior to said streaming.

9. A control system, of a streaming server, comprising:
a network interface configured to receive a source multimedia signal and service requests from a plurality of client devices;
a first module configured to generate a pure video signal, from the source multimedia signal, representing a panoramic field of view, said pure video signal, when compressed at an acceptable compression ratio, having a flow rate exceeding a capacity of a communication path from the server to a client device;
a second module configured to generate from the pure video signal a set of view-region-specific video signals corresponding to a plurality of predefined view regions within said panoramic field of view, each said view-region-specific video signal, when compressed at said acceptable compression ratio, having a flow rate not exceeding said capacity;
a third module configured to generate a frame-sampled video signal from the pure video signal;
a fourth module configured to transmit the frame-sampled video signal to a client device and receive an identifier of a view region of interest;
a fifth module configured to:
select a specific predefined view region according to proximity to the view region of interest; and transmit a corresponding view-region-specific video signal;
and
a processor coupled to said network interface, first module, second module, third module, fourth module, and fifth module.

10. The control system of claim 9 wherein said second module is further configured to transcode the set of view-region-specific video signals to produce multiple transcoded view-region-specific video signals compatible with a set of predefined client-device types.

11. The control system of claim 9 wherein said second module is further configured to transcode the frame-sampled video signal to produce multiple frame-sampled video signals compatible with a set of predefined client-device types.

12. The control system of claim 9 wherein said identifier of a view region of interest is a client-selected central point and said fifth module is further configured to:
determine centroids of said predefined view regions; and
determine said proximity based on Euclidean distances between said client-selected central point and said centroids.

13. The control system of claim 9 wherein said identifier of a view region of interest is a client-selected rectangle and said fifth module is further configured to determine said proximity based on intersection of said client-selected rectangle and said predefined view regions.

14. The control system of claim 9 further comprising a memory device for:
queueing said service requests; and
holding multicast-control data structure associating each accepted request for service with one of predefined aggregated streams, each aggregated stream being specific to a predefined view region of said plurality of predefined view regions and a client-device type of said set of predefined client-device types.

15. A method of streaming, implemented at a streaming server, the method comprising:
content filtering a pure video signal representing a panoramic field of view to produce a plurality of view-region-specific video signals corresponding to a plurality of predefined view regions within said panoramic field of view;
forming multiple aggregated streams, where each aggregated stream comprises a view-region-specific video signal adapted to a client-device type of a plurality of predefined client-device types;
extracting a derivative video signal from the pure video signal;
broadcasting the derivative video signal to a plurality of client devices communicatively coupled to the streaming server;
receiving, from responding client devices, indications of respective client-device types and respective view regions of interest based on displays, at said responding client devices, of the derivative video signal;
for each responding client device:
determining a respective predefined view region based on proximity to an indicated view region of interest;
associating said responding client device with an aggregated stream corresponding to said respective predefined view region and a respective client-device type;
and
multicasting, through a network, each aggregated stream to respective associated client devices.

16. The method of claim 15 further comprising employing a multicast data structure for routing said aggregated streams, said data structure storing for each aggregated stream a respective list of network addresses of all associated client devices.

17. The method of claim 15 wherein said extracting comprises selecting distant frames of said pure video signal where the separation of successively selected frames exceeds a predefined lower bound.

18. The method of claim 15 further comprising, prior to said broadcasting, transcoding said derivative video signal to produce transcoded derivative video signals each compatible with a respective client-device type of said plurality of predefined client-device type.

19. The method of claim 15 wherein said indicated view region of interest is based on a central point and said proximity is determined according to Euclidean distances between the central point and centroids of the predefined view regions.

20. The method of claim 15 wherein said indicated view region of interest is based on vertices of a predefined regular polygon and said proximity is determined according to overlaps of the regular polygon with said predefined view regions.

* * * * *